US012725405B2

(12) United States Patent
Okamoto et al.

(10) Patent No.: US 12,725,405 B2

(45) Date of Patent: Sep. 1, 2026

(54) LEARNING APPARATUS, ESTIMATION APPARATUS, DATA GENERATION APPARATUS, LEARNING METHOD, AND COMPUTER-READABLE STORAGE MEDIUM STORING A LEARNING PROGRAM

(71) Applicant: OMRON Corporation, Kyoto (JP)

(72) Inventors: Yamato Okamoto, Kyoto (JP); Atsushi Hashimoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 1142 days.

(21) Appl. No.: 17/431,455

(22) PCT Filed: Feb. 18, 2020

(86) PCT No.: PCT/JP2020/006252

§ 371 (c)(1),
(2) Date: Aug. 17, 2021

(87) PCT Pub. No.: WO2020/184084

PCT Pub. Date: Sep. 17, 2020

(65) Prior Publication Data

US 2022/0139070 A1 May 5, 2022

(30) Foreign Application Priority Data

Mar. 14, 2019 (JP) ................................ 2019-047710

(51) Int. Cl.
*G06V 10/774* (2022.01)
*G06N 3/045* (2023.01)
(Continued)

(52) U.S. Cl.
CPC ........... *G06V 10/774* (2022.01); *G06N 20/00* (2019.01); *G06V 20/54* (2022.01); *G06N 3/045* (2023.01);
(Continued)

(58) Field of Classification Search
CPC ...... G06V 10/774; G06V 20/54; G06N 20/00; G06N 3/045; G06N 3/084; G08G 1/0112;
(Continued)

(56) References Cited

U.S. PATENT DOCUMENTS

2016/0253466 A1* 9/2016 Agaian .................. G06N 5/043 382/128
2018/0349741 A1* 12/2018 Yasutomi ............... G06V 10/22
(Continued)

FOREIGN PATENT DOCUMENTS

JP 2010-112889 A 5/2010
JP 2012-084117 A 4/2012
(Continued)

OTHER PUBLICATIONS

Poole, Ben, Jascha Sohl-Dickstein, and Surya Ganguli. "Analyzing noise in autoencoders and deep networks." arXiv preprint arXiv: 1406.1831 (2014). (Year: 2014).*
(Continued)

*Primary Examiner* — Michelle T Bechtold
*Assistant Examiner* — Nicholas S Wu
(74) *Attorney, Agent, or Firm* — METROLEX IP LAW GROUP, PLLC; Robert L. Scott, Esq.

(57) ABSTRACT

A learning apparatus according to one or more embodiments executes, with respect to each learning data set, a first training step of training a second encoder and a second metadata identifier such that the identification result by the second metadata identifier matches the metadata, a second training step of training encoders and an estimator such that the result of estimation performed by the estimator matches correct answer data, a third training step of training a first metadata identifier such that the result of identification performed by the first metadata identifier matches the metadata, and a fourth training step of training a first encoder
(Continued)

such that the result of identification performed by the first metadata identifier does not match the metadata. The third training step and the fourth training step are alternatingly and repeatedly executed.

19 Claims, 33 Drawing Sheets

(51) Int. Cl.

| | |
|---|---|
| ***G06N 3/084*** | (2023.01) |
| ***G06N 20/00*** | (2019.01) |
| ***G06V 20/54*** | (2022.01) |
| *G08G 1/01* | (2006.01) |

(52) U.S. Cl.
CPC .......... *G06N 3/084* (2013.01); *G08G 1/0112* (2013.01); *G08G 1/0116* (2013.01); *G08G 1/0129* (2013.01); *G08G 1/0141* (2013.01)

(58) Field of Classification Search
CPC ... G08G 1/0116; G08G 1/0129; G08G 1/0141
See application file for complete search history.

(56) References Cited

U.S. PATENT DOCUMENTS

| | | | | |
|---|---|---|---|---|
| 2019/0049540 | A1 | 2/2019 | Odry et al. | |
| 2019/0065853 | A1* | 2/2019 | Sohn | G08G 1/0175 |
| 2019/0220977 | A1* | 7/2019 | Zhou | G06N 3/09 |
| 2019/0347523 | A1* | 11/2019 | Rothberg | G06N 3/084 |
| 2020/0210881 | A1* | 7/2020 | Wu | G06N 3/0455 |

FOREIGN PATENT DOCUMENTS

| | | | |
|---|---|---|---|
| JP | 2016-191975 | A | 11/2016 |
| JP | 2018-005640 | A | 1/2018 |
| JP | 2018-147474 | A | 9/2018 |
| JP | 2019-021218 | A | 2/2019 |
| JP | 2019-28489 | A | 2/2019 |

OTHER PUBLICATIONS

Long, Mingsheng, et al. "Learning transferable features with deep adaptation networks." International conference on machine learning. PMLR, 2015. (Year: 2015).*

Mariani, Giovanni, et al. "Bagan: Data augmentation with balancing gan." arXiv preprint arXiv:1803.09655 (2018). (Year: 2018).*

Cao, Zhangjie, et al. "Partial adversarial domain adaptation." Proceedings of the European conference on computer vision (ECCV). 2018. (Year: 2018).*

Tzeng E, Hoffman J, Saenko K, Darrell T. Adversarial Discriminative Domain Adaptation. arXiv preprint arXiv:1702.05464. Feb. 17, 2017. (Year: 2017).*

The extended European search report (EESR) issued on Nov. 22, 2022 in a counterpart European patent application.

Chinese Office Action issued on Feb. 7, 2024 in a counterpart Chinese patent application.

Tzeng et al. "Adversarial Discriminative Domain Adaptation", arXiv:1702.05464, online, Feb. 17, 2017, pp. 1-10; Concise explanation of relevance provided in the specification.

An English translation of the International Search Report ("ISR") of PCT/JP2020/006252 mailed on Jun. 2, 2020.

The Written Opinion("WO") of PCT/JP2020/006252 mailed on Jun. 2, 2020.

* cited by examiner

2
ESTIMATION APPARATUS
22
STORAGE UNIT
82
ESTIMATION PROGRAM
128
LEARNING RESULT DATA
CONTROL UNIT
CPU
RAM
ROM
21
24
INPUT APPARATUS
25
OUTPUT APPARATUS
COMMUNICATION INTERFACE
23
92
STORAGE MEDIUM
DRIVE
26
EXTERNAL INTERFACE
27
OBJECT DATA
SENSOR
S

3
DATA GENERATION APPARATUS
32
STORAGE UNIT
83
GENERATION PROGRAM
128
LEARNING RESULT DATA
CONTROL UNIT
CPU
RAM
ROM
31
34
INPUT APPARATUS
35
OUTPUT APPARATUS
COMMUNI-CATION INTERFACE
33
93
STORAGE MEDIUM
DRIVE
36
EXTERNAL INTERFACE
37
OBJECT DATA
SENSOR
S

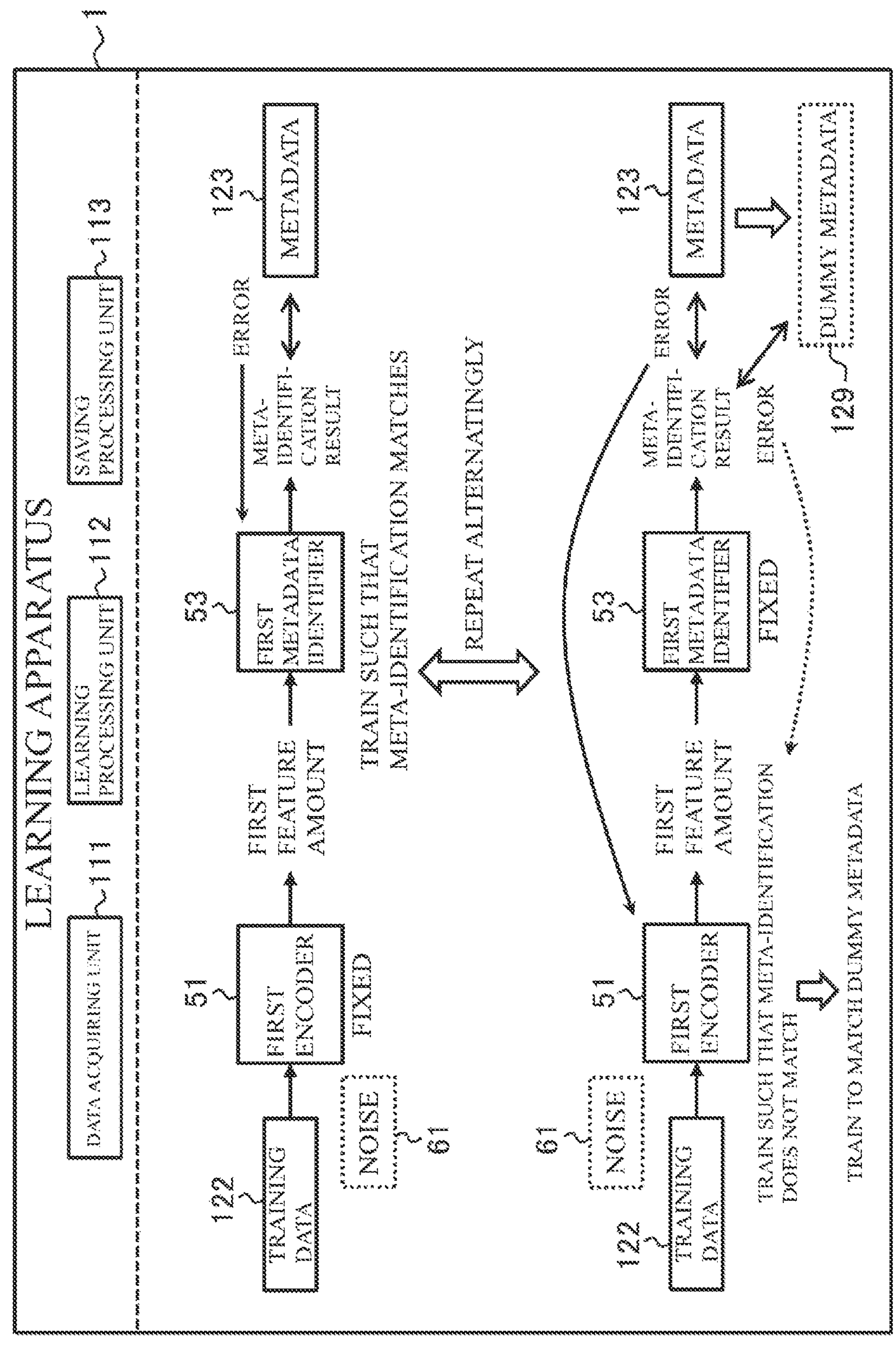
FIG. 5C
1
LEARNING APPARATUS
DATA ACQUIRING UNIT
111
LEARNING PROCESSING UNIT
112
SAVING PROCESSING UNIT
113
122
TRAINING DATA
NOISE
61
51
FIRST ENCODER
FIXED
FIRST FEATURE AMOUNT
53
FIRST METADATA IDENTIFIER
META-IDENTIFI-CATION RESULT
ERROR
123
METADATA
TRAIN SUCH THAT META-IDENTIFICATION MATCHES
REPEAT ALTERNATINGLY
61
NOISE
122
TRAINING DATA
51
FIRST ENCODER
FIRST FEATURE AMOUNT
53
FIRST METADATA IDENTIFIER
FIXED
META-IDENTIFI-CATION RESULT
ERROR
ERROR
123
METADATA
DUMMY METADATA
129
TRAIN SUCH THAT META-IDENTIFICATION DOES NOT MATCH
TRAIN TO MATCH DUMMY METADATA LEARNING APPARATUS
DATA ACQUIRING UNIT
111
LEARNING PROCESSING UNIT
112
SAVING PROCESSING UNIT
113
1
122
TRAINING DATA
51
FIRST ENCODER
52
SECOND ENCODER
FIRST FEATURE AMOUNT
SECOND FEATURE AMOUNT
NOISE
63
56
DECODER
DECODED DATA
TRAINING DATA
192
METADATA
193
CORRECT ANSWER DATA
194
DIFFERENT CORRECT ANSWER DATA
195
USED FOR MACHINE LEARNING

FIG. 7

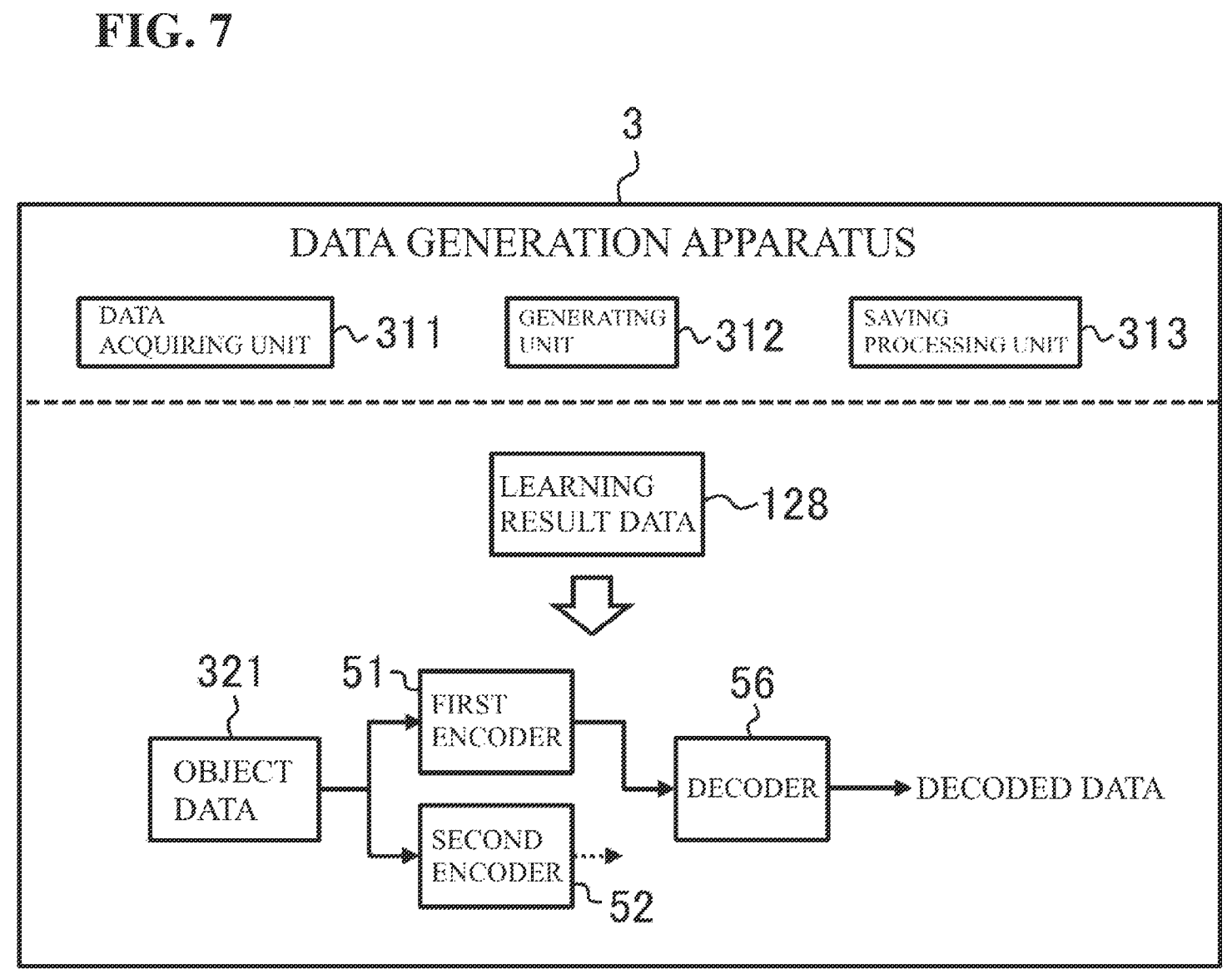

3
DATA GENERATION APPARATUS
DATA ACQUIRING UNIT 311
GENERATING UNIT 312
SAVING PROCESSING UNIT 313
LEARNING RESULT DATA 128
OBJECT DATA 321
FIRST ENCODER 51
SECOND ENCODER 52
DECODER 56
DECODED DATA

FIG. 15A

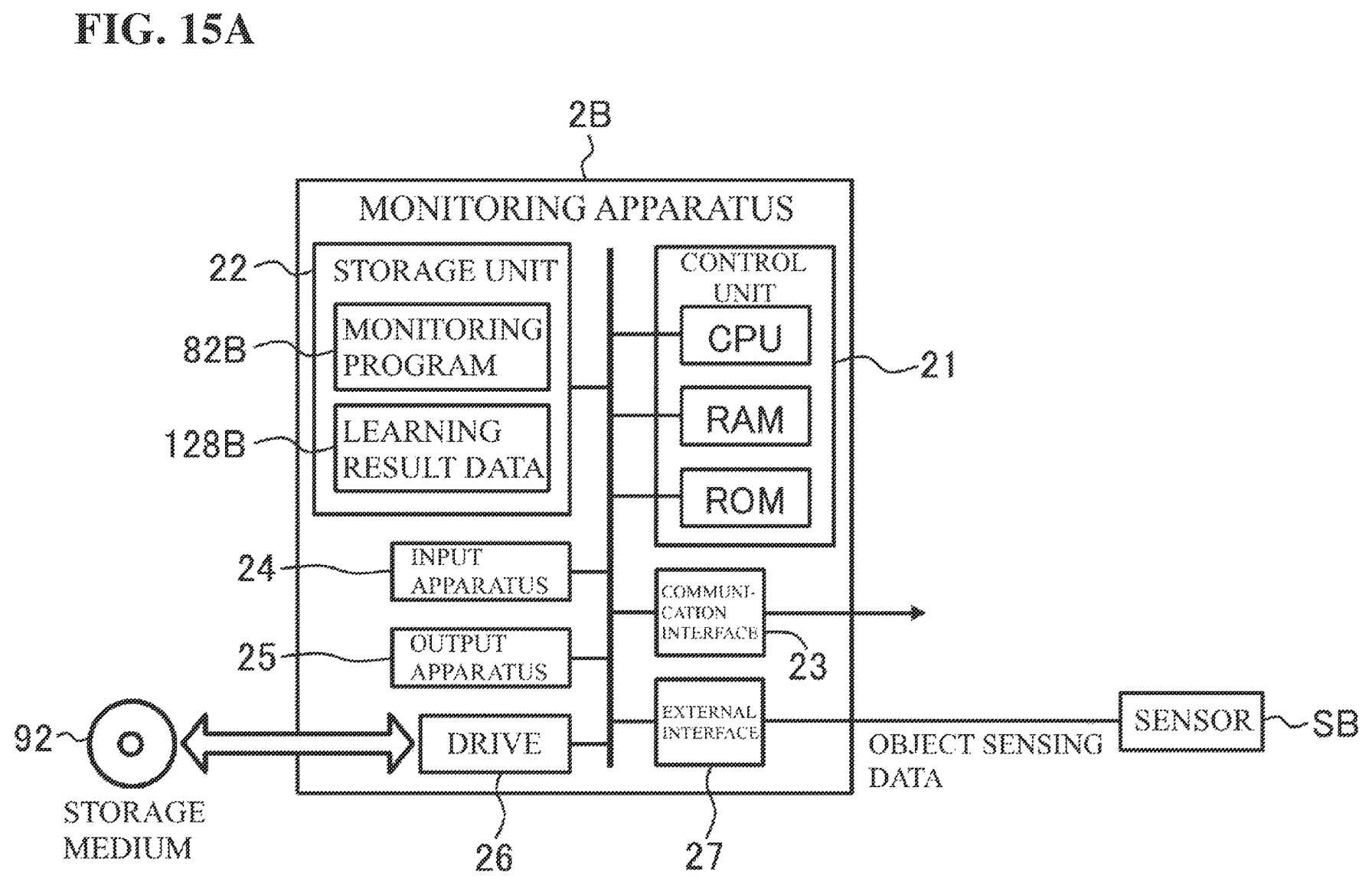

MONITORING APPARATUS
2B
CONTROL UNIT
21
CPU
RAM
ROM
COMMUNI-CATION INTERFACE
23
EXTERNAL INTERFACE
27
STORAGE UNIT
22
MONITORING PROGRAM
82B
LEARNING RESULT DATA
128B
INPUT APPARATUS
24
OUTPUT APPARATUS
25
DRIVE
26
SENSOR
SB
OBJECT SENSING DATA
92
STORAGE MEDIUM

SB2
2B2
DIAGNOSIS APPARATUS
1
LEARNING APPARATUS
3
DATA GENERATION APPARATUS

FIG. 22A

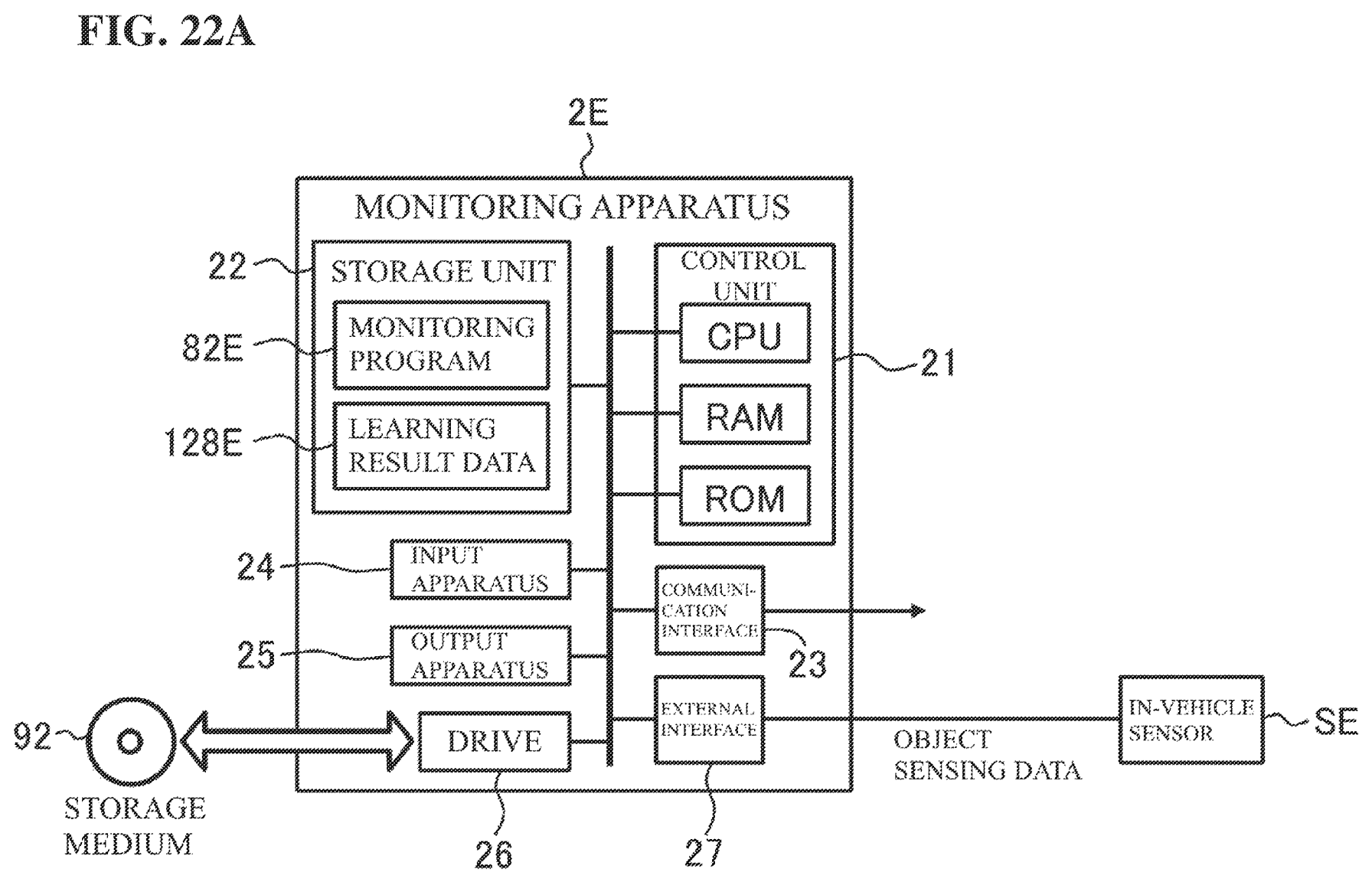

2E
MONITORING APPARATUS
CONTROL UNIT
CPU
RAM
ROM
21
STORAGE UNIT
MONITORING PROGRAM
LEARNING RESULT DATA
22
82E
128E
COMMUNI-CATION INTERFACE
23
EXTERNAL INTERFACE
27
INPUT APPARATUS
24
OUTPUT APPARATUS
25
DRIVE
26
IN-VEHICLE SENSOR
SE
OBJECT SENSING DATA
92
STORAGE MEDIUM

LEARNING APPARATUS, ESTIMATION APPARATUS, DATA GENERATION APPARATUS, LEARNING METHOD, AND COMPUTER-READABLE STORAGE MEDIUM STORING A LEARNING PROGRAM

TECHNICAL FIELD

The present disclosure relates to a learning apparatus, an estimation apparatus, a data generation apparatus, a learning method, and a learning program.

RELATED ART

Systems are under development for estimating various events relating to traffic using data obtained by various sensors such as cameras installed on roads. For example, Patent Document 1 proposes a method for predicting demands of an emergency vehicle, a transportation means, a wagon retailer, and the like regarding predetermined objects based on area information indicating conditions of the area. Specifically, machine learning of a regression model or a neural network is performed using learning data constituted by area information and correct answer data indicating the demand regarding a predetermined object corresponding to the area information. Using a trained model constructed by this machine learning, the demand regarding the predetermined object is predicted from area information indicating the conditions of the area.

Using a trained model constructed by machine learning, an estimation (including prediction) task such as regression or classification can be executed on unknown data of the same type as given training data. Note that, the accuracy of estimation by the trained model may depend on acquisition attributes such as conditions of acquiring given learning data (training data, specifically). For example, assume a scenario in which a traffic flow on a road is predicted using data obtained by sensors set on the road as the training data. In this scenario, the property of traffic flow on the road that appears in the data may differ due to various factors.

If the object to be observed, which is an example of the factor, is different, the property of traffic flow on the road that appears in the data may fundamentally differ. For example, the property of traffic flow may differ due to road attributes such as a branching point, a junction, a straight road, and a curving road. Also, even in a case where a same point is observed (that is, the object to be observed is the same), the property of traffic flow that appears in the obtained data may differ due to the difference in the method for acquiring data. For example, the state of traffic flow that appears in data may differ between the data obtained by performing measurement sideward in the vicinity of a road and the data obtained by performing measurement from a position above and a little bit apart from the road.

Therefore, the accuracy of estimation by the trained model may depend on the acquisition attributes such as conditions of acquiring the training data. For example, assume that a trained model is constructed that is trained to predict the traffic flow on a straight road having no branches and junctions from data obtained by a sensor that observes this road. In this case, if this trained model is used on data obtained by a sensor that observes a curving road including a junction, it is highly possible that this trained model makes a wrong prediction. Similarly, assume that a trained model is constructed that is trained to predict the traffic flow of a road from data obtained by a sensor that observes this road from a position above and apart from the road. In this case, if this trained model is used on data obtained by a different sensor that observes the same road sideward, it is highly possible that this trained model makes a wrong prediction. That is, if the attribute of acquiring training data is different from the attribute of acquiring unknown data on which the estimation task is performed, it is possible that the trained model cannot appropriately perform estimation.

In contrast, it is conceivable to construct a trained model considering all factors that can be envisaged. For example, it is conceivable that data obtained from a plurality of points is used for machine learning of one model. However, in this case, although it is possible to construct a trained model that is trained to predict the traffic flow in an area including the plurality of points, the structure of the model becomes complex, and it is difficult to apply the trained model to another area. Moreover, the volume of the learning data becomes huge, and it is possible that the learning does not converge.

Therefore, it is preferable that, instead of increasing the complexity of the model structure in order to accept inputs corresponding to all factors, some measures are taken to make the learning result obtained by using training data applicable to unknown data whose acquisition attributes are different. Domain adaptation is known as an example of this attempt. The domain adaptation is a method of causing a trained model that has learned the capability of executing a predetermined task using learning data obtained in one domain to adapt to data acquired in another domain. One method of this domain adaptation is proposed in Non-Patent Document 1.

Specifically, in Non-Patent Document 1, data sets constituted by combinations of source image data that is training data and correct answer data (label) indicating an object in an image of the source image data are prepared. Also, a source extractor and a classifier corresponding thereto are prepared. Also, the prepared source extractor and classifier are trained using the prepared data sets, as prior learning. The source extractor is trained to extract a feature amount from input image data. The classifier is trained to classify an object in an image of the source image data based on the feature amount extracted from the source image data.

Next, object image data on which an estimation task is performed is prepared. Also, an object extractor corresponding thereto and a discriminator for discriminating the outputs of the source extractor and the object extractor are prepared. The discriminator is trained to distinguish between the feature amount extracted from source image data by the source extractor and the feature amount extracted from object image data by the object extractor. In contrast, the object extractor is adversarially trained such that the discriminator makes erroneous discrimination. With this adversarial learning, the object extractor is trained to map the object image data in a feature space that is the same as that of the source extractor, that is, to extract features that are the same as those by the source extractor. As a result, the classifier trained by using source image data can also be applied to object image data. That is, as a result of using the trained object extractor and classifier, an object in an image of the object image data can be classified similarly to the source image data.

RELATED ART DOCUMENT

Patent Document

Patent Document 1: JP 2019-028489A

Non-Patent Document

Non-Patent Document 1: Eric Tzeng, et al. "Adversarial Discriminative Domain Adaptation" arXiv preprint arXiv: 1702.05464, 2017.

SUMMARY

With the method of Non-Patent Document 1, even if the acquisition attributes differ between unknown data on which an estimation task is performed and the training data, it is expected that the trained model may appropriately execute the estimation task on the unknown data. However, the inventors found that the known method described in Non-Patent Document 1 has a problem in that, with this method, the object extractor is created for every domain from which object image data is acquired, and therefore the introduction cost is high.

With the method of Non-Patent Document 1, even if the acquisition attributes differ between unknown data on which an estimation task is performed and the training data, it is expected that the trained model can appropriately execute the estimation task on the unknown data. However, the inventors of the present invention found that the known method described in Non-Patent Document 1 has a following problem. That is, there is a problem that, with this method, the object extractor is created for every domain from which object image data is acquired, and therefore the introduction cost is high.

Also, depending on the estimation task, it is possible that the difference in attributes regarding acquisition of data is better to be considered. For example, assume a scenario in which a trained model is constructed for predicting the occurrence possibility of congestion on a road from data obtained by sensors observing the road. In this case, moreover assume that the training data includes data obtained by sensors that respectively observe a one-lane road and a two-lane road, and the trained model has obtained a knowledge that the occurrence possibility of congestion is low on the two-lane road relative to the one-lane road from the training data. In this case, it is possible that the trained model can perform congestion prediction on a three-lane road with a relatively high accuracy with respect to unknown data obtained from sensors observing this road, although the attributes regarding acquisition differ from the training data.

In contrast, in the known method, information regarding an event specific to a domain from which the object image data is acquired is lost due to the adversarial learning of the object extractor. Moreover, all information regarding an event that is common between a domain from which object image data is acquired and a domain from which source image data is acquired is not necessarily reflected on the learning of the object extractor, and it is possible that some information regarding the common event is lost. Therefore, in the known method, there is a problem that the accuracy of an estimation task performed using the trained model possibly degrades due to occurrence of this information loss.

Note that the above-described problem is not specific to a scenario in which a trained model is constructed for estimating road conditions from data obtained by sensors observing the road conditions. This problem may occur in any scenario in which a trained model for a predetermined estimation task on a predetermined data is constructed. The scenarios in which a trained model for a predetermined estimation task is constructed include a scenario in which a trained model is constructed for estimating the state of an object from data obtained by a sensor observing the state of the object, a scenario in which a trained model is constructed for estimating the attributes of a person in an image of image data obtained by a camera, a scenario in which a trained model is constructed for estimating an instruction that is given to a vehicle from data obtained by in-vehicle sensor, a scenario in which a trained model is constructed for estimating the hit ratio of recommendation from client information, and a scenario in which a trained model is constructed for estimating the state of a product in an image of image data, for example. The predetermined data to be used in these scenarios are image data, sound data, numerical data, text data, measurement data obtained by a sensor, or the like. In these scenarios as well, with the known method, the object extractor is generated for every domain from which object data is acquired, and therefore there is a problem that an introduction cost is high. Also, there is a problem that, because an information loss occurs in the learning of the object extractor, it is possible that the accuracy of an estimation task by the trained model decreases.

In view of the foregoing situation and other considerations, in one aspect, and aims one or more aspects aim to provide a technique for constructing a trained model whose introduction cost is relatively low and that is robust to the difference in the attribute regarding acquisition of data.

One or more embodiments are described in accordance with the following configurations.

A learning apparatus according to one or more embodiments may include: a data acquiring unit configured to acquire a plurality of learning data sets that are each constituted by a combination of training data, metadata indicating an attribute regarding acquisition of the training data, and correct answer data indicating a feature included in the training data; and a learning processing unit configured to perform machine learning of a learning model including a first encoder, a second encoder, a first metadata identifier, a second metadata identifier, and an estimator, wherein the first encoder is configured to convert input data that is given into it to a first feature amount, the second encoder is configured to convert the input data to a second feature amount, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, and the estimator is configured to receive output values of the first encoder and the second encoder, and estimate a feature included in the input data from the first feature amount and the second feature amount, the performing the machine learning includes executing: a first training step of training the second encoder and the second metadata identifier such that, with respect to each learning data set, an identification result obtained from the second metadata identifier by giving the training data to the second encoder matches the metadata; a second training step of training the first encoder, the second encoder, and the estimator such that, with respect to each learning data set, an estimation result obtained from the estimator by giving the training data to the first encoder and the second encoder matches the correct answer data; a third training step of training the first metadata identifier such that, with respect to each learning data set, an identification result obtained from the first metadata identifier by giving the training data to the first encoder matches the metadata; and a fourth training step of training the first encoder such that, with respect to each learning data set, an identification result obtained from the first metadata identifier by giving the training data to the first encoder does not match the metadata, and the third training step and the fourth training step are alternatingly and repeatedly executed.

In the learning apparatus according to this configuration, machine learning of the units of the learning model is performed by four training steps. In the first training step, the second encoder and the second metadata identifier are trained such that, with respect to each learning data set, an identification result obtained from the second metadata identifier by giving the training data to the second encoder matches the metadata. As a result of this training, the second feature amount obtained by the second encoder includes a component corresponding to the attribute regarding acquisition such that the second metadata identifier can appropriately identify the attribute regarding acquisition of the training data. In the second training step, the first encoder, the second encoder, and the estimator are trained such that, with respect to each learning data set, an estimation result obtained from the estimator by giving the training data to the first encoder and the second encoder matches the correct answer data. As a result of this training, the first and second feature amounts obtained by the first encoder and the second encoder include a feature included in the training data, that is, a component corresponding to the correct answer of an estimation task.

In the third training step, the first metadata identifier is trained such that an identification result obtained from the first metadata identifier by giving the training data to the first encoder matches the metadata. In contrast, in the fourth training step, the first encoder is trained such that an identification result obtained from the first metadata identifier by giving the training data to the first encoder does not match the metadata. That is, in the third and fourth training steps, adversarial learning of the first encoder and the first metadata identifier is performed. With this, the first feature amount obtained by the first encoder does not include a component corresponding to the attribute regarding acquisition of the training data such that the identification by the first metadata identifier fails, in correspondence with the improvement of the identification performance of the first metadata identifier.

That is, as a result of machine learning according to this configuration, regarding the feature included in the training data, the second feature amount obtained by encoding performed by the second encoder is likely to include a component corresponding to the metadata, in contrast, the first feature amount obtained by encoding performed by the first encoder is likely to include a component corresponding to information other than the metadata. The estimator is trained to estimate a feature included in training data from the two feature amounts. Therefore, as a result of using the trained first encoder, second encoder, and estimator, a task of estimating a feature included in data can be executed based on both of information specific to a domain from which data is acquired and information in common across domains. Therefore, in a case where the information specific to a domain from which data is acquired is useful for an estimation task, the estimation accuracy by the trained model can be improved.

Also, when the information specific to the attribute regarding acquisition of data exerts a bad influence on the accuracy of an estimation task, the feature included in data need only be estimated based on the first feature amount obtained by the first encoder without using the second feature amount obtained by the second encoder. With this, when an estimation task is executed, influence of a component corresponding to the metadata can be removed. Therefore, even in a case where the information specific to the attribute regarding acquisition of data exerts a bad influence on the accuracy of an estimation task (e.g., in a case where an event is estimated that appears in domains, in common, from which data is acquired), the accuracy of estimation using the trained model can be improved.

In addition, the output value obtained from a trained second encoder by inputting input data to the second encoder, as the second feature amount, corresponds to the result of estimating the domain of the input data (that is, the attribute regarding acquisition of data). If this estimation result is correct, the output value obtained from the second metadata identifier by inputting the output value obtained from the second encoder to the second metadata identifier (identification result of the metadata) matches the attribute regarding acquisition of input data. Therefore, it can be determined whether or not an estimation task can be appropriately performed with the above-described trained model based on whether or not the identification result obtained from the second metadata identifier by inputting unknown data to the second encoder matches the attribute regarding acquisition of the unknown data. Accordingly, when unknown data is given on which the trained model cannot appropriately perform an estimation task, execution of the estimation task on the unknown data by the trained model can be avoided. Also, when a plurality of models that were trained by data of different domains are present, an appropriate trained model for the unknown data can be selected.

Moreover, according to this configuration, two encoders, namely a first encoder and a second encoder, are prepared. The first encoder plays a role of extracting a feature amount (first feature amount) including a component corresponding to information other than the metadata. The second encoder plays a role of extracting a feature amount (second feature amount) corresponding to the metadata. The first encoder and the second encoder can be used in common on data obtained from different domains. Therefore, according to this configuration, an extractor need not be prepared for every domain from which data is acquired.

Therefore, according to this configuration, the time and effort for preparing a trained extractor for every domain from which data is acquired can be saved. Also, in both of the cases where information specific to the attribute regarding acquisition of data is useful for an estimation task, and where the information exerts a bad influence on the estimation task, a trained model can be constructed with which the estimation task can be executed with relatively high accuracy. Moreover, as a result of using the trained second encoder and second metadata identifier, it can be evaluated whether or not the trained model can appropriately perform an estimation task on unknown data. The trained model can be prevented from being used on unknown data on which an estimation task cannot be appropriately performed, or an appropriate trained model can be selected for unknown data, based on the evaluation result. Therefore, according to this configuration, a trained model can be constructed whose introduction cost is relatively low and that is robust to the difference in the attribute regarding acquisition of data.

Note that the first encoder, the second encoder, the first metadata identifier, the second metadata identifier, and the estimator include computation parameters that are used for computational operations and are adjusted by machine learning. The types of these first encoder, the second encoder, the first metadata identifier, the second metadata identifier, and the estimator are not limited in particular, and may be selected as appropriate depending on the embodiment, as long as they are models (learners) on which machine learning can be performed. Neural networks, support vector machines, regression models, or decision tree models may be used for the first encoder, the second encoder, the first metadata identifier, the second metadata identifier, and the estimator, for example. When neural networks are used for the first encoder, the second encoder, the first metadata identifier, the second metadata identifier, and the estimator, the weights of connections between neurons, the threshold values of the neurons, and the like are examples of the above-described computation parameters. The data formats of the feature amounts are not limited in particular, and may be selected as appropriate depending on the embodiment.

The type of the training data is not limited in particular, and may be selected as appropriate depending on the embodiment. Image data, sound data, numerical data, text data, or measurement data obtained by a sensor may be used as the training data, for example. The sensor may be an image sensor (camera), an infrared sensor, a sound sensor (microphone), an ultrasonic sensor, an optical sensor, a pressure sensor, an atmospheric pressure sensor, a temperature sensor, for example. Also, the sensor may be an environment sensor, a vital sensor, an in-vehicle sensor, or a home security sensor, for example. The environment sensor may be a barometer, a thermometer, a hygrometer, a sound pressure sensor, a sound sensor, an ultraviolet sensor, an illumination meter, a precipitation gauge, a gas sensor, for example. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a magnetoencephalograph, an activity tracker, a glucometer, an ocular potentiometer, or an eye movement measuring instrument, for example. The in-vehicle sensor may be an image sensor, a laser sensor, or a microwave sensor, for example. The home security sensor may be an image sensor, an infrared sensor, an activity (sound) sensor, gas (e.g., $CO_2$) sensor, a current sensor, or a smart meter (sensor for measuring a power usage amount of a home electric appliance, illumination, or the like), for example. The training data may be constituted by a plurality of different types of data. In this case, the first encoder and the second encoder may be prepared for every type of the training data. That is, the first encoder and the second encoder may include a plurality of partial encoders. The partial encoders may be configured to receive training data of the corresponding type, and convert the input training data of the corresponding type to a feature amount.

The metadata is configured to indicate an attribute regarding acquisition of training data. The attribute regarding acquisition of training data may include any information with which a condition of acquiring the training data can be identified. For example, the attribute regarding acquisition of training data may include an attribute regarding time at which the training data has been acquired. The attribute regarding time may also include a time slot, the day of week, weekday or holiday, month, or season, for example. The time slot may be expressed as morning, daytime, night, or the like, or may be expressed by a predetermined time slot such as from seven to nine o'clock.

Also, when the training data is acquired by a sensor, the attribute regarding acquisition of the training data may include any type of information regarding the sensor. For example, the attribute regarding acquisition of training data may include an attribute regarding the usage mode of the sensor, an attribute regarding the specification of the sensor, or an attribute regarding the observation environment of the sensor. The attribute regarding the usage mode of the sensor may include an attribute regarding the operation setting of the sensor, an attribute regarding the installation conditions of the sensor, or the like. The attribute regarding the operation setting of the sensor may include setting values of the measurement range, setting values of the resolution of the measurement range, setting values of the sampling frequency, and the like. The attribute regarding the installation conditions of the sensor may include the installation angle of the sensor, the ambient temperature of the sensor, the distance between the sensor and the object to be observed, the installation intervals of sensors, or the like. The attribute regarding the specification of the sensor may include an attribute regarding the performance of the sensor, an attribute regarding the apparatus information of the sensor, an attribute regarding initial installation conditions of the sensor, and the like. The attribute regarding the performance of the sensor may include a sensitivity limit, a dynamic range, a settable range of the space resolution, and a settable range of the sampling frequency, of the sensor, for example. The attribute regarding the apparatus information of the sensor may include the type of the sensor, the name of the sensor, the description of the sensor, and the like. The attribute regarding initial installation conditions of the sensor may also include information such as a unique name of the installed location, for example. The attribute regarding the observation environment of the sensor may include a location, weather, temperature, humidity, an illumination level, and the like.

Also, when the training data is obtained with respect to an object, the attribute regarding acquisition of the training data may include any type of information regarding the object. When the training data is obtained by a sensor, an object to be observed by the sensor may be the object. The attribute regarding acquisition of the training data may also include the type of the object, identification information for identifying the object, and the like. When the object is a person, the attribute regarding acquisition of the training data may also include identification information (personal information) such as an identifier, gender, age, body build, and the ethnicity of the person (examinee), for example. Also, when the training data is obtained with respect to some action of a person, the attribute regarding acquisition of the training data may also include any type of information regarding the action of a person.

The correct answer data is configured to indicate the feature included in training data, that is, the correct answer of an estimation task with respect to the training data. The type of the feature included in the training data is not limited in particular, and may be selected as appropriate depending on the embodiment, as long as the feature may serve as an object of estimation (including prediction) tasks such as classification, regression, and the like. Estimating a feature may include classification, performing regression, and the like. The feature may include any element that can be estimated from data. Estimating the feature may include estimating some element at a time to come. In this case, the feature may include an indication of the element that appears at a time to come. The correct answer data may be determined as appropriate depending on the estimation task to be learned. The correct answer data may be constituted by information indicating the category of the feature, information indicating the probability that the feature appears, information indicating the value of the feature, information indicating the range of the feature in an image, and the like. Note that, in the training steps other than the second training step, a learning data set that does not include the correct answer data, that is, a learning data set constituted by a combination of correct answer data and metadata may further be used.

In the learning apparatus according to the above-described one aspect, at least one first learning data set and at least one second learning data set that are included in the plurality of learning data sets may be obtained from different domains such that the attribute indicated by the metadata of the first learning data set differs from that of the second learning data set. According to this configuration, a trained model can be constructed that is robust to the difference in the attribute regarding acquisition of data.

Domains being different means that the attributes regarding acquisition of the training data differ, and when the metadata indicates a plurality of attributes, at least some attributes differ. The domain defines the attribute regarding acquisition of data such as conditions for acquiring the data, for example. When a scenario in which data is acquired by a camera is assumed, if the shooting conditions differ such as the orientation of the camera, the resolution of the camera, the environmental brightness, and an object to be shot, for example, the attributes regarding acquisition of the training data differ. In this case, the shooting conditions are examples of different domains.

In the learning apparatus according to the above-described one aspect, in the first training step, the second encoder may be trained such that the second feature amount includes a component corresponding to the attribute regarding acquisition of the training data indicated by the metadata, and in the fourth training step, the first encoder may be trained such that the first feature amount includes a component corresponding to information that appears in common across domains from which the training data of the learning data sets are acquired. According to this configuration, a trained model can be constructed that is robust to the difference in the attribute regarding acquisition of data. Note that information that appears in common across domains is information that is irrespective of the attributes regarding acquisition of training data indicated by metadata, for example. When image data of images of a numeral that were shot in different shooting conditions and backgrounds are given, the type of the numeral is information that appears in common across domains, for example.

In the learning apparatus according to the above-described one aspect, in the training steps, the trainings are performed by inputting noise along with the training data to the encoders. If the randomness of the training data differs considerably between some of the plurality of learning data sets and some other of the plurality of learning data sets, or if some training data includes a large defect relative to the other training data, it is difficult to prevent the component corresponding to the property difference from entering the first feature amount. That is, it is difficult to cause the first encoder not to learn the property difference. Therefore, in these cases, the first metadata identifier can identify the attribute of acquisition from the property difference, and therefore it is possible that it is difficult to train the first encoder such that the identification by the first metadata identifier fails, in the fourth training step. In contrast, in the configuration, as a result of inputting noise along with training data to the encoders, the property difference can be mitigated, and with this, the fourth training step can be appropriately completed. Therefore, according to this configuration, even if the above-described training data is given, a trained model can be constructed that is robust to the difference in the attribute regarding acquisition of data.

In the learning apparatus according to the above-described one aspect, the performing the machine learning may further include executing a fifth training step of training the first encoder and the second encoder such that, with respect to each learning data set, a mutual information amount decreases between an output value obtained, as the first feature amount, from the first encoder by giving the training data to the first encoder and an output value obtained, as the second feature amount, from the second encoder by giving the training data to the second encoder. According to this configuration, as a result of performing the fifth training step, while a component corresponding to metadata is likely to be included in the second feature amount, a component corresponding to information other than the metadata is further likely to be included in the first feature amount, and is unlikely to be included in the second feature amount. Accordingly, components corresponding to metadata and components corresponding to information other than the metadata can be appropriately distributed between the second feature amount and the first feature amount. As a result, in particular, in a case where an event that appears in domains, in common, from which data is acquired is estimated from the first feature amount, the estimation accuracy by the trained model can be improved.

In the learning apparatus according to the above-described one aspect, in the fourth training step, with respect to each learning data set, dummy metadata that corresponds to the metadata, and has a value that is different from that of the corresponding metadata may be acquired. Also, the performing training of the first encoder such that the identification result does not match the metadata may include performing training of the first encoder such that an identification result obtained from the first metadata identifier by giving the training data to the first encoder matches the dummy metadata. According to this configuration, the processes in the fourth training step can be simplified.

In the learning apparatus according to the above-described one aspect, the dummy metadata may be constituted by metadata of a learning data set that is different from the corresponding learning data set. According to this configuration, the amount of calculation to generate the dummy metadata can be kept low, and the processing cost of the fourth training step can be reduced.

The method for selecting, with respect to a learning data set of interest, another learning data set from which metadata to be used as dummy metadata is acquired is not limited in particular, and may be selected as appropriate depending on the embodiment. For example, another learning data set is randomly selected from a plurality of learning data sets, and the metadata of the selected learning data set may be used as the dummy metadata of the learning data set of interest. Also, the metadata of another learning data set that is assigned to the learning data set of interest may be used as the dummy metadata by shifting the correspondence relationship between the training data and the metadata of the learning data set in any direction, for example. Also, one learning data set is selected from a plurality of learning data sets, and the metadata of the selected learning data set is used as the dummy metadata of all of the learning data sets, for example.

Note that the method for generating the dummy metadata is not limited to this example, and may be selected as appropriate depending on the embodiment. In addition to these methods, the dummy metadata may be generated by inverting the value of the metadata. Also, the dummy metadata may have a random value that is different from the value of the metadata (e.g. random number). A learning data set in which the metadata matches the dummy metadata may be present in the plurality of learning data sets. In this case, the learning data set may be used for training as is, or the dummy metadata of the learning data set may be changed.

Also, the method of training the first encoder such that the identification result obtained from the first metadata identifier does not match the metadata is not limited to this method of giving the dummy metadata. For example, a gradient may be calculated in a direction in which the error between the output value of the first metadata identifier and the metadata increases, and the first encoder may be trained by back-propagating the calculated gradient.

In the learning apparatus according to the above-described one aspect, the learning model may further include a decoder configured to decode the input data from the first feature amount and the second feature amount. The performing the machine learning may further include executing a sixth training step of training the first encoder, the second encoder, and the decoder such that, with respect to each learning data set, decoded data obtained by the decoder by giving the training data to the first encoder and the second encoder matches the training data. According to this configuration, as a result of performing training of the decoder, it is ensured that the input data can be restored from the first and second feature amounts. That is, it is ensured that a defect in information regarding input data is not present in the first and second feature amounts. Therefore, according to this configuration, in any of the cases described above, in the process of converting to the feature amount, the occurrence of defect in information can be kept low, and therefore a trained model can be constructed that is robust to the difference in the attribute regarding acquisition of data, and can perform the estimation task highly accurately.

In the learning apparatus according to the above-described one aspect, in the first, second, and sixth training steps, an output value may be acquired, as the second feature amount, from the second encoder by giving the training data to the second encoder, and the trainings may be executed by inputting noise to the second metadata identifier, the estimator, and the decoder along with the acquired output value. According to this configuration, as a result of performing training in which noise is added to the second feature amount, learning can be performed with respect to domains that differ in the attribute regarding acquisition of data. Accordingly, a trained model can be constructed that is robust to the difference in the attribute regarding acquisition of data, and can perform an estimation task highly accurately. Note that the mode of inputting noise along with the second feature amount is not limited to this example. In at least one of the first, second, and sixth training steps, inputting noise may be omitted, for example.

In the learning apparatus according to the above-described one aspect, the data acquiring unit may acquire, after the learning processing unit has performed machine learning of the learning model, an output value from the first encoder as the first feature amount by giving at least one training data of the plurality of learning data sets to the first encoder, acquire an output value from the second encoder as the second feature amount by giving the training data to the second encoder, and acquire output data from the decoder as the decoded data by inputting the output value acquired from the first encoder to the decoder and inputting noise along with the output value obtained from the second encoder to the decoder. The learning processing unit may again perform machine learning of the learning model using the acquired output data as new training data. According to this configuration, as a result of using decoded data obtained by inputting noise along with the second feature amount in the machine learning as the new training data, learning can be performed with respect to domains that differ in the attribute regarding acquisition of data. Accordingly, a trained model can be constructed that is robust to the difference in the attribute regarding acquisition of data, and can perform an estimation task highly accurately.

Note that the correct answer data to be associated with the new training data may be acquired as appropriate. For example, if the feature indicated by the correct answer data does not depend on the attribute regarding acquisition of the training data, the correct answer data associated with the original training data that was used to generate the new training data may be associated with the new training data. Also, the result of estimation made by the estimator may be associated with the training data as the correct answer data, for example. Also, new correct answer data may be generated, and the new generated correct answer data may be associated with the new training data, for example. Similarly, the metadata to be associated with the new training data may be acquired as appropriate. For example, the identification result obtained from the second metadata identifier by inputting noise along with the second feature amount may be associated with the training data as the metadata. Also, new metadata may be generated, and the generated new metadata may be associated with the new training data, for example.

In the learning apparatus according to the above-described one aspect, the learning model may further include an additional estimator configured to receive an output value of the first encoder and estimate a feature included in the input data from the first feature amount. The performing the machine learning may further include executing a seventh training step of training the first encoder and the additional estimator such that, with respect to each learning data set, an estimation result obtained from the additional estimator by giving the training data to the first encoder matches the correct answer data or a different correct answer data indicating a different feature included in the training data. According to this configuration, as a result of performing machine learning in the seventh training step, it can be ensured that a component corresponding to information that can be used for estimating a feature is included in the first feature amount. Accordingly, in a case where an event that appears in common across domains from which data is acquired is estimated from the first feature amount, the accuracy of estimation by the trained model can be improved.

Note that the trained additional estimator may be used to perform an estimation task based on the first feature amount. It is desirable that the different feature indicated by the different correct answer data is a feature different from the feature indicated by the correct answer data, and is a feature that appears in common between the domains. In a case where the first encoder and the additional estimator are trained such that the estimation result obtained from the additional estimator matches the correct answer data, it is desirable that the feature indicated by the correct answer data is a feature that appears in common across domains.

The learning apparatuses according to the above-described aspects may be applied to any scenario in which a trained model for performing a predetermined estimation task on predetermined data is constructed. The learning apparatuses according to the above-described aspects may be applied to a scenario in which a trained model is constructed for estimating the road conditions from data obtained by sensors that observe road conditions, a scenario in which a trained model is constructed for estimating, from data obtained by a sensor that observes the state of an object, the state of the object, a scenario in which a trained model is constructed for estimating the attribute of a person in an image of the image data obtained by a camera, a scenario in which a trained model is constructed for estimating, from data obtained from in-vehicle sensor, an instruction to be given to a vehicle, a scenario in which a trained model is constructed for estimating the hit ratio of recommendation from client information, and a scenario in which a trained model is constructed for estimating the state of a product in an image of image data, for example.

For example, in the learning apparatus according to the above-described one aspect, the training data may be sensing data obtained by sensors that observe vehicles moving on a road. The metadata may indicate, as the attribute regarding acquisition, an attribute of the road, observation angles of the sensors, installation intervals of the sensor, or types of the sensors, or a combination of these. The correct answer data may indicate information regarding traffic conditions on the road, as the feature. According to this configuration, in a scenario in which the traffic conditions on a road is estimated from sensing data obtained by sensors that observe the road, a trained model can be constructed that is robust to the difference in the attribute regarding acquisition of data.

Also, for example, in the learning apparatus according to the above-described one aspect, the training data may be sensing data obtained by a sensor that observes a state of an examinee. The metadata may indicate, as the attribute regarding acquisition, identification information of the examinee, an attribute regarding the time at which the sensing data was obtained, an attribute regarding installation conditions of the sensor, or an installed location of the sensor, or a combination of these. The correct answer data may indicate the state of the examinee as the feature. According to this configuration, in a scenario in which a trained model is constructed for estimating the state of an object from sensing data obtained by a sensor that observes the state of the object, a trained model can be constructed that is robust to the difference in the attribute regarding acquisition of data.

Also, for example, in the learning apparatus according to the above-described one aspect, the training data may be image data of an image of a product. The metadata may indicate, as the attribute regarding acquisition, an attribute of the product, shooting conditions of the product, or an attribute of a factory for producing the product, or a combination of theses. The correct answer data may indicate the state of a product as the feature. According to this configuration, in a scenario in which a trained model for estimating the state of a product in an image of image data is constructed, a trained model can be constructed that is robust to the difference in the attribute regarding acquisition of data.

Note that the product in an image of the image data may be a product that is conveyed in a production line such as an electronic apparatus, an electronic component, an automotive component, medicine, or food, for example. The electronic component may be a substrate, a chip capacitor, liquid crystal, or a relay winding wire, for example. The automotive component may be a connecting rod, a shaft, an engine block, a power window switch, or a panel, for example. The medicine may be a packaged tablet, or a tablet that is not packaged, for example. The product may be a final product that is generated after completing production processes, an intermediate product that is generated in the middle of production processes, or an initial product that is prepared before being introduced into production processes. The state of a product may indicate information relating to a defect, for example. The state of the product may be represented by whether or not a defect is included in the product, the type of a defect included in the product, or the range of a defect included in the product, or a combination of these, for example. In correspondence therewith, the feature may relate to the defect such as a flaw, a smudge, a crack, a hit, a burr, uneven color, or contamination, for example.

Also, a learning apparatus according to one aspect of the invention includes: a data acquiring unit configured to acquire a plurality of learning data sets that are each constituted by a combination of image data, metadata indicating an attribute regarding acquisition of the image data, and correct answer data indicating a feature included in the image data; and a learning processing unit configured to perform machine learning of a learning model including a first encoder, a second encoder, a first metadata identifier, a second metadata identifier, and an estimator, wherein the first encoder is configured to convert input data that is given into it to a first feature amount, the second encoder is configured to convert the input data to a second feature amount, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, and the estimator is configured to receive output values of the first encoder and the second encoder, and estimate a feature included in the input data from the first feature amount and the second feature amount, the performing the machine learning includes executing: a first training step of training the second encoder and the second metadata identifier such that, with respect to each learning data set, an identification result obtained from the second metadata identifier by giving the image data to the second encoder matches the metadata; a second training step of training the first encoder, the second encoder, and the estimator such that, with respect to each learning data set, an estimation result obtained from the estimator by giving the image data to the first encoder and the second encoder matches the correct answer data; a third training step of training the first metadata identifier such that, with respect to each learning data set, an identification result obtained from the first metadata identifier by giving the image data to the first encoder matches the metadata; and a fourth training step of training the first encoder such that, with respect to each learning data set, an identification result obtained from the first metadata identifier by giving the image data to the first encoder does not match the metadata, and the third training step and the fourth training step are alternatingly and repeatedly executed.

Also, a learning apparatus according to one aspect of the invention includes: a data acquiring unit configured to acquire a plurality of learning data sets that are each constituted by a combination of sensing data, metadata indicating an attribute regarding acquisition of the sensing data, and correct answer data indicating a feature included in the sensing data; and a learning processing unit configured to perform machine learning of a learning model including a first encoder, a second encoder, a first metadata identifier, a second metadata identifier, and an estimator, wherein the first encoder is configured to convert input data that is given into it to a first feature amount, the second encoder is configured to convert the input data to a second feature amount, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, and the estimator is configured to receive output values of the first encoder and the second encoder, and estimate a feature included in the input data from the first feature amount and the second feature amount, the performing the machine learning includes executing: a first training step of training the second encoder and the second metadata identifier such that, with respect to each learning data set, an identification result obtained from the second metadata identifier by giving the sensing data to the second encoder matches the metadata; a second training step of training the first encoder, the second encoder, and the estimator such that, with respect to each learning data set, an estimation result obtained from the estimator by giving the sensing data to the first encoder and the second encoder matches the correct answer data; a third training step of training the first metadata identifier such that, with respect to each learning data set, an identification result obtained from the first metadata identifier by giving the sensing data to the first encoder matches the metadata; and a fourth training step of training the first encoder such that, with respect to each learning data set, an identification result obtained from the first metadata identifier by giving the sensing data to the first encoder does not match the metadata, and the third training step and the fourth training step are alternatingly and repeatedly executed.

Also, the mode of the present invention is not limited to the above-described learning apparatus. One aspect of the invention may be an apparatus that uses a trained learning model constructed by the above-described learning apparatus. For example, one aspect of the invention may be an estimation apparatus configured to execute a predetermined estimation task on predetermined data using a trained learning model constructed by the above-described learning apparatus. This estimation apparatus may be denoted as an estimation apparatus, a monitoring apparatus, a diagnosis apparatus, an inspection apparatus, or the like according to the type of the estimation task in an application scenario. Also, one aspect of the invention may be a data generation apparatus configured to generate new data using a trained learning model including a decoder constructed by the above-described learning apparatus, for example.

For example, an estimation apparatus according to one aspect of the invention includes: a data acquiring unit configured to acquire object data; an estimating unit configured to estimate, using the learning apparatus according to one aspect of the invention, a feature included in acquired object data using the first encoder and the additional estimator that were trained by the learning apparatus; and an output unit configured to output information regarding the result of estimating the feature.

Also, for example, an estimation apparatus according to one aspect of the invention includes: a data acquiring unit configured to acquire object data; an estimating unit configured to estimate, using the learning apparatus according to one aspect of the invention, a feature included in acquired object data using the first encoder and the additional estimator that were trained by the learning apparatus; and an output unit configured to output information regarding the result of estimating the feature. Note that the additional estimator may be replaced by a trained estimator that is constructed irrespectively to the machine learning of the learning apparatus by the learning apparatus.

Also, the estimation apparatus according to the above-described one aspect may further include an evaluating unit configured to identify the attribute regarding acquisition of the object data using the second encoder and the second metadata identifier that were trained by the learning apparatus, and determine whether or not the result of estimating the feature is adopted based on the identification result. Note that not adopting the estimation result may include discarding, after the estimating unit executed estimation processes, the estimation result, and not executing the estimation processes.

Also, for example, an estimation apparatus according to one aspect of the invention includes: a data acquiring unit configured to acquire object image data; an estimating unit configured to estimate, using the learning apparatus according to any one of the above-described aspects, a feature included in acquired object image data using the first encoder, the second encoder, and the estimator that were trained by the learning apparatus; and an output unit configured to output information regarding the result of estimating the feature.

Also, for example, an estimation apparatus according to one aspect of the invention includes: a data acquiring unit configured to acquire object image data; an estimating unit configured to estimate, using the learning apparatus according to one aspect of the invention, a feature included in acquired object image data using the first encoder and the additional estimator that were trained by the learning apparatus; and an output unit configured to output information regarding the result of estimating the feature. Note that the additional estimator may be replaced by a trained estimator that is constructed irrespectively to the machine learning of the learning apparatus by the learning apparatus.

Also, the estimation apparatus according to the above-described one aspect may further include an evaluating unit configured to identify the attribute regarding acquisition of the object image data using the second encoder and the second metadata identifier that were trained by the learning apparatus, and determine whether or not the result of estimating the feature is adopted based on the identification result. Note that not adopting the estimation result may include discarding, after the estimating unit executed estimation processes, the estimation result, and not executing the estimation processes.

Also, for example, an estimation apparatus according to one aspect of the invention includes: a data acquiring unit configured to acquire object sensing data; an estimating unit configured to estimate, using the learning apparatus according to any one of the above-described aspects, a feature included in acquired object sensing data using the first encoder, the second encoder, and the estimator that were trained by the learning apparatus; and an output unit configured to output information regarding the result of estimating the feature.

Also, for example, an estimation apparatus according to one aspect of the invention includes: a data acquiring unit configured to acquire object sensing data; an estimating unit configured to estimate, using the learning apparatus according to one aspect of the invention, a feature included in acquired object sensing data using the first encoder and the additional estimator that were trained by the learning apparatus; and an output unit configured to output information regarding the result of estimating the feature. Note that the additional estimator may be replaced by a trained estimator that is constructed irrespectively to the machine learning of the learning apparatus by the learning apparatus.

Also, the estimation apparatus according to the above-described one aspect may further include an evaluating unit configured to identify the attribute regarding acquisition of the object sensing data using the second encoder and the second metadata identifier that were trained by the learning apparatus, and determine whether or not the result of estimating the feature is adopted based on the identification result. Note that not adopting the estimation result may include discarding, after the estimating unit executed estimation processes, the estimation result, and not executing the estimation processes.

Also, for example, a data generation apparatus according to one aspect of the invention includes: a data acquiring unit configured to acquire object data; a data generating unit configured to, using the learning apparatus according to the above-described one aspect, acquire an output value from the first encoder as the first feature amount by giving the object data to the first encoder trained by the learning apparatus, and generate decoded data by decoding the object data from the output value acquired from the first encoder using the trained decoder without giving an output value acquired from the second encoder; and a saving processing unit configured to save the generated decoded data in a predetermined storage area.

Also, for example, a data generation apparatus according to one aspect of the invention includes: a data acquiring unit configured to acquire object image data; a data generating unit configured to, using the learning apparatus according to the above-described one aspect, acquire an output value from the first encoder as the first feature amount by giving the object image data to the first encoder trained by the learning apparatus, and generate decoded data by decoding the object image data from the output value acquired from the first encoder using the trained decoder without giving an output value acquired from the second encoder; and a saving processing unit configured to save the generated decoded data in a predetermined storage area.

Also, for example, a data generation apparatus according to one aspect of the invention includes: a data acquiring unit configured to acquire object sensing data; a data generating unit configured to, using the learning apparatus according to the above-described one aspect, acquire an output value from the first encoder as the first feature amount by giving the object sensing data to the first encoder trained by the learning apparatus, and generate decoded data by decoding the object sensing data from the output value acquired from the first encoder using the trained decoder without giving an output value acquired from the second encoder; and a saving processing unit configured to save the generated decoded data in a predetermined storage area.

Also, as another aspect of the learning apparatus, estimation apparatus, data generation apparatus according to the modes described herein, one or more embodiments may also include an information processing method for realizing some of or all of the configurations described herein, a program, or a storage medium that may be read by an apparatus such as a computer, a machine, or the like, and stores such a program. Here, the storage medium that may be read by a computer or the like is a medium that stores information such as programs via an electrical, magnetic, optical, mechanical or chemical effect. Also, one or more embodiments may be a system constituted by the learning apparatus according to any of the modes described herein, and at least one of the estimation apparatus and data generation apparatus according to any of the modes described herein.

For example, a learning method according to one aspect of the invention is an information processing method in which a computer executes: a step of acquiring a plurality of learning data sets that are each constituted by a combination of training data, metadata indicating an attribute regarding acquisition of the training data, and correct answer data indicating a feature included in the training data; and a step of performing machine learning of a learning model including a first encoder, a second encoder, a first metadata identifier, a second metadata identifier, and estimator, wherein the first encoder is configured to convert input data that is given into it to a first feature amount, the second encoder is configured to convert the input data to a second feature amount, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, the estimator is configured to receive output values of the first encoder and the second encoder, and estimate a feature included in the input data from the first feature amount and the second feature amount, the performing the machine learning includes executing: a first training step of training the second encoder and the second metadata identifier such that, with respect to each learning data set, an identification result obtained from the second metadata identifier by giving the training data to the second encoder matches the metadata; a second training step of training the first encoder, the second encoder, and the estimator such that, with respect to each learning data set, an estimation result obtained from the estimator by giving the training data to the first encoder and the second encoder matches the correct answer data; a third training step of training the first metadata identifier such that, with respect to each learning data set, an identification result obtained from the first metadata identifier by giving the training data to the first encoder matches the metadata; a fourth training step of training the first encoder such that, with respect to each learning data set, an identification result obtained from the first metadata identifier by giving the training data to the first encoder does not match the metadata, and the third training step and the fourth training step are alternatingly and repeatedly executed.

Also, for example, a learning program according to one aspect of the invention is a program for causing a computer to execute: a step of acquiring a plurality of learning data sets that are each constituted by a combination of training data, metadata indicating an attribute regarding acquisition of the training data, and correct answer data indicating a feature included in the training data; and a step of performing machine learning of a learning model including a first encoder, a second encoder, a first metadata identifier, a second metadata identifier, and estimator, wherein the first encoder is configured to convert input data that is given into it to a first feature amount, the second encoder is configured to convert the input data to a second feature amount, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, the estimator is configured to receive output values of the first encoder and the second encoder, and estimate a feature included in the input data from the first feature amount and the second feature amount, the performing the machine learning includes executing: a first training step of training the second encoder and the second metadata identifier such that, with respect to each learning data set, an identification result obtained from the second metadata identifier by giving the training data to the second encoder matches the metadata; a second training step of training the first encoder, the second encoder, and the estimator such that, with respect to each learning data set, an estimation result obtained from the estimator by giving the training data to the first encoder and the second encoder matches the correct answer data; a third training step of training the first metadata identifier such that, with respect to each learning data set, an identification result obtained from the first metadata identifier by giving the training data to the first encoder matches the metadata; a fourth training step of training the first encoder such that, with respect to each learning data set, an identification result obtained from the first metadata identifier by giving the training data to the first encoder does not match the metadata, and the third training step and the fourth training step are alternatingly and repeatedly executed.

Effects of the Invention

According to the present invention, a trained model can be constructed whose introduction cost is relatively low and that is robust to the difference in the attribute regarding acquisition of data.

BRIEF DESCRIPTION OF THE DRAWINGS

FIG. 5C is a schematic diagram illustrating an example of a software configuration of a learning apparatus according to one or more embodiments.

FIG. 7 is a schematic diagram illustrating an example of a software configuration of a data generation apparatus according to one or more embodiments.

FIG. 15A is a schematic diagram illustrating an example of a hardware configuration of a monitoring apparatus according to another mode.

FIG. 22A is a schematic diagram illustrating an example of a hardware configuration of a monitoring apparatus according to another mode.

DETAILED DESCRIPTION

Hereinafter, an embodiment according to one aspect of the present invention (also referred to as "the present embodiment" below) will be described based on the drawings. However, the embodiment described below is merely an example of the present invention in every respect. Needless to say, various improvements and modifications may be made without departing from the scope of the present invention. That is to say, to implement the present invention, a specific configuration corresponding to that implementation may also be employed as appropriate. Note that, although data that is used in the embodiment is described using natural language, more specifically, the data is defined by pseudo-language, such data may be given by commands, parameters, machine language, or the like that can be recognized by a computer.

1. Application Example

Figure 1:
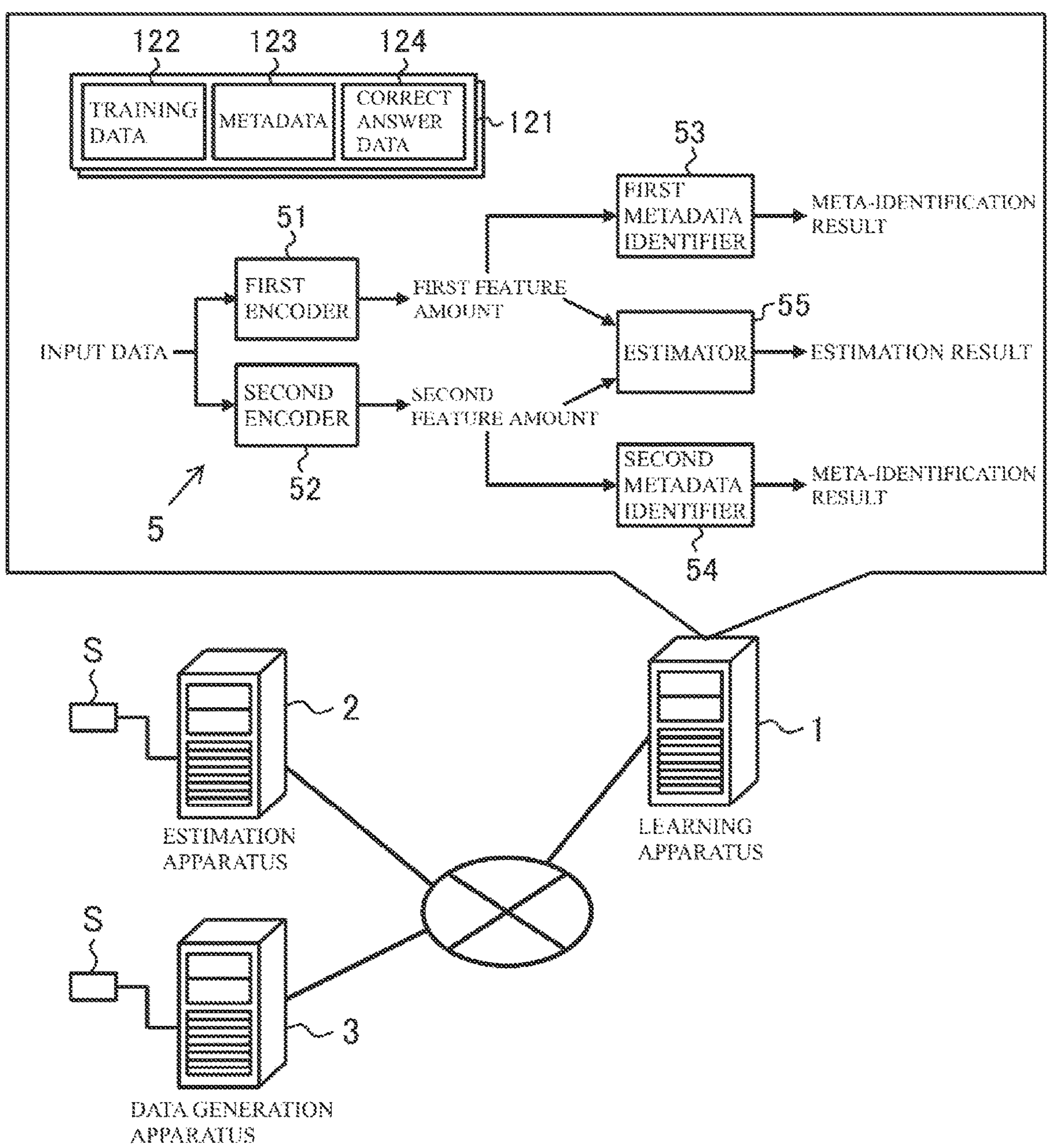
FIG. 1 is a schematic diagram illustrating an example of a scenario to which one or more embodiments are applied.

First, an example of a scenario to which the present invention is applied will be described using FIG. 1. FIG. 1 schematically illustrates an example of the scenario to which the present invention is applied.

As shown in FIG. 1, the system according to the present embodiment includes a learning apparatus 1, an estimation apparatus 2, and a data generation apparatus 3. The machine learning of a learning model 5 is performed by the learning apparatus 1 and the estimation apparatus 2, and an estimation system for estimating a feature included in object data is configured using the result of machine learning. Also, the machine learning of the learning model 5 is performed by the learning apparatus 1 and the data generation apparatus 3, and a data generation system for generating new data relating to the object data is configured using the result of machine learning.

The learning apparatus 1 according to the present embodiment is a computer configured to perform machine learning of the learning model 5. Specifically, the learning apparatus 1 according to the present embodiment acquires a plurality of learning data sets 121. Each learning data set 121 is constituted by a combination of training data 122, metadata 123 indicating an attribute regarding acquisition of the training data 122, and a correct answer data 124 indicating the feature included in the training data 122 (that is, a correct answer of an estimation task with respect to the training data 122).

There is no particular limitation to the type of the training data 122, which may be selected as appropriate depending on the estimation task that the learning model 5 is caused to learn. The training data 122 may be image data, sound data, numerical data, text data, and measurement data obtained by a sensor, for example. In the example in FIG. 1, a scenario in which the learning model 5 is caused to learn the capability of estimating a feature included in sensing data obtained by a sensor S is assumed. Therefore, in the present embodiment, the training data 122 is sensing data obtained by the sensor S or a sensor of the same type (hereinafter, collectively referred to as "sensor S" in which sensors of the same type are included).

The type of the sensor S is not limited in particular, and may be selected as appropriate depending on the estimation task that the learning model 5 is caused to learn. The sensor S may be an image sensor (camera), an infrared sensor, a sound sensor (microphone), an ultrasonic sensor, an optical sensor, a pressure sensor, an atmospheric pressure sensor, or a temperature sensor, for example. Also, the sensor S may be an environment sensor, a vital sensor, an on-board sensor, or a home security sensor, for example. The environment sensor may be a barometer, a thermometer, a hygrometer, a sound pressure sensor, a sound sensor, an ultraviolet sensor, an illumination meter, a precipitation gauge, or a gas sensor, for example. The vital sensor may be a blood-pressure gauge, a pulsimeter, a heart rate meter, an electrocardiographic monitor, an electromyograph, a clinical thermometer, an electro dermal activity sensor, a microwave sensor, an electroencephalograph, a magnetoencephalograph, an activity tracker, a glucometer, an ocular potentiometer, or an eye movement measuring instrument, for example. The in-vehicle sensor may be an image sensor, a laser sensor, or a microwave sensor, for example. The home security sensor may be an image sensor, an infrared sensor, an activity (sound) sensor, gas (e.g., CO2) sensor, a current sensor, or a smart sensor (sensor for measuring a power usage amount of a home electric appliance, illumination, or the like), for example.

The metadata 123 is configured to indicate attributes regarding acquisition of the training data 122. The attributes regarding acquisition of the training data 122 may include any information with which conditions under which the training data 122 was acquired can be identified. For example, the attributes regarding acquisition of the training data 122 may include an attribute regarding time at which the training data 122 was acquired. The attribute regarding time may include a time slot, the day of week, weekday or holiday, month, or season, for example. The time slot may be expressed as morning, daytime, night, or the like, or may be expressed by a predetermined time slot such as from seven to nine o'clock.

Also, in the present embodiment, the training data 122 is obtained by the sensor S, and therefore, the attribute regarding acquisition of the training data 122 may include any type of information regarding the sensor S. For example, the attribute regarding acquisition of the training data 122 may include an attribute regarding the usage mode of the sensor S, an attribute regarding the specification of the sensor S, or an attribute regarding the observation environment of the sensor S. The attribute regarding the usage mode of the sensor S may include an attribute regarding the operation setting of the sensor S, or an attribute regarding the installation conditions of the sensor S, for example. The attribute regarding the operation setting of the sensor S may include setting values of the measurement range, setting values of the resolution of the measurement range, or setting values of the sampling frequency, for example. The attribute regarding the installation conditions of the sensor S may include the installation angle of the sensor S, the ambient temperature of the sensor S, the distance between the sensor S and the object to be observed, or the installation intervals of the sensors S, for example. The attribute regarding the specification of the sensor S may include an attribute regarding the performance of the sensor S, an attribute regarding the apparatus information of the sensor S, or an attribute regarding initial installation conditions of the sensor S, for example. The attribute regarding the performance of the sensor S may include a sensitivity limit, a dynamic range, a settable range of the space resolution, or a settable range of the sampling frequency, of the sensor S, for example. The attribute regarding the apparatus information of the sensor S may include the type of the sensor S, the name of the sensor S, or the description of the sensor S, for example. The attribute regarding initial installation conditions of the sensor S may include information such as a unique name of the installed location, for example. The attribute regarding the observation environment of the sensor S may include a location, weather, temperature, humidity, or an illumination level, for example.

Also, when the training data 122 is obtained with respect to some object, the attribute regarding acquisition of the training data 122 may include any type of information regarding the object. In the present embodiment, an object to be observed by the sensor S may be the object. The attribute regarding acquisition of the training data 122 may include the type of the object, or identification information for identifying the object, for example. When the object is a person, the attribute regarding acquisition of the training data 122 may include identification information (personal information) such as an identifier, gender, age, body build, or the ethnicity of the person (examinee), for example. Also, when the training data 122 is obtained with respect to some action of a person, the attribute regarding acquisition of the training data 122 may include any type of information regarding the action of a person.

The correct answer data 124 is configured to indicate the feature included in training data 122, that is, the correct answer of an estimation task with respect to the training data 122. There is no limitation to the type of features included in the training data 122, and it may be selected as appropriate depending on the embodiment, as long as the feature may serve as an object of estimation (including prediction) tasks such as classification, regression, and the like. Estimating features may include classification, performing regression, and the like. The features may include any elements that can be estimated from data. Estimating the feature may include estimating some element at a time to come. In this case, the feature may include an indication of the element that appears at a time to come. The correct answer data 124 may be determined as appropriate depending on the estimation task that is to be learned. The correct answer data 124 may be constituted by information indicating the category of a feature, information indicating the probability that a feature appears, information indicating the value of a feature, and information indicating the range of a feature in an image, for example.

In a scenario in which the traffic conditions on a road are estimated, for example, a camera, an ultrasonic sensor, an infrared sensor or the like may be used as the sensor S, as sensors for observing vehicles moving on the road. In correspondence therewith, the training data 122 may be image data, data indicating the result of measuring the number of vehicles that have passed per unit time, data indicating the result of measuring the average speed, or the like. The metadata 123 may be constituted by information indicating the attributes of the road, the observation angle of the sensor S, the installation intervals of the sensor S, the type of the sensor S, and the like. The attributes of a road may be an attribute indicating whether or not the road is a straight road, an attribute indicating whether or not the road is a curving road, an attribute indicating whether or not a tollgate of a toll road is present, an attribute indicating whether or not a junction is present, an attribute indicating whether or not a branching point is present, and the like. The correct answer data 124 may be constituted by information regarding traffic conditions on the road. The traffic conditions may be those at the current time that appear in the training data 122, or those at a time to come. The information regarding traffic conditions on a road may be expressed by an item indicating whether or not congestion occurs, the probability that congestion occurs, for how long the congestion occurs, the time required from the installed location of the sensor S to a predetermined location, for example. An item indicating whether or not congestion occurs may also be expressed by whether or not congestion will occur after a predetermined time.

The learning apparatus 1 according to the present embodiment performs machine learning of the learning model 5 using the plurality of acquired learning data sets 121. In the present embodiment, the learning model 5 includes a first encoder 51, a second encoder 52, a first metadata identifier 53, a second metadata identifier 54, and an estimator 55. The first encoder 51 is configured to convert input data that is given into it to a first feature amount. The second encoder 52 is configured to convert input data that is given into it to a second feature amount. There is no particular limitation to the data formats of the feature amounts, and they may be selected as appropriate depending on the embodiment. The first metadata identifier 53 receives an output value (first feature amount) of the first encoder 51, and is configured to identify an attribute regarding the acquisition of input data from the input first feature amount. The second metadata identifier 54 receives an output value (second feature amount) of the second encoder 52, and is configured to identify an attribute regarding the acquisition of input data from the input second feature amount. The estimator 55 receives output values (first feature amount and second feature amount) from the first encoder 51 and the second encoder 52, and is configured to estimate features included in the input data from the input first and second feature amounts.

In the present embodiment, performing machine learning includes first to fourth training steps. In the first training step, the learning apparatus 1 trains the second encoder 52 and the second metadata identifier 54 such that, with respect to each learning data set 121, the identification result obtained from the second metadata identifier 54 by giving the training data 122 to the second encoder 52 matches the metadata 123. In the second training step, the learning apparatus 1 trains the first encoder 51, the second encoder 52, and the estimator 55 such that, with respect to each learning data set 121, the estimation result obtained from the estimator 55 by giving the training data 122 to the first encoder 51 and the second encoder 52 matches the correct answer data 124.

In the third training step, the learning apparatus 1 trains the first metadata identifier 53 such that, with respect to each learning data set 121, the identification result obtained from the first metadata identifier 53 by giving the training data 122 to the first encoder 51 matches the metadata 123. In the fourth training step, the learning apparatus 1 trains the first encoder 51 such that, with respect to each learning data set 121, the identification result obtained from the first metadata identifier 53 by giving the training data 122 to the first encoder 51 does not match the metadata 123. The learning apparatus 1 alternatingly and repeatedly executes the third training step and the fourth training step. Note that, in the following, identification results obtained by the metadata identifiers (53, 54) may also be denoted as "meta-identifications", for the sake of description.

The estimation apparatus 2 according to the present embodiment is a computer configured to perform an estimation task on object data using a trained learning model 5.

In the present embodiment, a sensor S is connected to the estimation apparatus 2. The estimation apparatus 2 acquires object data from the sensor S. The estimation apparatus 2 estimates a feature included in the acquired object data using the trained learning model 5. Also, the estimation apparatus 2 outputs information regarding the estimation result.

The data generation apparatus 3 according to the present embodiment is a computer configured to generate new data relating to object data using a trained learning model 5. In the present embodiment, a sensor S is connected to the data generation apparatus 3. The data generation apparatus 3 acquires object data from the sensor S. The data generation apparatus 3 generate new data relating to the acquired object data using the trained learning model 5. The new data may be at least one of a first feature amount and a second feature amount that are extracted from the acquired object data. Also, the new data may also be decoded data generated by a later-described decoder. The data generation apparatus 3 saves the generated new data in a predetermined storage area.

As described above, in the present embodiment, as a result of performing the first training step of the learning apparatus 1, the second feature amount obtained by the trained second encoder 52 includes a component corresponding to the attribute regarding the acquisition such that the second metadata identifier 54 can appropriately identify an attribute regarding acquisition of the training data 122. Also, with the second training step, the first and second feature amounts obtained by the trained first and second encoders 51 and 52 include a component corresponding to the feature included in the training data 122 (that is, a correct answer of the estimation task). Moreover, in the present embodiment, adversarial learning of the first encoder 51 and the first metadata identifier 53 is performed with the third and fourth training steps. With this, in correspondence with improvement of the identification performance of the first metadata identifier 53, the first feature amount obtained by the trained first encoder 51 does not include a component corresponding to the attribute regarding acquisition of the training data 122 such that the identification by the first metadata identifier 53 fails.

That is, in the present embodiment, as a result of the above-described machine learning, regarding the feature included in the training data 122, the second feature amount obtained by encoding performed by the trained second encoder 52 is likely to include a component corresponding to the metadata 123. In contrast, the first feature amount obtained by the trained first encoder 51 is likely to include a component corresponding to information other than the metadata 123 that relates to the feature included in the training data 122. The estimator 55 is trained to estimate a feature included in the training data 122 from both of the feature amounts. In the above-described scenario in which traffic conditions on a road is estimated, the first feature amount includes a component corresponding to the amount of traffic flow and the tendency of the change in the amount that occurs occasionally, as the information in common across domains, for example. On the other hand, the second feature amount includes a component corresponding to the tendency of the traffic flow that stationarily occurs due to the landform and the tendency of the traffic flow that occurs concurrently at a plurality of points, as information specific to a domain. The estimator 55 can perform a task of estimating the probability that congestion occurs, whether or not congestion occurs, and the like, based on both pieces of information. Therefore, the estimation apparatus 2 according to the present embodiment can execute a task of estimating the feature included in the object data based on both pieces of information specific to a domain from which the object data is acquired and information in common across domains, as a result of using the trained first encoder 51, the second encoder 52, and the estimator 55. Therefore, in a case where information specific to a domain from which object data is acquired is useful for the estimation task, the accuracy of estimating the feature included in the object data can be improved.

Also, if the information specific to the attribute regarding acquisition of object data exerts a bad influence on the accuracy of the estimation task, the estimation apparatus 2 can estimate the feature included in the object data based on the first feature amount obtained by the trained first encoder 51 without using the second feature amount obtained by the trained second encoder 52. Accordingly, when the estimation task is executed, the influence of a component corresponding to the attribute regarding acquisition of object data can be excluded. Therefore, even in a case where the information regarding the attribute regarding acquisition of object data exerts a bad influence on the accuracy of the estimation task, the accuracy of estimating the feature included in the object data can be improved.

In addition, the output value obtained from a trained second encoder 52 as the second feature amount as a result of inputting input data to the second encoder 52 corresponds to the result of estimating the domain of the input data (that is, an attribute regarding acquisition of input data). If this estimation result is correct, the output value obtained from a trained second metadata identifier 54 as a result of inputting an output value obtained from the second encoder 52 to the second metadata identifier 54 (that is, a meta-identification result) matches the attribute regarding acquisition of input data. Therefore, the estimation apparatus 2 according to the present embodiment can determine whether or not the trained learning model 5 can appropriately perform an estimation task on object data by determining whether or not a meta-identification result obtained from the second metadata identifier 54 as a result of inputting the object data to the second encoder 52 matches the attribute regarding acquisition of the object data. With this, when the trained learning model 5 is given object data on which an estimation task cannot be appropriately performed, the estimation task can be avoided from being performed on the object data. Also, when a plurality of learning models 5 that are trained by learning data sets obtained from different domains are present, an appropriate trained learning model 5 can be selected with respect to the object data.

Moreover, in the present embodiment, two encoders, namely the first encoder 51 and the second encoder 52, are prepared. The first encoder 51 plays a role of extracting a feature amount (first feature amount) that includes a component corresponding to information other than the attribute regarding acquisition of data. The second encoder 52 plays a role of extracting a feature amount (second feature amount) corresponding to the attribute regarding acquisition of data. The first encoder 51 and the second encoder 52 can be used in common on object data obtained from different domains. Therefore, in the present embodiment, an extractor need not be prepared for every domain from which object data is acquired.

Therefore, according to the present embodiment, time and effort for preparing a trained extractor for every domain from which object data is acquired can be saved. Also, in both of the case where information specific to the attribute regarding acquisition of object data is useful for an estimation task and the case where the information exerts a bad influence on the estimation task, a trained learning model 5 that can execute the estimation task with relatively high accuracy can be constructed. Moreover, as a result of using the trained second encoder 52 and the second metadata identifier 54, it can be evaluated whether or not the trained learning model 5 can appropriately perform the estimation task on object data. Based on the evaluation result, a trained learning model 5 can be prevented from being used on object data on which an estimation task cannot be appropriately performed, and a trained learning model 5 that is suitable for the object data can be selected. Therefore, according to the present embodiment, a trained learning model 5 whose introduction cost is relatively low and that is robust to the difference in the attribute regarding acquisition of object data can be constructed.

Note that, in the example in FIG. 1, the learning apparatus 1, the estimation apparatus 2, and the data generation apparatus 3 are connected to each other via a network. The type of the network may be selected as appropriate from the Internet, a wireless communication network, a mobile communication network, telephone network, a dedicated network, and the like. Note that the method of transmitting and receiving data between the apparatuses 1 to 3 is not limited to this example, and may be selected as appropriate depending on the embodiment. For example, the learning apparatus 1, the estimation apparatus 2, and the data generation apparatus 3 may transmit and receive data using a storage medium.

Also, in the example in FIG. 1, the learning apparatus 1, the estimation apparatus 2, and the data generation apparatus 3 are separate computers. However, the configuration of the system according to the present embodiment is not limited to this example, and may be determined as appropriate depending on the embodiment. For example, at least one of pairs of the learning apparatus 1, the estimation apparatus 2, and the data generation apparatus 3 may be constituted by one computer. Also, at least one of the learning apparatus 1, the estimation apparatus 2, and the data generation apparatus 3 may be constituted by a plurality of computers.

2. Exemplary Configuration

[Hardware Configuration]

Figure 2:
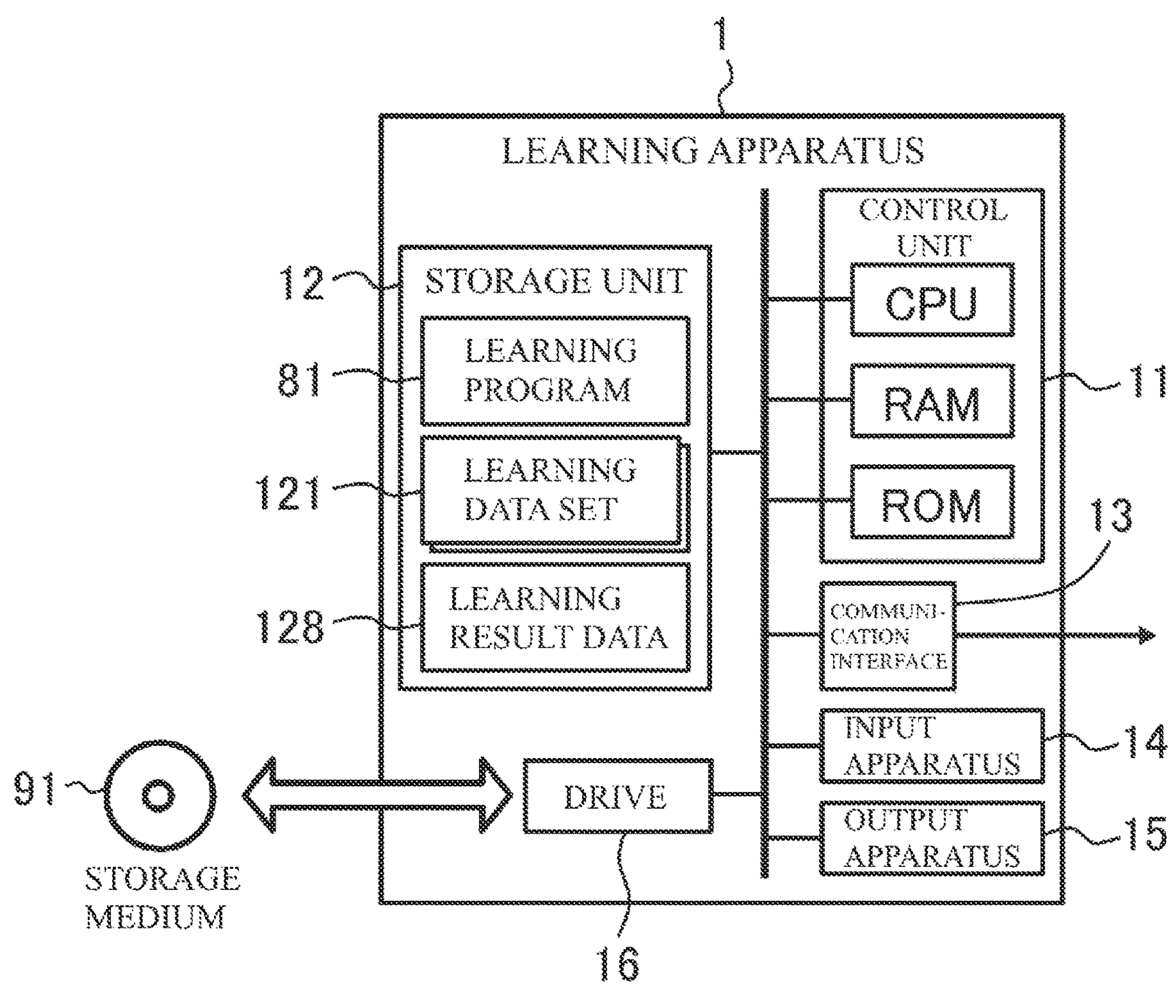
FIG. 2 is a schematic diagram illustrating an example of a hardware configuration of a learning apparatus according to one or more embodiments.

Next, an example of the hardware configuration of the learning apparatus 1 according to the present embodiment will be described using FIG. 2. FIG. 2 schematically illustrates an example of the hardware configuration of the learning apparatus 1 according to the present embodiment.

As shown in FIG. 2, the learning apparatus 1 according to the present embodiment is a computer in which a control unit 11, a storage unit 12, a communication interface 13, an input apparatus 14, an output apparatus 15, and a drive 16 are electrically connected. Note that, in FIG. 2, the communication interface is denoted as "communication I/F".

The control unit 11 includes a CPU (central processing unit), which is a hardware processor, a RAM (random access memory), ROM (read only memory), and the like, and is configured to execute information processes based on a program and various types of data. The storage unit 12 is an example of a memory, and is constituted by a hard disk drive, a solid-state drive, or the like. In the present embodiment, the storage unit 12 stores various types of information such as a learning program 81, a plurality of learning data sets 121, and learning result data 128.

The learning program 81 is a program for the learning apparatus 1 to execute later-described information processes (FIGS. 8 and 9) relating to machine learning of a learning model 5. The learning program 81 includes series of commands of the information processes. The plurality of learning data sets 121 are used for machine learning of the learning model 5. The learning result data 128 indicates information regarding a trained learning model 5. The learning result data 128 is obtained as a result of executing the learning program 81. The details will be described later.

The communication interface 13 is a wired LAN (Local Area Network) module, a wireless LAN module, or the like, and is an interface for performing wired or wireless communication via a network. The learning apparatus 1 can perform data communication with another information processing apparatus (e.g., estimation apparatus 2 and data generation apparatus 3) via the network by using the communication interface 13.

The input apparatus 14 is an apparatus for performing input, such as a mouse or a keyboard. Also, the output apparatus 15 is an apparatus for performing output, such as a display, a speaker, or the like. An operator can operate the learning apparatus 1 via the input apparatus 14 and the output apparatus 15. The input apparatus 14 and the output apparatus 15 may also be integrally formed by a touch panel display or the like.

The drive 16 is a CD drive, a DVD drive, or the like, and is a drive apparatus for reading a program stored in a storage medium 91. The type of the drive 16 may be selected as appropriate according to the type of the storage medium 91. At least one of the aforementioned learning program 81 and plurality of learning data sets 121 may be stored in the storage medium 91.

The storage medium 91 is a medium that stores information such as programs via an electrical, magnetic, optical, mechanical or chemical effect such that the stored information such as the programs can be read by an apparatus or a machine such as a computer. The learning apparatus 1 may also acquire at least one of the above-described learning program 81 and plurality of learning data sets 121 from the storage medium 91.

Here, in FIG. 2, a disk-type storage medium such as a CD or a DVD is illustrated as an example of the storage medium 91. However, the type of the storage medium 91 is not limited to the disk type, and may be a medium other than a disk type medium. Storage media other than a disk type medium include a semiconductor memory such as a flash memory, for example.

Note that, regarding the specific hardware configuration of the learning apparatus 1, constituent elements can be omitted, replaced, and added as appropriate depending on the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the input apparatus 14, the output apparatus 15, and the drive 16 may be omitted. The learning apparatus 1 may also be constituted by a plurality of computers. In this case, the hardware configuration of the computers may be the same, or may not be the same. Also, the learning apparatus 1 may be a general-purpose server apparatus, a general-purpose PC (Personal Computer), or the like, instead of an information processing apparatus that is specifically designed for the service to be provided.

<Estimation Apparatus>

Figure 3:
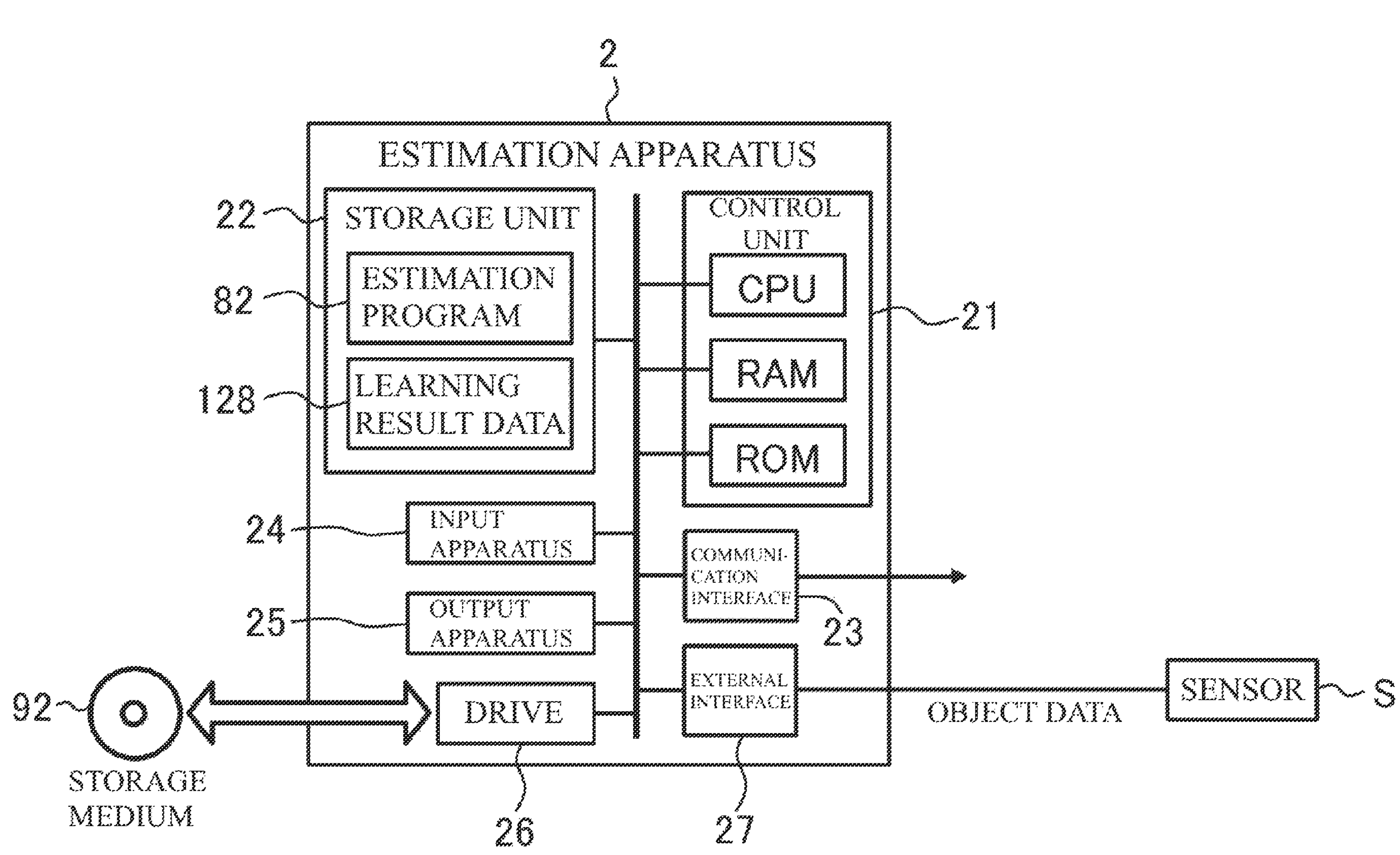
FIG. 3 is a schematic diagram illustrating an example of a hardware configuration of an estimation apparatus according to one or more embodiments.

Next, an example of the hardware configuration of the estimation apparatus 2 according to the present embodiment will be described using FIG. 3. FIG. 3 schematically illustrates an example of the hardware configuration of the estimation apparatus 2 according to the present embodiment.

As shown in FIG. 3, the estimation apparatus 2 according to the present embodiment is a computer in which a control unit 21, a storage unit 22, a communication interface 23, an input apparatus 24, an output apparatus 25, a drive 26, and an external interface 27 are electrically connected. Note that, in FIG. 3, the external interface is denoted as "external I/F". The units from the control unit 21 to the drive 26 of the estimation apparatus 2 according to the present embodiment are configured similarly to the units from the control unit 11 to the drive 16 of the above-described learning apparatus 1.

That is, the control unit 21 includes a CPU, which is a hardware processor, a RAM, a ROM, and the like, and is configured to execute information processes based on a program and various types of data. The storage unit 22 is constituted by a hard disk drive, a solid-state drive, or the like. In the present embodiment, the storage unit 22 stores various types of information such as an estimation program 82, and learning result data 128.

The estimation program 82 is a program for the estimation apparatus 2 to execute later-described information processes (FIG. 10) for estimating the feature included in the object data using the trained learning model 5. The estimation program 82 includes series of commands of the information processes. The details will be described later.

The communication interface 23 is a wired LAN (local area network) module, a wireless LAN module, or the like, and is an interface for performing wired or wireless communication via a network. The estimation apparatus 2 can perform data communication with another information processing apparatus (e.g., learning apparatus 1) via the network by using the communication interface 23.

The input apparatus 24 is an apparatus for performing input, such as a mouse or a keyboard. Also, the output apparatus 25 is an apparatus for performing output, such as a display, a speaker, or the like. An operator can operate the estimation apparatus 2 via the input apparatus 24 and the output apparatus 25. The input apparatus 24 and the output apparatus 25 may also be integrally formed by a touch panel display or the like.

The drive 26 is a CD drive, a DVD drive, or the like, and is a drive apparatus for reading a program stored in a storage medium 92. At least one of the above-described estimation program 82 and learning result data 128 may be stored in the storage medium 92. Also, the estimation apparatus 2 may also acquire at least one of the above-described estimation program 82 and learning result data 128 from the storage medium 92. The type of the storage medium 92 may be a disk type, or may be a type other than the disk type.

The external interface 27 is a USB (universal serial bus) port, a dedicated port, or the like, and is an interface for connecting to an external apparatus. The type and the number of external interfaces 27 may be selected as appropriate according to the type and the number of external apparatuses to be connected. In the present embodiment, the estimation apparatus 2 is connected to the sensor S via the external interface 27.

The sensor S is used for acquiring object data on which the estimation task is to be performed. There is no particular limitation to the type and arrangement location of the sensor S, which may be determined as appropriate depending on the type of the estimation task to be performed. Note that the method for connection with the sensor S is not limited to this example. If the sensor S includes a communication interface, for example, the estimation apparatus 2 may be connected to the sensor S via the communication interface 23, instead of the external interface 27.

Note that, regarding the specific hardware configuration of the estimation apparatus 2, constituent elements can be omitted, replaced, and added as appropriate depending on the embodiment. For example, the control unit 21 may include a plurality of hardware processors. The hardware processor may also be constituted by a microprocessor, an FPGA, a DSP, and the like. The storage unit 22 may also be constituted by the RAM and ROM included in the control unit 21. At least one of the communication interface 23, the input apparatus 24, the output apparatus 25, the drive 26, and the external interface 27 may be omitted. The estimation apparatus 2 may also be constituted by a plurality of computers. In this case, the hardware configuration of the computers may be the same, or may not be the same. Also, the estimation apparatus 2 may also be a general-purpose server apparatus, a general-purpose PC, or the like, instead of an information processing apparatus that is specifically designed for the service to be provided.

<Data Generation Apparatus>

Figure 4:
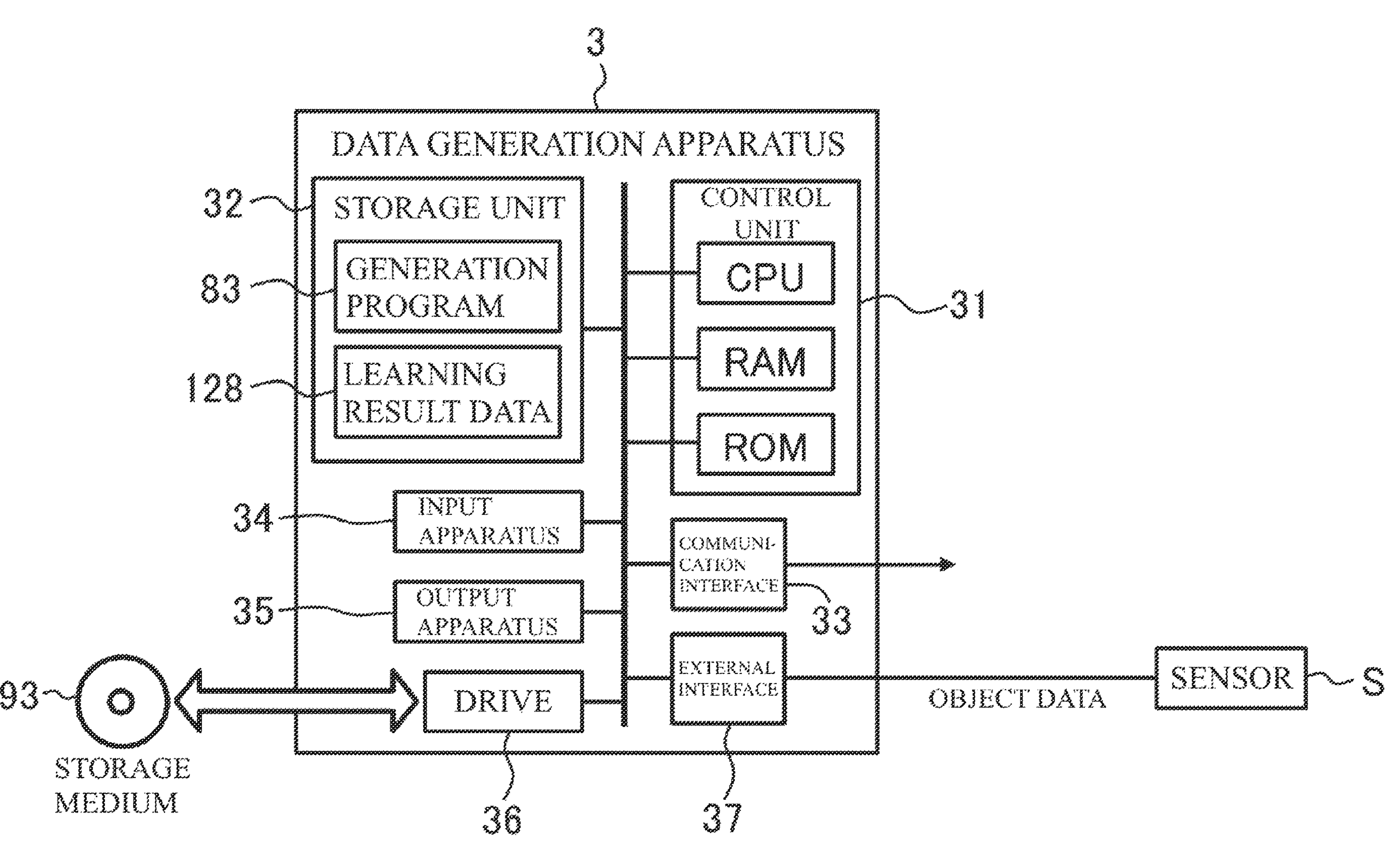
FIG. 4 is a schematic diagram illustrating an example of a hardware configuration of a data generation apparatus according to one or more embodiments.

Next, an example of the hardware configuration of the data generation apparatus 3 according to the present embodiment will be described using FIG. 4. FIG. 4 schematically illustrates an example of the hardware configuration of the data generation apparatus 3 according to the present embodiment.

As shown in FIG. 4, the data generation apparatus 3 according to the present embodiment is a computer in which a control unit 31, a storage unit 32, a communication interface 33, an input apparatus 34, an output apparatus 35, a drive 36, and an external interface 37 are electrically connected. The units from the control unit 31 to the external interface 37 of the data generation apparatus 3 are configured similarly to the units from the control unit 21 to the external interface 27 of the above-described estimation apparatus 2.

That is, the control unit 31 includes a CPU, which is a hardware processor, a RAM, a ROM, and the like, and is configured to execute information processes based on a program and various types of data. The storage unit 32 is constituted by a hard disk drive, a solid-state drive, or the like. The storage unit 32 stores various types of information such as a generation program 83 and learning result data 128.

The generation program 83 is for the data generation apparatus 3 to execute later-described information processes (FIG. 11) for generating new data relating to object data using the trained learning model 5. The generation program 83 includes series of commands of the information processes. The details will be described later.

The communication interface 33 is a wired LAN (Local Area Network) module, a wireless LAN module, or the like, and is an interface for performing wired or wireless communication via a network. The data generation apparatus 3 can perform data communication with another information processing apparatus (e.g., learning apparatus 1) via the network by using the communication interface 33.

The input apparatus 34 is an apparatus for performing input, such as a mouse or a keyboard. Also, the output apparatus 35 is an apparatus for performing output, such as a display, a speaker, or the like. An operator can operate the data generation apparatus 3 via the input apparatus 34 and the output apparatus 35. The input apparatus 34 and the output apparatus 35 may also be integrally formed by a touch panel display or the like.

The drive 36 is a CD drive, a DVD drive, or the like, and is a drive apparatus for reading a program stored in a storage medium 93. At least one of the above-described generation program 83 and learning result data 128 may be stored in the storage medium 93. Also, the data generation apparatus 3 may also acquire at least one of the above-described generation program 83 and learning result data 128 from the storage medium 93. The type of the storage medium 93 may be a disk type, or may be a type other than the disk type.

The external interface 37 is a USB port, a dedicated port, or the like, and is an interface for connecting to an external apparatus. The type and the number of external interfaces 37 may be selected as appropriate according to the type and the number of external apparatuses to be connected. In the present embodiment, the data generation apparatus 3 is connected to a sensor S via the external interface 37. The type and arrangement location of the sensor S is not limited in particular, and may be determined as appropriate depending on the type of the estimation task to be performed. Note that the method for connection with the sensor S is not limited to this example. If the sensor S includes a communication interface, for example, the data generation apparatus 3 may be connected to the sensor S via the communication interface 33, instead of the external interface 37.

Note that, regarding the specific hardware configuration of the data generation apparatus 3, constituent elements can be omitted, replaced, and added as appropriate depending on the embodiment. For example, the control unit 31 may include a plurality of hardware processors. The hardware processor may also be constituted by a microprocessor, an FPGA, a DSP, and the like. The storage unit 32 may also be constituted by the RAM and ROM included in the control unit 31. At least one of the communication interface 33, the input apparatus 34, the output apparatus 35, the drive 36, and the external interface 37 may be omitted. The data generation apparatus 3 may also be constituted by a plurality of computers. In this case, the hardware configuration of the computers may be the same, or may not be the same. Also, the data generation apparatus 3 may also be a general-purpose server apparatus, a general-purpose PC, or the like, instead of an information processing apparatus that is specifically designed for the service to be provided.

[Software Configuration]

<Learning Apparatus>

Next, an example of the software configuration of the learning apparatus 1 according to the present embodiment will be described using FIGS. 5A to 5D. FIGS. 5A to 5D schematically illustrates an example of the software configuration of the learning apparatus 1 according to the present embodiment and information processes performed by the modules.

The control unit 11 of the learning apparatus 1 deploys the learning program 81 stored in the storage unit 12 in the RAM. Then, the control unit 11 controls the constituent elements by the CPU interpreting and executing the learning program 81 deployed in the RAM, and executing a series of commands included in the learning program 81. With this, as shown in FIGS. 5A to 5D, the learning apparatus 1 according to the present embodiment operates as a computer including a data acquiring unit 111, a learning processing unit 112, and a saving processing unit 113 as software modules. That is, in the present embodiment, the software modules of the learning apparatus 1 are realized by the control unit 11 (CPU).

The data acquiring unit 111 acquires a plurality of learning data sets 121. In the present embodiment, each learning data set 121 is constituted by a combination of training data 122, metadata 123 indicating the attribute regarding acquisition of the training data 122, correct answer data 124 indicating the feature included in the training data 122, and different correct answer data 125 indicating a different feature included in the training data 122. At least one first learning data set and at least one second learning data set included in the plurality of learning data sets 121 may be acquired from different domains such that the attributes indicated by the respective pieces of metadata 123 differ.

It is desirable that the different feature or features indicated by the different correct answer data 125 is different from the feature indicated by the correct answer data 124, and is a feature that appears in common across domains from which training data 122 is acquired. Information that appears in common across domains is information that is irrespective of the attributes regarding acquisition of the training data 122 indicated by the metadata 123. Assume a scenario in which image data of an image of a product is given as the training data 122 in order to construct a trained model to be used for visual inspection, for example. In this scenario, information indicating whether or not a defect that occurs in a product is present is information that is hardly dependent on the attribute regarding acquisition of the image data. Therefore, the different correct answer data 125 may indicate whether or not a defect is present, as the different feature included in the training data 122. In this case, the correct answer data 124 may indicate information other than this information, such as information regarding the type of a defect, as the feature included in the training data 122. If the different correct answer data 125 indicating a feature that appears in common across domains is given, it is preferable that the correct answer data 124 indicates a feature with which the estimation accuracy may improve with information specific to a domain.

The learning processing unit 112 performs machine learning of the learning model 5 using a plurality of acquired learning data sets 121. As described above, the learning model 5 includes the first encoder 51, the second encoder 52, the first metadata identifier 53, the second metadata identifier 54, and the estimator 55. In the present embodiment, the learning model 5 further includes a decoder 56 and an additional estimator 57, in addition thereto. The first encoder 51 and the second encoder 52 are arranged in parallel on the input side. The output of the first encoder 51 is connected to the inputs of the first metadata identifier 53, the estimator 55, the decoder 56, and the additional estimator 57. The output of the second encoder 52 is connected to the inputs of the second metadata identifier 54, the estimator 55, and the decoder 56. With this, the output value (first feature amount) of the first encoder 51 is input to the first metadata identifier 53 and the additional estimator 57. The output value (second feature amount) of the second encoder 52 is input to the second metadata identifier 54. The output values (first and second feature amounts) of the first encoder 51 and the second encoder 52 are input to the estimator 55 and the decoder 56.

The first encoder 51 is configured to convert input data that is given into it to a first feature amount. The second encoder 52 is configured to convert input data that is given into it to a second feature amount. The first metadata identifier 53 is configured to identify the attribute regarding acquisition of input data from the first feature amount obtained by the first encoder 51. The second metadata identifier 54 is configured to identify the attribute regarding acquisition of input data from the second feature amount obtained by the second encoder 52. The estimator 55 is configured to estimate the feature included in input data from the first and second feature amounts obtained by the first encoder 51 and the second encoder 52. The decoder 56 is configured to decode the input data from the first and second feature amounts obtained by the first encoder 51 and the second encoder 52. The additional estimator 57 is configured to estimate the feature included in input data (a feature indicated by the correct answer data 124 or a different feature indicated by the different correct answer data 125) from the first feature amount obtained by the first encoder 51.

In a learning phase, training data 122 of a learning data set 121 is input data. On the other hand, in a usage phase, object data (later-described object data (221, 321)) is input data. The input data may be constituted by a plurality of different types of data such as a combination of image data and sound data. In this case, the first encoder 51 and the second encoder 52 are prepared for every type of the input data. That is, the first encoder 51 and the second encoder 52 may each include a plurality of partial encoders. Each partial encoder may be configured to receive an input of data of the corresponding type and convert the input data of the corresponding type to a feature amount. In this case, the first and second feature amounts are calculated for every type of the input data. The calculated first feature amounts are input to the first metadata identifier 53, the estimator 55, the decoder 56, and the additional estimator 57. Also, the calculated second feature amounts are input to the second metadata identifier 54, the estimator 55, and the decoder 56.

Figure 5A:
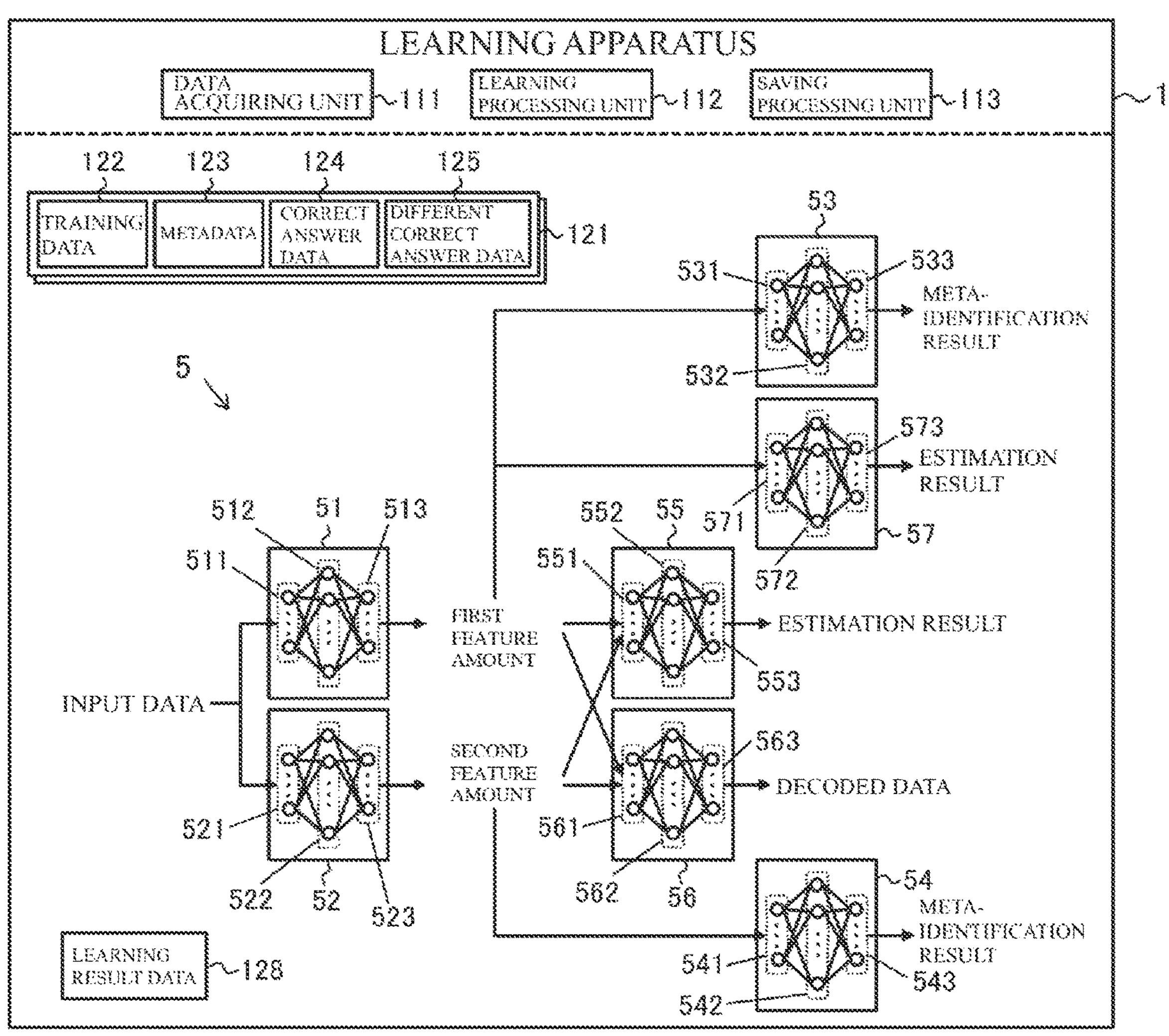
FIG. 5A is a schematic diagram illustrating an example of a software configuration of a learning apparatus according to one or more embodiments.
Figure 5B:
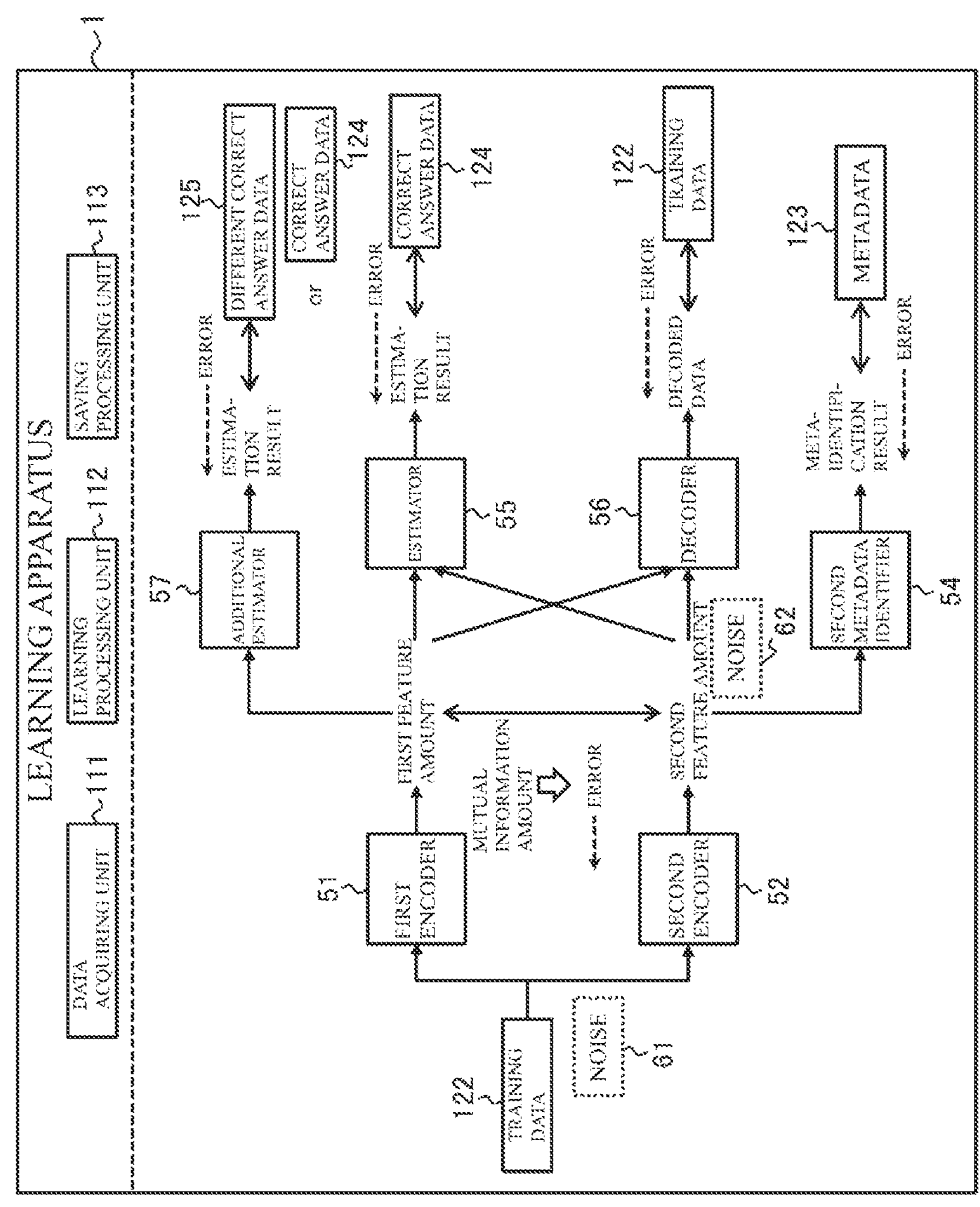
FIG. 5B is a schematic diagram illustrating an example of a software configuration of the learning apparatus according to one or more embodiments.

As shown in FIGS. 5B and 5C, the machine learning process includes the above-described first to fourth training steps. As shown in FIG. 5B, in the first training step, the learning processing unit 112 trains the second encoder 52 and the second metadata identifier 54 such that, with respect to each learning data set 121, the identification result obtained from the second metadata identifier 54 by giving the training data 122 to the second encoder 52 matches the metadata 123. With the first training step, the second encoder 52 is trained such that the second feature amount includes a component corresponding to the attribute regarding acquisition of the training data 122 indicated by the metadata 123. In the second training step, the learning processing unit 112 trains the first encoder 51, the second encoder 52, and the estimator 55 such that, with respect to each learning data set 121, the estimation result obtained from the estimator 55 by giving training data 122 to the first encoder 51 and the second encoder 52 matches the correct answer data 124.

As shown in FIG. 5C, in the third training step, the learning processing unit 112 trains the first metadata identifier 53 such that, with respect to each learning data set 121, the identification result obtained from the first metadata identifier 53 by giving the training data 122 to the first encoder 51 matches the metadata 123. In the fourth training step, the learning processing unit 112 trains the first encoder 51 such that, with respect to each learning data set 121, the identification result obtained from the first metadata identifier 53 by giving the training data 122 to the first encoder 51 does not match the metadata 123. The learning processing unit 112 alternatingly and repeatedly executes the third training step and the fourth training step. With the fourth training step, the first encoder 51 may be trained such that the first feature amount includes a component corresponding to information that appears in common across domains from which training data 122 of learning data sets 121 are obtained.

As shown in FIG. 5B, in the present embodiment, the machine learning process further includes fifth to seventh training steps, in addition to the first to fourth training steps. In the fifth training step, the learning processing unit 112 trains the first encoder 51 and the second encoder 52 such that, with respect to each learning data set 121, the mutual information amount decreases between the output value obtained from the first encoder 51 as the first feature amount by giving the training data 122 to the first encoder 51 and the output value obtained from the second encoder 52 as the second feature amount by giving the training data 122 to the second encoder 52. In the sixth training step, the learning processing unit 112 trains the first encoder 51, the second encoder 52, and the decoder 56 such that, with respect to each learning data set 121, the decoded data obtained from the decoder 56 by giving the training data 122 to the first encoder 51 and the second encoder 52 matches the training data 122.

In the seventh training step, the learning processing unit 112 trains the first encoder 51 and the additional estimator 57 such that, with respect to each learning data set 121, the estimation result obtained from the additional estimator 57 by giving the training data 122 to the first encoder 51 matches the correct answer data 124 or the different correct answer data 125. In the seventh training step, if correct answer data 124 is used, and different correct answer data 125 is not used, the different correct answer data 125 may be omitted from learning data sets 121. In this case, it is desirable that the feature indicated by the correct answer data 124 is a feature that appears in common across domains from which the training data 122 is acquired.

The saving processing unit 113 generates information regarding the trained learning model 5 as the learning result data 128. Also, the saving processing unit 113 saves the generated learning result data 128 in a predetermined storage area. The predetermined storage area may be the RAM in the control unit 11, the storage unit 12, the storage medium 91, or an external storage apparatus, or a combination of these, for example.

[Configurations of Devices]

Next, the configurations of the devices 51 to 57 will be described. Any model that can perform machine learning may be used as the devices 51 to 57. As shown in FIG. 5A, in the present embodiment, the devices 51 to 57 are each constituted by a multi-layered neural network to be used for deep learning. The devices 51 to 57 includes input layers (511, 521, 531, 541, 551, 561, 571), intermediate (hidden) layers (512, 522, 532, 542, 552, 562, 572), and output layers (513, 523, 533, 543, 553, 563, 573).

Note that the structures of the devices 51 to 57 are not limited to this example, and may be determined as appropriate depending on the embodiment. For example, the number of intermediate layers (512, 522, 532, 542, 552, 562, 572) is not limited to one, and may be two or more. Also, in at least one of the combinations of the devices 51 to 57, the structures may be at least partially the same. Alternatively, the structures of the devices 51 to 57 may also not be the same.

The layers (511 to 513, 521 to 523, 531 to 533, 541 to 543, 551 to 553, 561 to 563, 571 to 573) each include at least one neuron (node). There is no particular limitation to the numbers of neurons (nodes) included in the layers (511 to 513, 521 to 523, 531 to 533, 541 to 543, 551 to 553, 561 to 563, 571 to 573), and they may be selected as appropriate depending on the embodiment.

Neurons in the adjacent layers are connected as appropriate, and a weight (connection load) is set for each connection. Also, a threshold value is set for each neuron, and the output of each neuron is basically determined based on whether or not the sum of products of inputs and respective weights exceeds the threshold value. The weights of connections between neurons included in the layers (511 to 513, 521 to 523, 531 to 533, 541 to 543, 551 to 553, 561 to 563, 571 to 573) and the threshold values of the neurons are examples of the computation parameters of the devices 51 to 57.

The computation parameters of the devices 51 to 57 are used for computation processes of the devices 51 to 57, and are adjusted in the above-described training steps of machine learning. Specifically, in the first training step, the learning processing unit 112 inputs the training data 122 of a learning data set 121 to the input layer 521 of the second encoder 52, and acquires an output value (meta-identification result) from the output layer 543 of the second metadata identifier 54. The learning processing unit 112 adjusts the computation parameters of the second encoder 52 and the second metadata identifier 54 such that the error between the acquired output value and the metadata 123 decreases.

In the second training step, the learning processing unit 112 inputs the training data 122 of a learning data set 121 to the input layers (511, 512) of the encoders (51, 52), and acquires an output value (identification result) from the output layer 553 of the estimator 55. The learning processing unit 112 adjusts the computation parameters of the first encoder 51, the second encoder 52, and the estimator 55 such that the error between the acquired output value and the correct answer data 124 decreases.

In the third training step, the learning processing unit 112 inputs the training data 122 of a learning data set 121 to the input layer 511 of the first encoder 51, and acquires an output value (meta-identification result) from the output layer 533 of the first metadata identifier 53. The learning processing unit 112 adjusts the computation parameters of the first metadata identifier 53 such that the error between the acquired output value and the metadata 123 decreases. In the third training step, the computation parameters of the first metadata identifier 53 are adjusted; by contrast, the values of the computation parameters of the first encoder 51 are fixed.

In contrast, in the fourth training step, the learning processing unit 112 inputs the training data 122 of a learning data set 121 to the input layer 511 of the first encoder 51, and acquires an output value (meta-identification result) from the output layer 533 of the first metadata identifier 53. The learning processing unit 112 adjusts the computation parameters of the first encoder 51 such that the error between the acquired output value and the metadata 123 increases. In the fourth training step, the values of the computation parameters of the first encoder 51 are adjusted; by contrast, the values of the computation parameters of the first metadata identifier 53 are fixed.

Note that, in the fourth training step, the learning processing unit 112 may also acquire, with respect to each learning data set 121, dummy metadata 129 that corresponds to the metadata 123 and includes a value that is different from that of the metadata 123. In this case, training the first encoder 51 such that the identification result obtained from the first metadata identifier 53 does not match the metadata 123 may be constituted by training the first encoder 51 such that the identification result obtained from the first metadata identifier 53 by giving the training data 122 to the first encoder 51 matches the dummy metadata 129. In other words, the learning processing unit 112 may adjust the values of the computation parameters of the first encoder 51 such that the error between the output value obtained from the output layer 533 of the first metadata identifier 53 by inputting the training data 122 of a learning data set 121 to the input layer 511 of the first encoder 51 and the dummy metadata 129 decreases.

In the fifth training step, the learning processing unit 112 inputs the training data 122 of a learning data set 121 to the input layers (511, 521) of the encoders (51, 52), and acquires output values (first and second feature amounts) from the output layers (513, 523) of the encoders (51, 52). The learning processing unit 112 calculates the mutual information amount between the first feature amount obtained from the first encoder 51 and the second feature amount obtained from the second encoder 52. Also, the learning processing unit 112 adjusts at least one of the computation parameters of the first encoder 51 and the second encoder 52 such that the error derived from the calculated mutual information amount decreases. The error derived from the mutual information amount may be the value of the mutual information amount itself, or may be calculated by applying a predetermined operation such as taking the square or logarithm of the value of the mutual information amount.

In the sixth training step, the learning processing unit 112 inputs the training data 122 of a learning data set 121 to the input layers (511, 521) of the encoders (51, 52), and acquires output data (decoded data) from the output layer 563 of the decoder 56. The learning processing unit 112 adjusts the values of the computation parameters of the first encoder 51, the second encoder 52, and the decoder 56 such that the error between the acquired output data and the training data 122 decreases.

In the seventh training step, the learning processing unit 112 inputs the training data 122 of a learning data set 121 to the input layer 511 of the first encoder 51, and acquires an output value (estimation result) from the output layer 573 of the additional estimator 57. The learning processing unit 112 adjusts the values of the computation parameters of the first encoder 51 and the additional estimator 57 such that the error between the acquired output value and the correct answer data 124 or the different correct answer data 125 decreases.

Note that when the third training step and the fourth training step are alternatingly and repeatedly executed, the first, second, and fifth to seventh training steps may also be repeatedly executed. In other words, in the course of repeating adjustment of the values of the computation parameters in the first to seventh training steps, the learning processing unit 112 may alternatingly and repeatedly perform adjustment of the values of the computation parameters in the third and fourth training steps. Alternatively, the first, second, and fifth to seventh training steps may be executed as prior learning of adversarial learning in the third and fourth training steps. In other words, the learning processing unit 112 may, after completing the adjustment of the values of the computation parameters in the first, second, and fifth to seventh training steps, alternatingly and repeatedly adjust the values of the computation parameters in the third and fourth training steps.

Also, the first, second, and fifth to seventh training steps may be separately executed. In other words, the learning processing unit 112 may separately execute adjustment of the values of the computation parameters in the first, second, and fifth to seventh training steps. Alternatively, at least one of the combinations of the first, second, and fifth to seventh training steps may be executed at the same time. For example, a scenario is possible in which the first and second training steps are executed at the same time. In this scenario, the learning processing unit 112 may input training data 122 to the encoders (51, 52), and acquire output values from the second metadata identifier 54 and the estimator 55. Next, the learning processing unit 112 may calculate an error between the output value of the second metadata identifier 54 and the corresponding metadata 123, and an error between the output value of the estimator 55 and the corresponding correct answer data 124. Moreover, the learning processing unit 112 may also adjust values of the computation parameters of the first encoder 51, the second encoder 52, the second metadata identifier 54, and the estimator 55 such that these errors decrease.

Also, in the present embodiment, in the above-described first to seventh training steps, noise 61 may be input to the encoders (51, 52) along with the training data 122. Thereafter, the above-described trainings may be performed. Note that the mode of inputting noise 61 along with training data 122 is not limited to this example. Inputting of noise 61 may be omitted in at least one of the first to seventh training steps.

Also, in the present embodiment, an output value may be acquired from the second encoder 52, as the second feature amount, by giving training data 122 to the second encoder 52, in the first, second, and sixth training steps. Also, the trainings may be performed by inputting noise 62 to the second metadata identifier 54, the estimator 55, and the decoder 56 along with the acquired output value (second feature amount). Note that the mode of inputting noise 62 along with the second feature amount is not limited to this example. Inputting noise 62 may be omitted in at least one of the first, second, and sixth training steps.

Figure 5D:
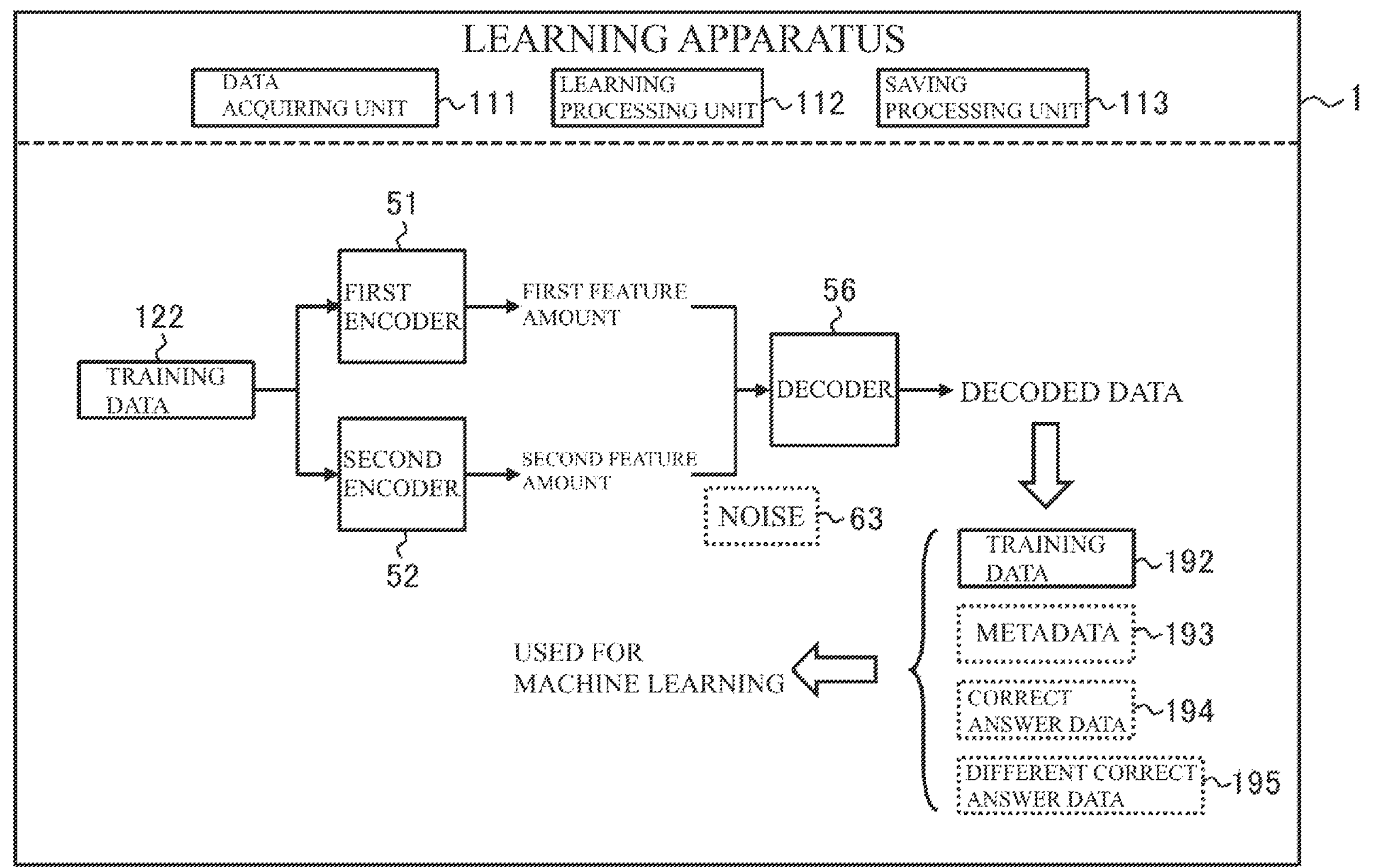
FIG. 5D is a schematic diagram illustrating an example of a software configuration of a learning apparatus according to one or more embodiments.

Moreover, as shown in FIG. 5D, in the present embodiment, the data acquiring unit 111 may acquire an output value serving as the first feature amount from the first encoder 51 by giving training data 122 of at least one of the plurality of learning data sets 121 to the first encoder 51, after the learning processing unit 112 has performed machine learning of the learning model 5. Also, the data acquiring unit 111 may also acquire an output value serving as the second feature amount from the second encoder 52 by giving the training data 122 to the second encoder 52 as well. Then, the data acquiring unit 111 may acquire an output data as the decoded data from the decoder 56, by inputting the output value (first feature amount) acquired from the first encoder 51 to the decoder 56 and inputting the noise 63 to the decoder 56 along with the output value (second feature amount) acquired from the second encoder 52. There is no particular limitation to the method for inputting noise 63 along with a second feature amount and the type of the noise 63, and it may be similar to those of the above-described noise 62. The learning processing unit 112 may also perform machine learning of the learning model 5 again using the acquired output data as new training data 192. Note that, similarly to the learning data set 121, the new training data 192 may be associated with metadata 193, correct answer data 194, and different correct answer data 195. The metadata 193, correct answer data 194, and different correct answer data 195 may be acquired as appropriate.

The saving processing unit 113 generates information indicating the structures of the devices 51 to 57 of the trained learning model 5 constructed by the above-described machine learning and the values of the computation parameters as learning result data 128. The structures of the devices 51 to 57 may be specified by the number of layers from the input layer to the output layer in a neural network, the types of the layers, the number of neurons included in each layer, connection relationship between neurons in the adjacent layers, and the like. When the structures of the devices 51 to 57 are the same within the system, the information regarding the structure may be omitted from the learning result data 128. The saving processing unit 113 saves the generated learning result data 128 in a predetermined storage area.

<Estimation Apparatus>

Figure 6:
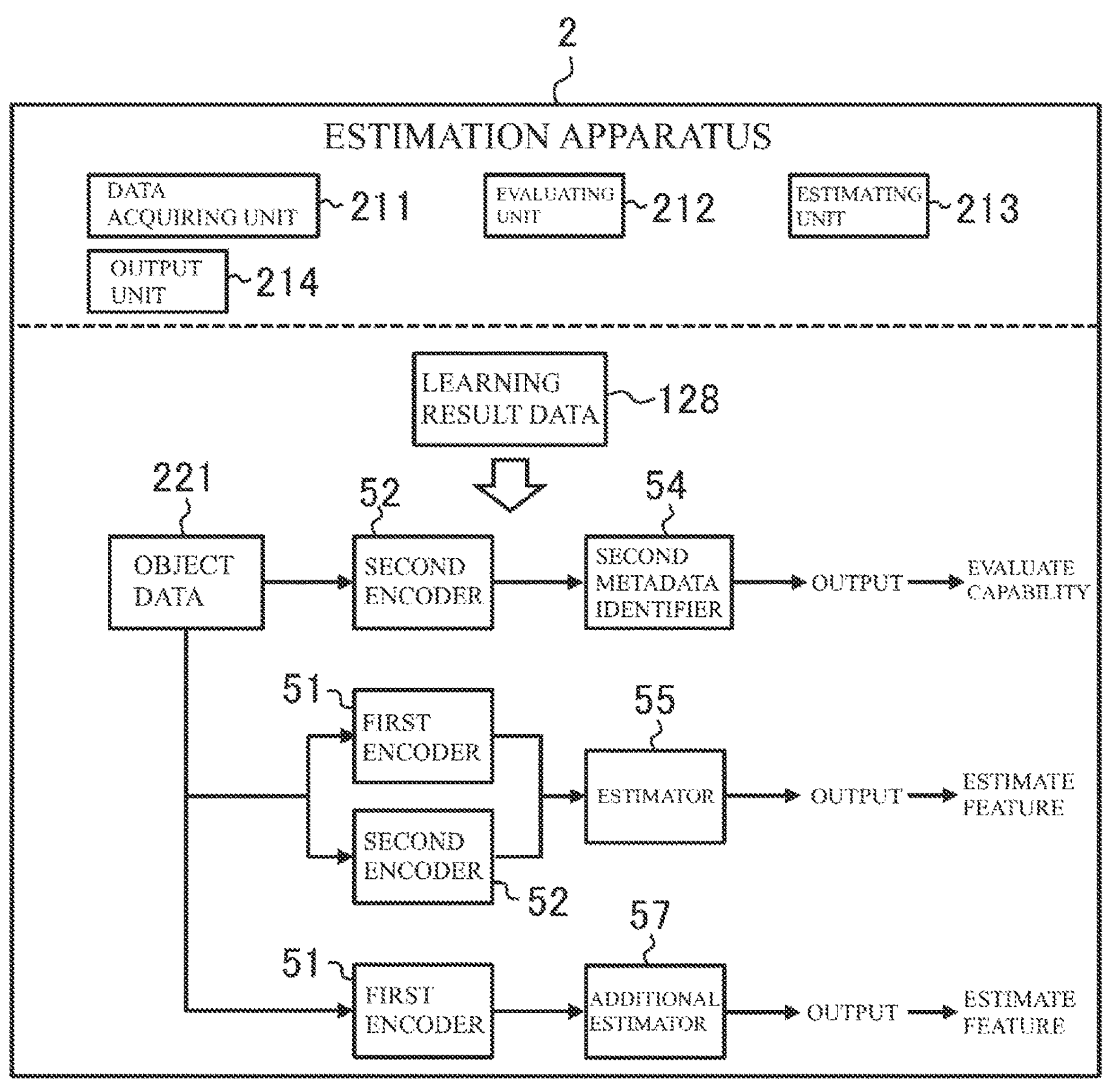
FIG. 6 is a schematic diagram illustrating an example of a software configuration of an estimation apparatus according to one or more embodiments.

Next, an example of a software configuration of the estimation apparatus 2 according to the present embodiment will be described using FIG. 6. FIG. 6 schematically illustrates an example of a software configuration of the estimation apparatus 2 according to the present embodiment.

The control unit 21 of the estimation apparatus 2 deploys the estimation program 82 stored in the storage unit 22 in the RAM. Then, the control unit 21 controls the constituent elements by the CPU interpreting and executing the estimation program 82 deployed in the RAM, and executing a series of commands included in the estimation program 82. With this, the estimation apparatus 2 according to the present embodiment operates as a computer including a data acquiring unit 211, an evaluating unit 212, an estimating unit 213, and an output unit 214 as software modules, as shown in FIG. 6. That is, in the present embodiment, the software modules of the estimation apparatus 2 are realized by the control unit 21 (CPU), similarly to the above-described learning apparatus 1.

The data acquiring unit 211 acquires object data 221 regarding which an estimation task is to be performed. In the present embodiment, the data acquiring unit 211 acquires object data 221 from a sensor S. The evaluating unit 212 and the estimating unit 213 includes the trained learning model 5 by retaining the learning result data 128. The estimating unit 213 may estimate the feature included in the acquired object data 221 using the first encoder 51, the second encoder 52, and the estimator 55 that have been trained by the learning apparatus 1. Alternatively, the estimating unit 213 may also estimate the feature included in the acquired object data 221 using the first encoder 51 and the additional estimator 57 that have been trained by the learning apparatus 1. The output unit 214 outputs information regarding the result of estimating the feature.

The evaluating unit 212 identifies the attribute regarding acquisition of the object data 221 using the second encoder 52 and the second metadata identifier 54 that have been trained by the learning apparatus 1. The evaluating unit 212 determines whether or not the result of the estimating unit 213 estimating the feature is adopted based on the identification result. Not adopting the estimation result may include discarding, after performing estimation processing by the estimating unit 213, the estimation result, and not performing the estimation processing.

Note that the estimation apparatus 2 (evaluating unit 212 and estimating unit 213) need not retain all of the constituent elements of the trained learning model 5. Portions of the trained learning model 5 that are not used by the estimation apparatus 2 may be omitted. In this case, the information corresponding to these portions may be omitted from the learning result data 128 retained by the estimation apparatus 2.

<Data Generation Apparatus>

Next, an example of a software configuration of the data generation apparatus 3 according to the present embodiment will be described using FIG. 7. FIG. 7 schematically illustrates an example of a software configuration of the data generation apparatus 3 according to the present embodiment.

The control unit 31 of the data generation apparatus 3 deploys the generation program 83 stored in the storage unit 32 in the RAM. Then, the control unit 31 controls the constituent elements by the CPU interpreting and executing the generation program 83 deployed in the RAM, and executing a series of commands included in the generation program 83. With this, the data generation apparatus 3 according to the present embodiment operates as a computer including a data acquiring unit 311, a generating unit 312, and a saving processing unit 313 as software modules, as shown in FIG. 7. That is, in the present embodiment, the software modules of the data generation apparatus 3 are realized by the control unit 31 (CPU), similarly to the above-described learning apparatus 1 and estimation apparatus 2.

The data acquiring unit 311 acquires object data 321 based on which new data is generated. In the present embodiment, the data acquiring unit 311 acquires object data 321 from a sensor S. The generating unit 312 includes the trained learning model 5 by retaining the learning result data 128. The generating unit 312 acquires an output value from the first encoder 51 as the first feature amount by giving object data 321 to the first encoder 51 trained by the learning apparatus 1. Moreover, the generating unit 312 generates decoded data by decoding the object data 321 from the output value (first feature amount) acquired from the first encoder 51 using the trained decoder 56, without inputting the output value (second feature amount) acquired from the second encoder 52 into it. The saving processing unit 313 saves the generated decoded data in a predetermined storage area, as new data. The predetermined storage area may be the RAM in the control unit 31, the storage unit 32, the storage medium 93, or an external storage apparatus, or a combination of these, for example.

Note that the new data to be generated by the data generation apparatus 3 is not limited to decoded data. The data generation apparatus 3 may also generate at least one of the first and second feature amounts using at least one of the first encoder 51 and the second encoder 52. In this case, the saving processing unit 313 may also save at least one of the generated first and second feature amounts in a predetermined storage area, as new data.

Also, the data generation apparatus 3 (generating unit 312) need not retain all of the constituent elements of the trained learning model 5. Portions of the trained learning model 5 that are not used by the data generation apparatus 3 may be omitted. In this case, the information corresponding to these portions may be omitted from the learning result data 128 retained by the data generation apparatus 3.

<Other Considerations>

The software modules of the learning apparatus 1, the estimation apparatus 2, and the data generation apparatus 3 will be described in detail in later-described exemplary operations. Note that, in the present embodiment, an example is described in which the software modules of the learning apparatus 1, the estimation apparatus 2, and the data generation apparatus 3 are realized by a general-purpose CPU. However, some of or all of the software modules described above may be realized by at least one dedicated processor. Also, regarding the software configurations of the learning apparatus 1, the estimation apparatus 2, and the data generation apparatus 3, software modules may also be omitted, replaced, and added as appropriate depending on the embodiment.

3. Exemplary Operations

[Learning Apparatus]

Figure 8:
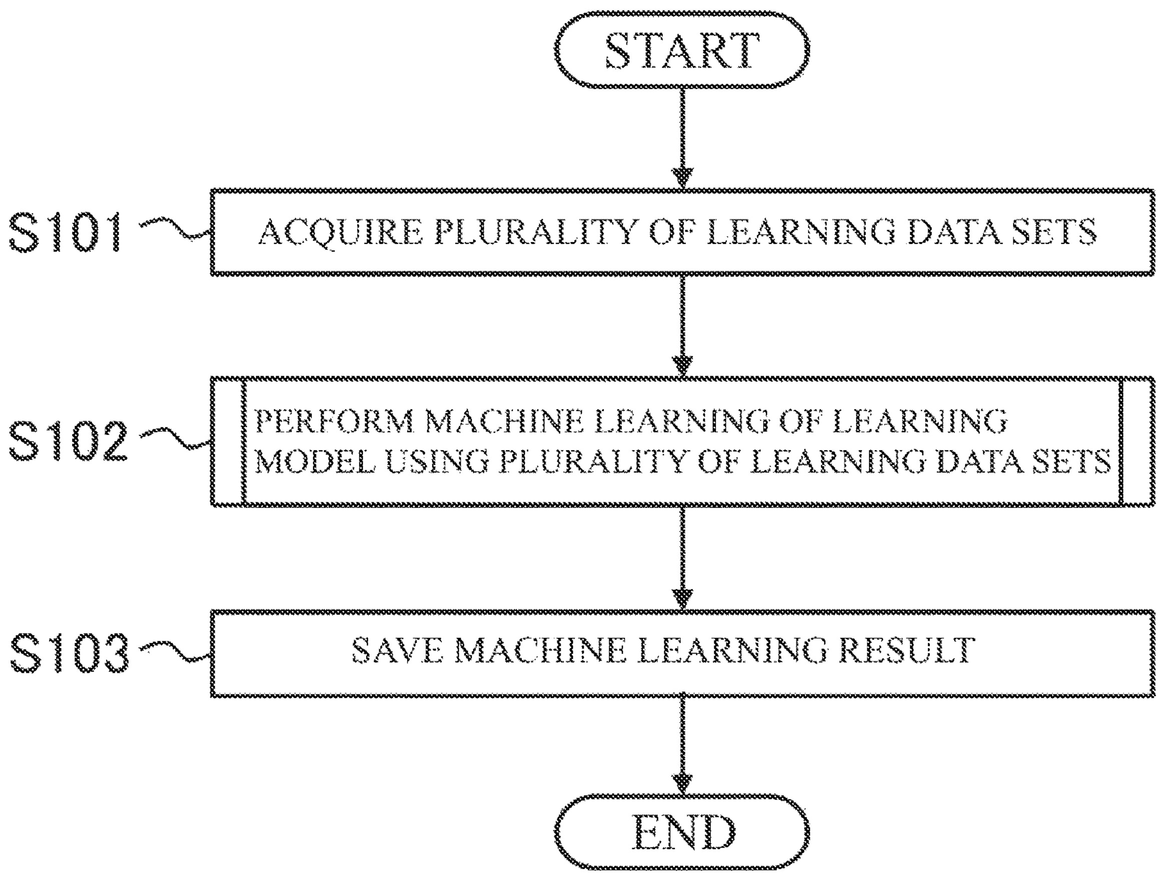
FIG. 8 is a diagram illustrating an example of a procedure of a learning apparatus according to one or more embodiments.

Next, exemplary operations of the learning apparatus 1 will be described using FIG. 8. FIG. 8 is a flowchart illustrating an example of the procedure of the learning apparatus 1 according to the present embodiment. The procedure described below is an example of the learning method. Note that the procedure described below is merely an example, and the processes may be changed to the extent possible. Moreover, in the procedure described below, steps may also be omitted, replaced, or added as appropriate depending on the embodiment.

(Step S101)

In step S101, the control unit 11 operates as the data acquiring unit 111, and acquires a plurality of learning data sets 121. In the present embodiment, the control unit 11 acquires a plurality of learning data sets 121 that are each constituted by a combination of training data 122, metadata 123, correct answer data 124, and different correct answer data 125.

There is no particular limitation to the method for acquiring learning data sets 121, and it may be selected as appropriate depending on the embodiment. For example, a sensor S is prepared, and sensing data generated by performing measurement under various conditions using the prepared sensor S is acquired as the training data 122. The object to be measured may be selected as appropriate depending on the estimation task that the learning model 5 is caused to learn. With respect to the acquired training data 122, the metadata 123, the correct answer data 124, and the different correct answer data 125 are acquired as appropriate.

The metadata 123 may be input by an operator. Alternatively, the metadata 123 may also be obtained from reference information indicating the usage mode, specification, observation environment, and the like of the sensor S. Also, the correct answer data 124 and the different correct answer data 125 may also be input by an operator. Alternatively, the correct answer data 124 and the different correct answer data 125 may also be given based on the result of a trained estimator estimating the feature included in the training data 122. The training data 122 is associated with the acquired metadata 123, correct answer data 124, and different correct answer data 125. With this, the learning data sets 121 can be generated.

Learning data sets 121 may be automatically generated by operations of the computer, or may be manually generated by an operator's manipulation. Also, learning data sets 121 may be generated by the learning apparatus 1, or may be generated by a computer other than the learning apparatus 1. When learning data sets 121 are generated by the learning apparatus 1, the control unit 11 acquires a plurality of learning data sets 121 automatically, or by manually executing the series of processes described above by an operator's manipulation via the input apparatus 14. On the other hand, when learning data sets 121 are generated by another computer, the control unit 11 may also acquire a plurality of learning data sets 121 generated by the other computer via a network, the storage medium 91, or the like. Some of the plurality of learning data sets 121 may be generated by the learning apparatuses 1, and the rest may be generated by one or more other computers.

Note that at least one first learning data set and at least one second learning data set that are included in a plurality of learning data sets 121 may be acquired from different domains such that attributes indicated by the metadata 123 differ. Domains being different means the fact that the attributes regarding acquisition of the training data 122 differ, and when the metadata 123 indicates a plurality of attributes, at least some of the attributes differ. The domain defines the attributes regarding acquisition of data such as conditions for acquiring the data, for example. When the sensor S is a camera, if there is a difference in the shooting conditions such as an orientation of the camera, a resolution of the camera, environmental brightness, and an object to be shot, for example, the attributes regarding acquisition of the training data 122 differ. In this case, the shooting conditions are examples of different domains.

There is no particular limitation to the number of learning data sets 121 to be acquired, and it may be selected as appropriate depending on the embodiment. Upon acquiring the plurality of learning data sets 121, the control unit 11 advances the process to the next step S102.

(Step S102)

In step S102, the control unit 11 operates as the learning processing unit 112, and performs machine learning of the learning model 5 using the plurality of acquired learning data sets 121. In the present embodiment, the learning model 5 includes a first encoder 51, a second encoder 52, a first metadata identifier 53, a second metadata identifier 54, an estimator 55, a decoder 56, and an additional estimator 57. The control unit 11 trains the devices 51 to 57 of the learning model 5 in the first to seventh training steps. There is no particular limitation to the processing sequence of the training steps, and it may be determined as appropriate depending on the embodiment.

<Machine Learning>

Figure 9:
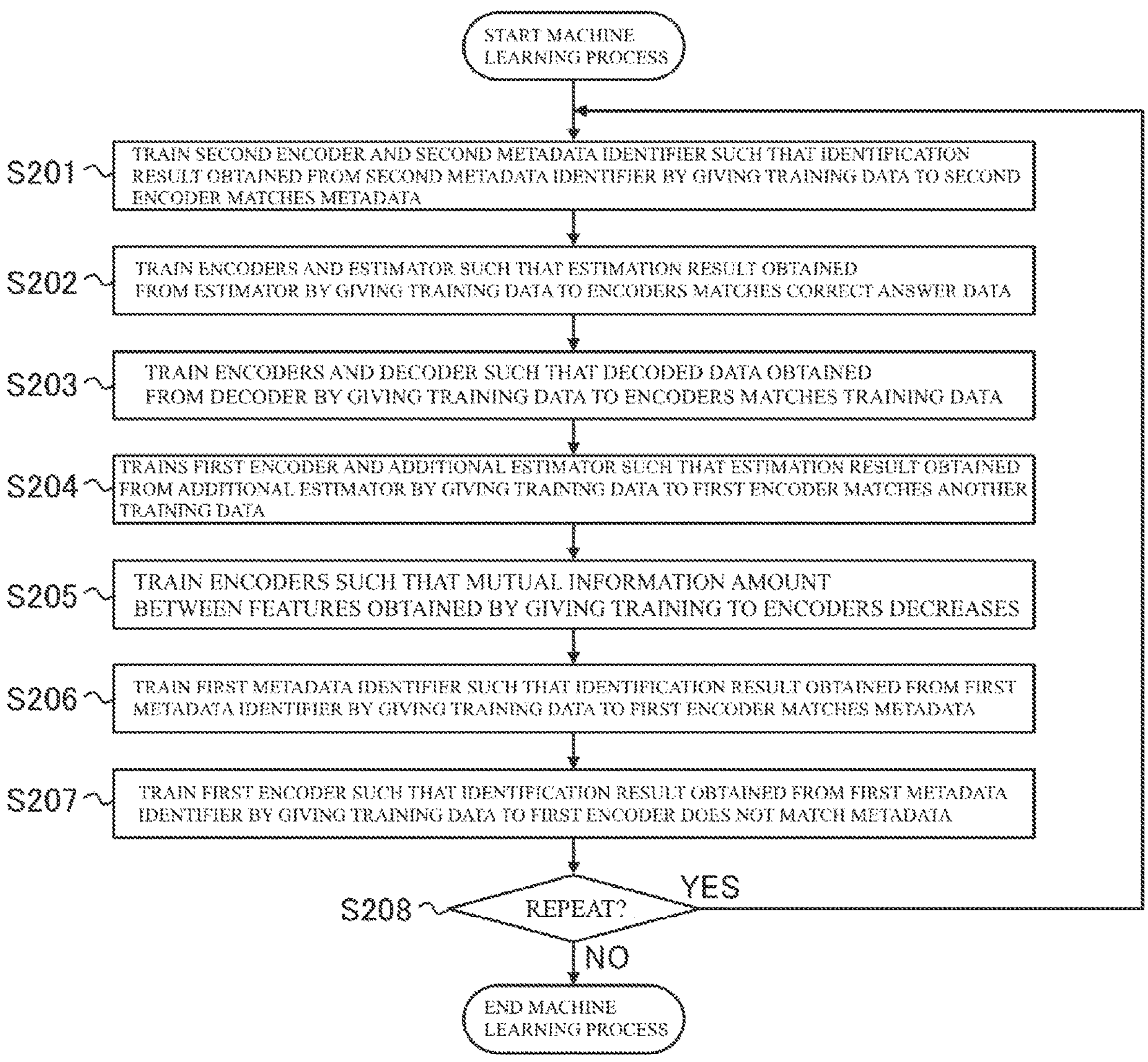
FIG. 9 illustrates an example of a procedure of machine learning of a learning apparatus according to one or more embodiments.

An example of the machine learning process in step S102 will be described in detail further using FIG. 9. FIG. 9 is a flowchart illustrating an example of machine learning procedure of the learning apparatus 1 according to the present embodiment. The processes in step S102 according to the present embodiment include the processes in steps S201 to S208 below. Note that the procedure described below is merely an example, and the processes may be changed to the extent possible.

Before executing step S201, the control unit 11 prepares a learning model 5 for which machine learning process performed. The structures and initial values of the computation parameters of the devices 51 to 57 of the learning model 5 to be prepared may be given by a template, or may also be given by an operator's input. The template may include information regarding the structure of a neural network and information regarding initial values of the computation parameters of the neural network. The structures of the devices 51 to 57 may be specified by the number of layers from an input layer to an output layer in a neural network, the types of the layers, the number of neurons included in the layers, and connection relationship between neurons in the adjacent layers, for example. When relearning is to be performed, the control unit 11 may also prepare the learning model 5 for which processing is to be performed based on learning result data obtained by machine learning performed in the past.

(Step S201)

In step S201, the control unit 11 trains the second encoder 52 and the second metadata identifier 54 such that, with respect to each learning data set 121, the identification result obtained from the second metadata identifier 54 by giving the training data 122 to the second encoder 52 matches the metadata 123. Step S201 is an example of the first training step. In the present embodiment, the control unit 11 executes learning processing of the neural networks that constitute the second encoder 52 and the second metadata identifier 54 by using the training data 122 as input data, and uses the metadata 123 as supervisor data. In this learning process, batch gradient descent, stochastic gradient descent, mini-batch gradient descent, or the like may be used.

In a first step, the control unit 11 executes the computation processes of the second encoder 52 and the second metadata identifier 54 by inputting the training data 122, of each learning data set 121, to the second encoder 52, for example. That is, the control unit 11 inputs the training data 122 to the input layer 521 of the second encoder 52, and determines, sequentially from the input side, how each of the neurons included in the layers (521 to 523, 541 to 543) fires. With these computation processes, the control unit 11 acquires an output value corresponding to the result of identifying the attribute regarding acquisition of the training data 122 from the second feature amount, from the output layer 543 of the second metadata identifier 54.

In a second step, the control unit 11 calculates an error between the output value acquired from the output layer 543 and the metadata 123 based on a loss function. A known loss function such as mean square errors or cross entropy errors may be used as the loss function. In a third step, the control unit 11 calculates the gradient of the error in a direction in which the calculated error decreases, and calculates errors of the computation parameters included in the layers (521 to 523, 541 to 543) (e.g., weights of connections between neurons, threshold values of the neurons) by back-propagating the calculated gradient using an error back propagation method. In a fourth step, the control unit 11 updates the values of the computation parameters based on the calculated errors.

The control unit 11 adjusts the values of the computation parameters of the second encoder 52 and the second metadata identifier 54 such that, with respect to each learning data set 121, the error between the output value that is output from the output layer 543 and the metadata 123 decreases by repeating the above-described first to fourth steps. The number of repetitions may be determined as appropriate. For example, a specific number of times of repeating the adjustment of the values of the computation parameters may be set. The specific number of times may be a set value, or may also be given by a designation by an operator. In this case, the control unit 11 repeats the first to fourth steps until the number of repetitions reaches the specific number of times. Also, the configuration may be such that the control unit 11 repeats the first to fourth steps until the sum of errors decreases to a threshold value or less, for example.

As a result of this machine learning, a second encoder 52 and a second metadata identifier 54 can be constructed that have been trained such that, with respect to each learning data set 121, when the training data 122 is input to the second encoder 52, an output value that matches the metadata 123 is output from the second metadata identifier 54. This "matching" may include a case where an allowable error of a threshold value occurs between the output value of the output layer and the supervisor data. As a result of the machine learning in step S201, the second encoder 52 may be trained such that the second feature amount includes a component corresponding to the attribute or attributes regarding acquisition of the training data 122 indicated by the metadata 123. Upon completing the training of the second encoder 52 and the second metadata identifier 54, the control unit 11 advances the process to the next step S202.

(Step S202)

In step S202, the control unit 11 trains the first encoder 51, the second encoder 52, and the estimator 55 such that, with respect to each learning data set 121, the estimation result obtained from the estimator 55 by giving the training data 122 to the first encoder 51 and the second encoder 52 matches the correct answer data 124. Step S202 is an example of the second training step. In the present embodiment, the control unit 11 performs learning processing of the neural networks that constitute the first encoder 51, the second encoder 52, and the estimator 55 using the training data 122 as input data and using the correct answer data 124 as supervisor data. In this learning process, the method for adjusting the values of the computation parameters of the encoders (51, 52) and the estimator 55 may be similar to that in the above-described step S201.

In a first step, with respect to each of the learning data sets 121, the control unit 11 inputs the training data 122 to the input layers (511, 512) of the encoders (51, 52), and executes computation processes of the first encoder 51, the second encoder 52, and the estimator 55, for example. With these computation processes, the control unit 11 acquires, from the output layer 553 of the estimator 55, an output value corresponding to the result of estimating the feature included in the training data 122 from the first and second feature amounts.

In a second step, the control unit 11 calculates an error between the output value acquired from the output layer 553 and the correct answer data 124 based on a loss function. In a third step, the control unit 11 calculates a gradient of the error in a direction in which the calculated error decreases, and calculates errors of the computation parameters included in the layers (511 to 513, 521 to 523, 551 to 553) by back-propagating the calculated gradient with the error back propagation method. In a fourth step, the control unit 11 updates the values of the computation parameters based on the calculated errors.

The control unit 11 adjusts the values of the computation parameters of the first encoder 51, the second encoder 52, and the estimator 55 such that the error between the output value that is output from the output layer 553 and the correct answer data 124 decreases, with respect to the learning data sets 121, by repeating the above-described first to fourth steps. The control unit 11 may repeat the first to fourth step until the number of repetitions reaches a specific number of times. Alternatively, the control unit 11 may repeats the first to fourth steps until the sum of errors decreases to a threshold value or less.

As a result of this machine learning, a first encoder 51, a second encoder 52, and an estimator 55 can be constructed that have been trained such that, with respect to each learning data set 121, when the training data 122 is input to the encoders (51, 52), an output value that matches the correct answer data 124 is output from the estimator 55. Upon completing the training of the first encoder 51, the second encoder 52, and the estimator 55, the control unit 11 advances the process to the next step S203.

(Step S203)

In step S203, the control unit 11 trains the first encoder 51, the second encoder 52, and the decoder 56 such that, with respect to each learning data set 121, the decoded data obtained from the decoder 56 by giving the training data 122 to the first encoder 51 and the second encoder 52 matches the training data 122. Step S203 is an example of the sixth training step. In the present embodiment, the control unit 11 uses training data 122 as input data and supervisor data, and executes learning processing of the neural networks that constitute the first encoder 51, the second encoder 52, and the decoder 56. In this learning process, the method for adjusting the values of the computation parameters of the encoders (51, 52) and the decoder 56 may be similar to that of the above-described step S201.

For example, in the first step, the control unit 11, with respect to each learning data set 121, inputs the training data 122 to the input layers (511, 512) of the encoders (51, 52), and executes computation processes of the first encoder 51, the second encoder 52, and the decoder 56. With these computation processes, the control unit 11 acquires output data corresponding to the result of decoding the training data 122 from the first and second feature amounts, from the output layer 563 of the decoder 56.

In the second step, the control unit 11 calculates an error between the output data acquired from the output layer 563 and the training data 122 based on a loss function. In the third step, the control unit 11 calculates a gradient of the error in a direction in which the calculated error decreases, and calculates errors of the computation parameters included in the layers (511 to 513, 521 to 523, 561 to 563) by back-propagating the calculated gradient with the error back propagation method. In the fourth step, the control unit 11 updates the values of the computation parameters based on the calculated errors.

The control unit 11 adjusts the values of the computation parameters of the first encoder 51, the second encoder 52, and the decoder 56 such that, with respect to each learning data set 121, the error between the output data output from the output layer 563 and the training data 122 decreases, by repeating the above-described first to fourth steps. The control unit 11 may repeat the first to fourth steps until the number of repetitions reaches a specific number of times. Alternatively, the control unit 11 may also repeats the first to fourth steps until the sum of errors decreases to a threshold value or less.

As a result of this machine learning, a first encoder 51, a second encoder 52, and a decoder 56 can be constructed that have been trained such that, with respect to each learning data set 121, when the training data 122 is input to the encoders (51, 52), decoded data that matches the training data 122 is output from the decoder 56. Upon completing the training of the first encoder 51, the second encoder 52, and the decoder 56, the control unit 11 advances the process to the next step S204.

(Step S204)

In step S204, the control unit 11 trains the first encoder 51 and the additional estimator 57 such that, with respect to each learning data set 121, the estimation result obtained from the additional estimator 57 by giving the training data 122 to the first encoder 51 matches the correct answer data 124 or the different correct answer data 125. Step S204 is an example of the seventh training step. In the present embodiment, the control unit 11 executes learning processing of neural networks that constitute the first encoder 51 and the additional estimator 57, using the training data 122 as input data and correct answer data 124 or the different correct answer data 125 as supervisor data. In this learning process, the method for adjusting the values of the computation parameters of the first encoder 51 and the additional estimator 57 may be similar to that in the above-described step S201 or the like.

For example, in the first step, the control unit 11, with respect to each learning data set 121, inputs the training data 122 to the input layer 511 of the first encoder 51, and executes computation processes of the first encoder 51 and the additional estimator 57. With these computation processes, the control unit 11 acquires an output value corresponding to the result of estimating the feature included in the training data 122 from the first feature amount, from the output layer 573 of the additional estimator 57.

In the second step, the control unit 11 calculates an error between the output value acquired from the output layer 573 and the correct answer data 124 or the different correct answer data 125 based on a loss function. In the third step, the control unit 11 calculates a gradient of the error in a direction in which the calculated error decreases, and calculates errors of the computation parameters included in the layers (511 to 513, 571 to 573) by back-propagating the calculated gradient with the error back propagation method. In the fourth step, the control unit 11 updates the values of the computation parameters based on the calculated errors.

The control unit 11 adjusts the values of the computation parameters of the first encoder 51 and the additional estimator 57 such that, with respect to each learning data set 121, the error between the output value that is output from the output layer 573 and the correct answer data 124 or the different correct answer data 125 decreases, by repeating the above-described first to fourth steps. The control unit 11 may repeat the first to fourth steps until the number of repetitions reaches a specific number of times. Alternatively, the control unit 11 may repeat the first to fourth steps until the sum of errors decreases to a threshold value or less.

As a result of this machine learning, a first encoder 51 and an additional estimator 57 can be constructed that have been trained such that, with respect to each learning data set 121, when the training data 122 is input to the first encoder 51, the output value that matches the correct answer data 124 or the different correct answer data 125 is output from the additional estimator 57. Upon completing the training of the first encoder 51 and the additional estimator 57, the control unit 11 advances the process to the next step S205.

(Step S205)

In step S205, the control unit 11 trains the first encoder 51 and the second encoder 52 such that, with respect to each learning data set 121, the mutual information amount decreases between an output value (first feature amount) obtained from the first encoder 51 by giving the training data 122 to the first encoder 51 and the output value (second feature amount) obtained from the second encoder 52 by giving the training data 122 to the second encoder 52. Step S205 is an example of the fifth training step. In the present embodiment, the control unit 11 executes learning processing of neural networks that constitute the first encoder 51 and the second encoder 52 such that the mutual information amount decreases, by using the training data 122 as input data (e.g. using the fact that the mutual information amount decreases to 0 as the supervisor data). In this learning process, the method for adjusting the values of the computation parameters of at least one of the first encoder 51 and the second encoder 52 is basically similar to that in the above-described step S201 or the like.

For example, in the first step, control unit 11, with respect to each learning data set 121, inputs the training data 122 to the input layers (511, 521) of the encoders (51, 52), and executes computation processes of the encoders (51, 52). In the computation processes, the control unit 11 acquires output values corresponding to the result of converting the training data 122 to feature amounts from the output layers (513, 523) of the encoders (51, 52).

In the second step, the control unit 11 calculates a mutual information amount between the output values (first and second feature amounts) obtained from the first encoder 51 and the second encoder 52, and derives an error from the mutual information amount based on a loss function. A known method may be adopted as the method of calculating the mutual information amount. Also, the value of the mutual information amount may be used as the error as is, by defining the loss function to calculate an absolute value. Alternatively, the loss function may also be defined to apply a predetermined operation such as taking the square or logarithm of the value of the mutual information amount. In the third step, the control unit 11 calculates a gradient of the error in a direction in which the calculated error decreases, and back-propagates the calculated gradient to at least one of the first encoder 51 and the second encoder 52 with the error back propagation method. With this, the control unit 11 calculates errors of the computation parameters included in at least one of the layers 511 to 513 of the first encoder 51 and the layers 521 to 523 of the second encoder 52. In the fourth step, the control unit 11 updates the values of the computation parameters based on the calculated errors.

The control unit 11 adjusts the values of the computation parameters of at least one of the first encoder 51 and the second encoder 52 such that, with respect to each learning data set 121, the mutual information amount between the output value that is output from the output layer 513 of the first encoder 51 and the output value that is output from the output layer 523 of the second encoder 52 decreases, by repeating the above-described first to fourth steps. The control unit 11 may repeat the first to fourth steps until the number of repetitions reaches a specific number of times. Alternatively, the control unit 11 may repeat the first to fourth steps until the sum of errors decreases to a threshold value or less.

As a result of this machine learning, encoders (51, 52) can be constructed that have been trained such that, with respect to each learning data set 121, when the training data 122 is input to the encoders (51, 52), output values having a small mutual information amount are output from the encoders (51, 52). Upon completing the training of the encoders (51, 52), the control unit 11 advances the process to the next step S206.

(Step S206)

In step S206, control unit 11 trains the first metadata identifier 53 such that, with respect to each learning data set 121, the identification result obtained from the first metadata identifier 53 by giving the training data 122 to the first encoder 51 matches the metadata 123. Step S206 is an example of the third training step. In this step S206, while the values of the computation parameters of the first metadata identifier 53 are adjusted, the values of the computation parameters of the first encoder 51 are fixed. In the present embodiment, the control unit 11 executes learning processing of neural networks that constitute the first metadata identifier 53 using the training data 122 as input data and the metadata 123 as supervisor data. In this learning process, the method for adjusting the values of the computation parameters of the first metadata identifier 53 may be similar to that in step S201 or the like, except that values of the computation parameters of the first encoder 51 are fixed.

For example, in the first step, the control unit 11, with respect to each learning data set 121, inputs the training data 122 to the input layer 511 of the first encoder 51, and executes the computation processes of the first encoder 51 and the first metadata identifier 53. With these computation processes, the control unit 11 acquires the output value corresponding to the result of identifying the attribute regarding acquisition of the training data 122 from the first feature amount, from the output layer 533 of the first metadata identifier 53.

In the second step, the control unit 11 calculates an error between the output value that is output from the output layer 533 and the metadata 123 based on a loss function. In the third step, the control unit 11 calculates a gradient of the error in a direction in which the calculated error decreases, and back-propagates the calculated gradient with the error back propagation method. The control unit 11 stops the back-propagation of the gradient at the input layer 531 of the first metadata identifier 53. With this, the control unit 11 calculates errors of the computation parameters included in the layers 531 to 533 of the first metadata identifier 53. In the fourth step, the control unit 11 updates the values of the computation parameters of the first metadata identifier 53 based on the calculated errors.

The control unit 11 adjusts the values of the computation parameters of the first metadata identifier 53 such that, with respect to each learning data set 121, the error between the output value that is output from the output layer 533 and the metadata 123 decreases, by repeating the above-described first to fourth steps. The control unit 11 may repeat the first to fourth steps until the number of repetitions reaches a specific number of times. Alternatively, the control unit 11 may repeat the first to fourth steps until the sum of errors decreases to a threshold value or less.

As a result of this machine learning, a first metadata identifier 53 can be constructed that has been trained such that, with respect to each learning data set 121, when the training data 122 is input to the first encoder 51, an output value that matches the metadata 123 is output from the first metadata identifier 53. Upon completing the training of the first metadata identifier 53, the control unit 11 advances the process to the next step S207.

(Step S207)

In step S207, the control unit 11 trains the first encoder 51 such that, with respect to each learning data set 121, the identification result obtained from the first metadata identifier 53 by giving the training data 122 to the first encoder 51 does not match the metadata 123. Step S207 is an example of the fourth training step. In the step S207, while the values of the computation parameters of the first encoder 51 are adjusted, the values of the computation parameters of the first metadata identifier 53 are fixed. In the present embodiment, the control unit 11 executes learning processing of a neural network that constitute the first encoder 51, using the training data 122 as the input data, such that the output does not match the metadata 123 (e.g. using the dummy metadata 129 as the supervisor data). In this learning process, the method for adjusting the values of the computation parameters of the first encoder 51 may be similar to that in step S201 or the like, except that the values of the computation parameters of the first metadata identifier 53 are fixed.

For example, in a first step, the control unit 11, with respect to each learning data set 121, inputs the training data 122 to the input layer 511 of the first encoder 51, and executes the computation processes of the first encoder 51 and the first metadata identifier 53. With these computation processes, the control unit 11 acquires an output value corresponding to the result of identifying the attribute regarding acquisition of the training data 122 from the first feature amount, from the output layer 533 of the first metadata identifier 53.

In a second step, the control unit 11, acquires, with respect to each learning data set 121, dummy metadata 129 that corresponds to the metadata 123 and has a value different from that of the corresponding metadata 123. The control unit 11 calculates an error between the output value that is output from the output layer 533 and the acquired dummy metadata 129 based on a loss function.

The dummy metadata 129 may be given as appropriate to be able to train the first encoder 51 such that the identification result obtained from the first metadata identifier 53 does not match the metadata 123. For example, the dummy metadata 129 may be constituted by the metadata 123 of another learning data set 121 that is different from the learning data set 121 of interest. That is, the configuration may be such that the control unit 11 selects a learning data set 121 that is different from the learning data set 121 from which the dummy metadata 129 is acquired, and uses the metadata 123 of the selected learning data set 121 as the dummy metadata 129 of the learning data set 121 of interest.

The method for selecting another learning data set 121 from which the metadata 123 to be used as the dummy metadata 129 is acquired, regarding the learning data set 121 of interest, is not limited in particular, and may be selected as appropriate depending on the embodiment. For example, the control unit 11 may randomly select another learning data set 121 from a plurality of learning data sets 121, and may use the metadata 123 of the selected learning data set 121 as the dummy metadata 129 of the learning data set 121 of interest. Also, the control unit 11 may use the metadata 123 of another learning data set 121 that is assigned to the learning data set 121 of interest as the dummy metadata 129 by shifting the correspondence relationship between the training data 122 and the metadata 123 of the learning data set 121 in any direction, for example. Also, the control unit 11 may select one learning data set 121 from a plurality of learning data sets 121, and use the metadata 123 of the selected learning data set 121 as the dummy metadata 129 of all of the learning data sets 121, for example. According to this method, the amount of calculation for generating the dummy metadata 129 can be kept low, and the process cost of this step S207 can be reduced.

Note that the method for generating the dummy metadata 129 is not limited to this example, and may be selected as appropriate depending on the embodiment. The control unit 11 may also generate the dummy metadata 129 by inverting the value of the metadata 123, for example, in addition to the method of selecting it from another learning data set 121 described above. Also, the control unit 11 may generate dummy metadata 129 having a random value that is different from the value of the metadata 123 (e.g. random number). A learning data set 121 in which the metadata 129 matches the dummy metadata 123 may be present in the plurality of learning data sets 121. In this case, the control unit 11 may use the learning data set 121 for training as is, or may change the dummy metadata 129 of the learning data set 121 as appropriate.

In a third step, the control unit 11 calculates a gradient of the error in a direction in which the calculated error decreases, and back-propagates the calculated gradient from the output layer 533 of the first metadata identifier 53 to the input layer 511 of the first encoder 51, with the error back propagation method. In this process, the control unit 11 omits calculation of the errors of the computation parameters included in the first metadata identifier 53, and calculates errors of the computation parameters included in the first encoder 51. In a fourth step, the control unit 11 updates the values of the computation parameters of the first encoder 51 based on the calculated errors.

The control unit 11 adjusts the values of the computation parameters of the first encoder 51 such that, with respect to each learning data set 121, the error between the output value that is output from the output layer 533 and the dummy metadata 129 decreases by repeating the above-described first to fourth steps. The control unit 11 may repeat the above-described first to fourth step until the number of repetitions reaches a specific number of times. Alternatively, the control unit 11 may also repeats the above-described first to fourth steps until the sum of errors decreases to a threshold value or less.

As a result of this machine learning, a first encoder 51 can be constructed that has been trained such that, with respect to each learning data set 121, when the training data 122 is input to the first encoder 51, an output value that matches the dummy metadata 129 is output from the first metadata identifier 53. That is, as a result of the machine learning using the dummy metadata 129, the first encoder 51 is trained such that the identification result obtained from the first metadata identifier 53 does not match the metadata 123. According to this method in which the dummy metadata 129 is used, the control unit 11 can execute the processes in step S207 similarly to the processes of the above-described step S201 or the like. Therefore, the processes in step S207 can be simplified. According to the machine learning in step S207, the first encoder 51 may be trained such that the first feature amount includes a component corresponding to information other than the attributes regarding acquisition of the training data 122 of the learning data sets 121, that is, information that appears in common across domains from which the training data 122 is acquired, for example. Upon completing the training of the first encoder 51, the control unit 11 advances the process to the next step S208.

Note that the method of training the first encoder 51 such that the identification result obtained from the first metadata identifier 53 does not match the metadata 123 is not limited to the method in which dummy metadata 129 is used. For example, in the above-described second step, the control unit 11 calculates, with respect to each learning data set 121, an error between the output value that is output from the output layer 533 and the metadata 123. Also, in the third step, the control unit 11 may calculate a gradient of the calculated error in a direction in which the error increases, and back-propagate the calculated gradient to the input layer 511 of the first encoder 51, with the error back propagation method. In the processes, the control unit 11 may calculate errors of the computation parameters included in the first encoder 51. Also, in the fourth step, the control unit 11 may update the values of the computation parameters of the first encoder 51 based on the calculated errors. With this method as well, the control unit 11 can train the first encoder 51 such that the identification result obtained from the first metadata identifier 53 does not match the metadata 123.

(Step S208)

In step S208, the control unit 11 determines whether or not the processes in steps S201 to S207 will be repeated. The benchmark for determining repetition of the processes may be determined as appropriate depending on the embodiment. For example, a specific number of times of repeating the processes may be set. The specific number of times may be a set value, or may be designated by an operator. In this case, the control unit 11 determines whether or not the number of times of executing the processes in steps S201 to S207 has reached the specific number of times. If it is determined that the number of times of execution has not reached the specific number of times, the control unit 11 returns the process to step S201, and repeats the processes in steps S201 to S207. In the present embodiment, in the course of repeating steps S201 to S207, step S206 and step S207 are alternatingly executed. On the other hand, if it is determined that the number of times of execution has reached the specific number of times, the control unit 11 ends the machine learning process according to the present embodiment and advances the process to the next step S103.

(Result of Machine Learning)

As a result of executing step S201 in the series of training steps described above, the second feature amount obtained from the trained second encoder 52 includes a component corresponding to the attribute regarding acquisition of the training data 122 such that the second metadata identifier 54 can appropriately identify the attribute regarding the acquisition. Also, as a result of executing step S202, the first and second feature amounts obtained by the trained first and second encoders 51 and 52 include a component corresponding to the feature included in the training data 122 (that is, a correct answer of the estimation task). Moreover, in the present embodiment, as a result of alternatingly executing the processes in steps S206 and S207, adversarial learning of the first encoder 51 and the first metadata identifier 53 is executed.

In step S206, while the values of the computation parameters of the first metadata identifier 53 are adjusted such that the output value of the first metadata identifier 53 matches the metadata 123, the values of the computation parameters of the first encoder 51 are fixed. On the other hand, in step S207, while the values of the computation parameters of the first encoder 51 are adjusted such that the output value of the first metadata identifier 53 does not match the metadata 123, the values of the computation parameters of the first metadata identifier 53 are fixed. That is, in step S206, with respect to the capability, of the first encoder 51 at this stage, of converting the training data 122 to the first feature amount such that the component corresponding to the metadata 123 is not included, it is attempted to improve the capability of the first metadata identifier 53 of identifying the metadata 123 from this first feature amount. In contrast, in step S207, it is attempted to improve the capability of the first encoder 51 of converting the training data 122 to the first feature amount such that the component corresponding to the metadata 123 is not included, with the capability of the meta-identification of the first metadata identifier 53 at this stage being the reference.

That is, as a result of alternatingly executing the processes in steps S206 and S207, the above-described capabilities of the first encoder 51 and the first metadata identifier 53 are improved. With this, in correspondence with the improvement of the identification performance of the first metadata identifier 53, the first feature amount obtained from the trained first encoder 51 will not include any component corresponding to the attribute regarding acquisition of the training data 122 such that the identification by this first metadata identifier 53 fails. The first feature amount gradually includes components other than the metadata 123, that is, components corresponding to information that appears in common across domains from which the training data 122 of the learning data sets 121 is obtained.

Therefore, in the present embodiment, as a result of the machine learning in steps S201, S202, S206, and S207, the second feature amount obtained by encoding performed by the trained second encoder 52 is likely to include components corresponding to the metadata 123. In contrast, the first feature amount obtained by the trained first encoder 51 is likely to include components corresponding to information other than the metadata 123, regarding the feature included in the training data 122. The estimator 55 is trained to estimate the feature included in the training data 122 from both feature amounts. Therefore, by using the trained first encoder 51, second encoder 52, and estimator 55, the task of estimating the feature included in object data can be executed based on information specific to a domain from which the object data is acquired and information in common across domains. Therefore, regarding the case where the information specific to a domain from which the object data is acquired is useful for the estimation task, the accuracy of estimating the feature included in the object data can be improved.

Also, when the information specific to the attribute regarding acquisition of object data exerts a bad influence on the accuracy of the estimation task, the feature included in the object data can be estimated based on the first feature amount obtained by the trained first encoder 51, without using the second feature amount obtained by the trained second encoder 52. In the present embodiment, as a result of using the trained first encoder 51 and the additional estimator 57, the feature included in the object data can be estimated, while removing the influence of the component corresponding to the attribute regarding acquisition of object data. Therefore, according to the present embodiment, even in a case where the information regarding the attribute regarding acquisition of object data exerts a bad influence on the accuracy of the estimation task, the accuracy of estimating the feature included in the object data can be improved.

Also, as a result of training the decoder 56 along with the encoders (51, 52) by the machine learning in step S203, the decoder 56 can be configured to restore the input data from the first and second feature amounts. That is, it can be ensured that the information regarding the input data is not defective in the first and second feature amounts. Therefore, according to the present embodiment, the information can be kept from becoming defective in the process of converting input data to a feature amount, and therefore the accuracy of the estimation task performed by the estimator 55 and the additional estimator 57 can be improved.

Also, as a result of machine learning in step S204, it can be ensured that the component corresponding to information that can be used for estimating the feature indicated by the correct answer data 124 or the different correct answer data 125 is included in the first feature amount. With this, the first feature amount can be prevented from becoming meaningless information for the estimation task, and the accuracy of the estimation task based on the first feature amount can be improved.

Also, as a result of the machine learning in step S205, the mutual information amount between the first and second feature amounts decreases. As a result, while the second feature amount is likely to include a component corresponding to the metadata 123, a component corresponding to information other than the metadata 123 is likely to be included in the first feature amount, and is not likely to be included in the second feature amount. That is, components corresponding to metadata 123 and components corresponding to information other than metadata 123 can be appropriately distributed between the second feature amount and the first feature amount. Therefore, according to the present embodiment, useful information other than the metadata 123 is likely to be included in the first feature amount, and with this, the accuracy of the estimation task based on the first feature amount can be improved.

(Other Considerations)

The machine learning procedure of the learning model 5 is not limited to the example described above, and steps may also be omitted, replaced, or added as appropriate depending on the embodiment.

(A) Procedure of Alternating Repetition

For example, in the embodiment described above, the control unit 11 alternatingly and repeatedly executes the processes in steps S206 and S207, in the course of repeatedly executing the series of processes in steps S201 to S207. However, the method for alternatingly and repeatedly executing the processes in steps S206 and S207 is not limited to this example. For example, the control unit 11 may execute the processes in steps S201 to S205 as prior learning. In this case, after completing the adjustment of the values of the computation parameters in the processes in steps S201 to S205, the control unit 11 may then alternatingly and repeatedly execute the adjustment of the values of the computation parameters in steps S206 and S207.

(B) Procedure of Update Process

Also, in the embodiment described above, the processes in steps S201 to S205 are separately executed. However, the method for adjusting the values of the computation parameters in the processes in steps S201 to S205 is not limited to this example. For example, the control unit 11 may also execute at least one of the combinations of the steps S201 to S205 at the same time. For example, a scenario is conceivable in which the processes in steps S201 and S202 are executed at the same time. In this scenario, in a first step, the control unit 11 may input training data 122 to the encoders (51, 52) and acquire output values from the second metadata identifier 54 and the estimator 55. In a second step, the control unit 11 may calculate an error between the output value of the second metadata identifier 54 and the metadata 123, and an error between the output value of the estimator 55 and the correct answer data 124. In a third step, the control unit 11 may calculate errors of the computation parameters included in the first encoder 51, the second encoder 52, the second metadata identifier 54, and the estimator 55 by back-propagating gradients of the errors. Also, in a fourth step, the control unit 11 updates the values of the computation parameters based on the calculated errors.

(C) Addition of Noise to Training Data

Also, in the present embodiment, the control unit 11 may also input noise 61 to the encoders (51, 52) along with the training data 122, in the above-described steps S201 to S207. Thereafter, the control unit 11 may execute the processes in steps S201 to S207.

There is no particular limitation to the method for inputting noise 61 along with the training data 122, and it may be selected as appropriate depending on the embodiment. For example, the control unit 11 may add noise 61 to the training data 122. Also, the control unit 11 may input the training data 122 to which noise 61 is added to the encoders (51, 52).

For example, the encoders (51, 52) may include, as inputs, a second channel for receiving noise 61 in addition to a first channel for receiving training data 122. In the present embodiment, the input layers (511, 521) of the encoders (51, 52) may include first neurons (nodes) for receiving training data 122 and second neurons (nodes) for receiving noise 61. The first neuron is an example of the first channel, and the second neuron is an example of the second channel. In this case, the control unit 11 can input noise 61 along with training data 122 by inputting training data 122 to the first channels of the encoders (51, 52), and inputting noise 61 to the second channels.

The type of the noise 61 is not limited in particular, and may be selected as appropriate depending on the embodiment. The noise 61 may be random noise, for example. Note that the mode of inputting noise 61 along with training data 122 is not limited to this example. Inputting of noise 61 may be omitted in at least one of steps S201 to S207.

If the randomness of the training data 122 differs considerably between some of the plurality of learning data sets 121 and some other of the plurality of learning data sets 121, or if some training data 122 includes a large defect relative to the other training data 122, it is difficult to prevent the component corresponding to the property difference from entering the first feature amount. That is, it is difficult to cause the first encoder 51 not to learn the property difference. Therefore, in these cases, the first metadata identifier 53 can identify the attribute of acquisition from the property difference, and therefore it is possible that it is difficult to train the first encoder 51 such that the identification by the first metadata identifier 53 fails, in step S207. In contrast, as a result of inputting noise 61 along with training data 122, the property difference can be mitigated, and with this, the processes in step S207 can be appropriately completed.

(D) Addition of Noise to Second Feature Amount

Also, in the present embodiment, in steps S201 to S203, the control unit 11 may acquire an output value (second feature amount) from the second encoder 52 by giving training data 122 to the second encoder 52. Also, the control unit 11 executes training in steps S201 to S203 by inputting noise 62 to the second metadata identifier 54, the estimator 55, and the decoder 56 along with the acquired output value (second feature amount).

There is no particular limitation to the method for inputting noise 62 along with the second feature amount, and it may be selected as appropriate depending on the embodiment, similarly to the above-described noise 61. For example, the control unit 11 may add the noise 62 to the output value (second feature amount) of the second encoder 52. Also, the control unit 11 may input the second feature amount to which the noise 62 is added to the second metadata identifier 54, the estimator 55, and the decoder 56.

Also, for example, the second metadata identifier 54, the estimator 55, and the decoder 56 may include channels for the noise 62 in addition to first channels for the second feature amount, as input channels. In the present embodiment, input layers (541, 551, 561) of the second metadata identifier 54, the estimator 55, and the decoder 56 may include first neurons (nodes) for receiving the second feature amount and second neurons (nodes) for receiving the noise 62. The first neurons are an example of the first channel, and the second neurons are an example of the second channel. In this case, the control unit 11 can input the noise 62 along with the second feature amount by inputting the second feature amount to the first channels of the second metadata identifier 54, the estimator 55, and the decoder 56 and inputting the noise 62 to the second channels. The estimator 55 and the decoder 56 include channels for the first feature amount in addition to these channels. In steps S202 and S203, the control unit 11 inputs the first feature amount to the channels of the estimator 55 and the decoder 56, along with the above-described inputs.

There is no particular limitation to the type of the noise 62, which may be selected as appropriate depending on the embodiment, similarly to the noise 61 described above. The noise 62 may be random noise, for example. Note that the mode of inputting noise 62 along with the second feature amount is not limited to this example. Inputting of noise 62 may be omitted in at least one of steps S201 to S203.

As a result of performing the trainings described above by inputting the noise 62 along with the second feature amount, the second metadata identifier 54, the estimator 55, and the decoder 56 can perform learning with respect to domains in which the attribute regarding acquisition of data differs due to the noise 62. With this, a trained learning model 5 (second metadata identifier 54, estimator 55, and decoder 56) can be constructed that is robust to the difference in the attribute regarding acquisition of data, and can perform an estimation task highly accurately.

(E) Learning Data Set

In the embodiment described above, the correct answer data 124 and the different correct answer data 125 may be omitted from learning data sets 121 to be used in the machine learning in steps S201, S203, and S205 to S207. Also, the metadata 123 may be omitted from learning data sets 121 to be used in the machine learning in steps S202 to S205. Learning data sets from which data is omitted may be used in the machine learning in the steps.

(Step S103)

Returning to FIG. 8, in step S103, the control unit 11 operates as the saving processing unit 113, and generates information indicating the structures of the devices 51 to 57 of the trained learning model 5 and the values of the computation parameters as the learning result data 128. The structures of the devices 51 to 57 are specified by the number of layers of the neural networks, the number of neurons included in the layers, connection relationship between neurons in the adjacent layers, for example. When the structures of the devices 51 to 57 are the same within the system, the information regarding the structure may be omitted from the learning result data 128. The control unit 11 saves the generated learning result data 128 in a predetermined storage area.

The predetermined storage area may be the RAM in the control unit 11, the storage unit 12, the storage medium 91, or an external storage apparatus, or a combination of these, for example. The external storage apparatus may be a data server such as a NAS (network attached storage). In this case, the control unit 11 may store the learning result data 128 in the data server via a network using the communication interface 13. Also, the external storage apparatus may be an external storage apparatus connected to the learning apparatus 1, for example. Upon saving the learning result data 128, the control unit 11 ends the series of processes regarding this exemplary operation.

Note that the generated learning result data 128 may be provided to the estimation apparatus 2 and the data generation apparatus 3 at any time. For example, the control unit 11 may transfer the learning result data 128 to the estimation apparatus 2 and the data generation apparatus 3 as the processes in step S103, or in processes different from the processes in step S103. The estimation apparatus 2 and the data generation apparatus 3 may acquire the learning result data 128 by receiving this transfer. Also, the estimation apparatus 2 and the data generation apparatus 3 may also acquire the learning result data 128 by accessing the learning apparatus 1 or a data server via a network using the communication interfaces (23, 33), for example. The learning result data 128 may also be incorporated in the estimation apparatus 2 and the data generation apparatus 3 in advance.

Also, the control unit 11 may repeat the above-described series of processes. During this repetition, the control unit 11 may also generate new training data 192 using the trained first encoder 51, the second encoder 52, and the decoder 56.

Specifically, the control unit 11 may, after performing machine learning of the learning model 5, operates as the data acquiring unit 111, and execute the computation processes of the first encoder 51 by inputting training data 122 of at least one of the plurality of learning data sets 121 to the first encoder 51. With this, the control unit 11 may acquire an output value (first feature amount) from the first encoder 51. Also, the control unit 11 may also acquire an output value (second feature amount) from the second encoder 52 by inputting the training data 122 to the second encoder 52 as well, and executing the computation processes of the second encoder 52.

Also, the control unit 11 may input the first feature amount acquired from the first encoder 51 to the decoder 56, input the noise 63 along with the second feature amount acquired from the second encoder 52 to the decoder 56, and execute the computation processes of the decoder 56. With this, the control unit 11 may acquire output data (decoded data) from the decoder 56. The method for inputting the noise 63 along with the second feature amount and the type of the noise 63 are not limited in particular, and may be similar to those of the above-described noise 62.

The control unit 11 may operate as the learning processing unit 112, and perform the machine learning of the learning model 5 again using the acquired decoded data as new training data 192. Note that, similarly to the learning data set 121, the new training data 192 may be associated with metadata 193, correct answer data 194, and different correct answer data 195. The metadata 193, the correct answer data 194, and the different correct answer data 195 may be acquired as appropriate.

As an example of the method for acquiring the metadata 193, the control unit 11 may input the noise 63 along with the second feature amount acquired from the second encoder 52 to the second metadata identifier 54, and execute the computation processes of the second metadata identifier 54. The control unit 11 may acquire the output value (meta-identification result) obtained from the second metadata identifier 54 by this computation processes as the metadata 193, and associate the acquired metadata 193 with the training data 192. Also, the control unit 11 may receive an input made by an operator via the input apparatus 14, and generate metadata 193 according to the input made by the operator. Also, the control unit 11 may associate the generated metadata 193 with the training data 192.

As an example of the method for acquiring the correct answer data 194, the control unit 11 may input the first feature amount, the second feature amount, and the noise 63 to the estimator 55, and execute the computation processes of the estimator 55. The control unit 11 may acquire an output value (identification result) obtained from the estimator 55 by this computation processes as the correct answer data 194, and associate the acquired correct answer data 194 with the training data 192. Also, the control unit 11 may receive an input made by an operator via the input apparatus 14, and generate correct answer data 194 according to the input made by the operator, for example. Also, the control unit 11 may associate the generated correct answer data 194 with the training data 192. Also, if the feature indicated by the correct answer data 124 associated with training data 122 that was used to generate new training data 192 does not depend on the attribute regarding acquisition of the training data 122, the correct answer data 124 may also be used as the correct answer data 194, for example.

As an example of the method for acquiring the different correct answer data 195, the control unit 11 may receive an input made by an operator via the input apparatus 14, and generate different correct answer data 195 according to the input made by the operator. Also, the control unit 11 may also associate the generated different correct answer data 195 with the training data 192. Also, if the feature indicated by the different correct answer data 125 associated with training data 122 that was used to generate new training data 192 does not depend on the attribute regarding acquisition of the training data 122, the different correct answer data 125 may also be used as the different correct answer data 195, for example.

When the metadata 193 was obtained with respect to training data 192, the control unit 11 can use the training data 192 in the machine learning process in steps S201, S206, and S207 described above. When the correct answer data 194 was obtained with respect to training data 192, the control unit 11 can use the training data 192 in the machine learning process in steps S202 and S204 described above. When the different correct answer data 195 was obtained with respect to training data 192, the control unit 11 can use the training data 192 in the machine learning process in step S204 described above. Also, even in a case where any of the metadata 193, the correct answer data 194, and the different correct answer data 195 are not obtained, the control unit 11 can use the training data 192 in the machine learning process in steps S203 and S205 described above.

As a result of machine learning using the training data 192, the learning model 5 can be caused to learn domains whose attributes regarding acquisition of data differ due to the noise 63. With this, a trained learning model 5 can be constructed that is robust to the difference in the attribute regarding acquisition of data, and can perform an estimation task highly accurately. Note that the method of using the training data 192 is not limited to this example. For example, the control unit 11 may execute learning processing of neural networks that constitute the second encoder 52 using training data 192 as the input data, and using the second feature amount and noise 63 that were input to the decoder 56 when generating the training data 192 as the supervisor data. As described above, the generated training data 192 may be used in partial machine learning of the constituent elements of the learning model 5.

[Estimation Apparatus]

Figure 10:
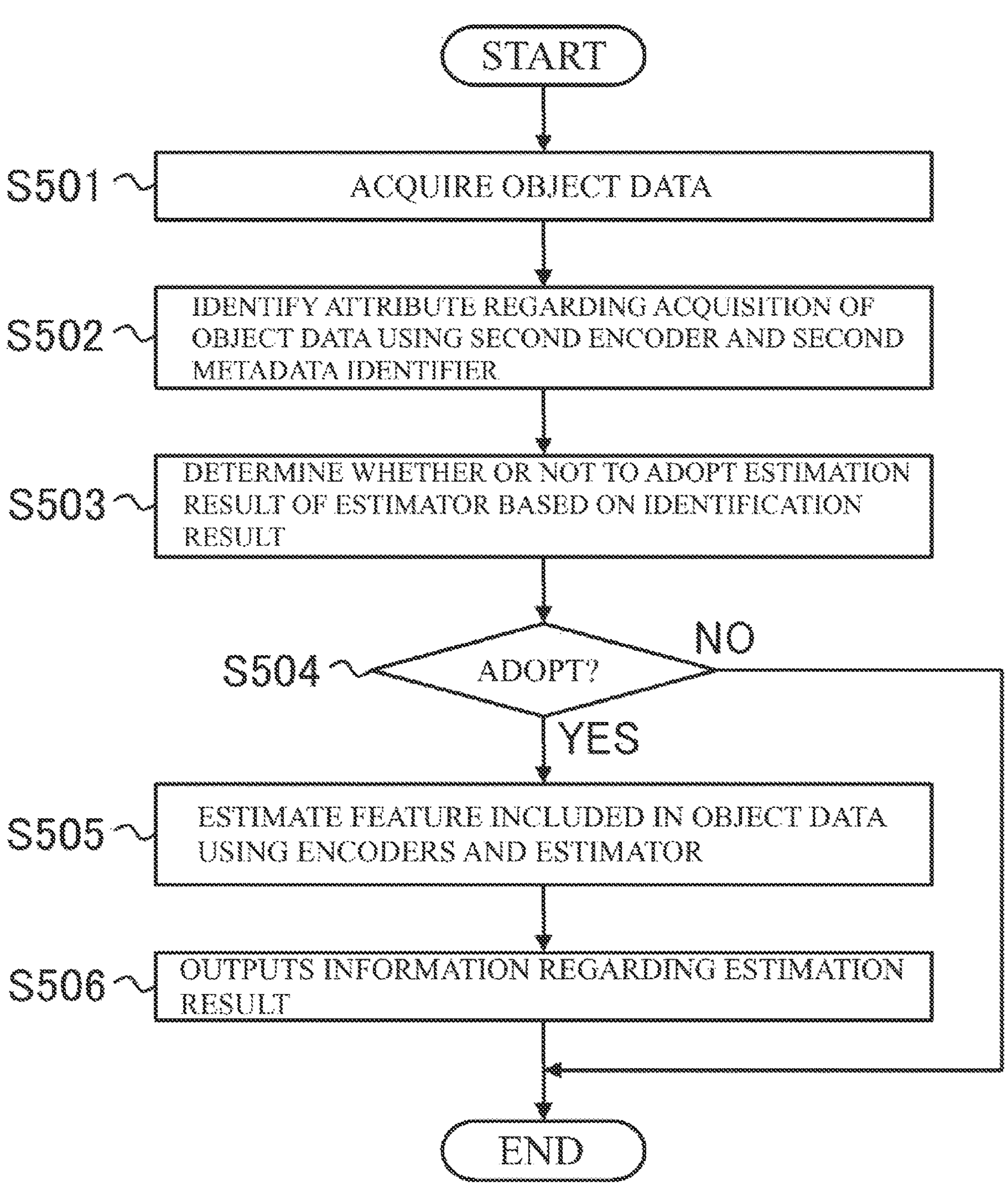
FIG. 10 is a diagram illustrating an example of a procedure of an estimation apparatus according to one or more embodiments.

Next, an exemplary operation of the estimation apparatus 2 will be described using FIG. 10. FIG. 10 is a flowchart illustrating an example of the procedure of the estimation apparatus 2 according to the present embodiment. The procedure described below is an example of an estimation method. Note that the procedure described below is merely an example, and the processes may be changed to the extent possible. Also, in the processing procedure described below, steps may also be omitted, replaced, or added as appropriate depending on the embodiment.

(Step S501)

In step S501, the control unit 21 operates as the data acquiring unit 211, and acquires object data 221 regarding which an estimation task is to be performed. In the present embodiment, the estimation apparatus 2 is connected to a sensor S via the external interface 27. Therefore, the control unit 21 acquires sensing data generated by the sensor S via the external interface 27 as object data 221.

Note that the way in which the object data 221 is acquired is not limited to this example, and may be determined as appropriate depending on the embodiment. For example, a sensor S may be connected to another computer that is different from the estimation apparatus 2. In this case, the control unit 21 may acquire the object data 221 by receiving the object data 221 transmitted from the other computer. Upon acquiring the object data 221, the control unit 21 advances the process to the next step S502.

(Step S502)

In step S502, the control unit 21 operates as the evaluating unit 212, and identifies the attribute regarding acquisition of the object data 221 using the second encoder 52 and the second metadata identifier 54 that were trained by the learning apparatus 1.

In the present embodiment, the control unit 21 configures the settings of the trained second encoder 52 and the second metadata identifier 54 by referring to the learning result data 128. Next, the control unit 21 inputs the acquired object data 221 to the second encoder 52, and executes the computation processes of the second encoder 52 and the second metadata identifier 54. That is, the control unit 21 inputs the object data 221 to the input layer 521 of the second encoder 52, and determines, sequentially from the input side, how each of the neurons included in the layers (521 to 523, 541 to 543) fires. With this computation processes, the control unit 21 acquires an output value corresponding to the result of identifying the attribute regarding acquisition of the object data 221 from the output layer 543 of the second metadata identifier 54. That is, the control unit 21 can identify the attribute regarding acquisition of the object data 221 by acquiring the output value of the second metadata identifier 54. Upon identifying the attribute regarding acquisition of the object data 221, the control unit 21 advances the process to the next step S503.

(Steps S503 and S504)

In step S503, the control unit 21 operates as the evaluating unit 212, and determines whether or not to adopt the result of estimation of the feature included in the object data 221 performed by the estimator 55 or the additional estimator 57 based on the result of identifying the attribute regarding acquisition of the object data 221. In step S504, the control unit 21 determines to where the process branches based on the determination result in step S503.

If the identification result in step S502 matches the correct answer value of the attribute regarding acquisition of the object data 221, the control unit 21 determines to adopt the result of estimation performed by the estimator 55 or the additional estimator 57, and advances the process to the next step S505. On the other hand, if the identification result in step S502 does not match the correct answer value of the attribute regarding acquisition of the object data 221, the control unit 21 determines not to adopt the result of estimation performed by the estimator 55 or the additional estimator 57, omits the processes in steps S505 and S506, and ends the series of processes according to this exemplary operation. In this case, the control unit 21 may also output a message notifying that it is highly possible that the estimation task cannot be appropriately performed on the obtained object data 221 to the output apparatus 25.

Note that the correct answer value of the attribute regarding acquisition of the object data 221 may be acquired as appropriate. For example, the control unit 21 may receive an input made by an operator via the input apparatus 24, and acquire the correct answer value of the attribute regarding acquisition of the object data 221 based on the input made by the operator. Also, the control unit 21 may acquire the correct answer value of the attribute regarding acquisition of the object data 221 by referring to reference information indicating the usage mode, specification, observation environment, and the like of the sensor S, for example. This reference information may be retained in a predetermined storage area such as the RAM in the control unit 21, the storage unit 22, the storage medium 92, a storage area of the sensor S, or an external storage apparatus, for example.

(Step S505)

In step S505, the control unit 21 operates as the estimating unit 213, and estimates the feature included in the acquired object data 221 using the first encoder 51, the second encoder 52, and the estimator 55 that were trained by the learning apparatus 1. Alternatively, the control unit 21 estimates the feature included in the acquired object data 221 using the first encoder 51 and the additional estimator 57 that were trained by the learning apparatus 1.

When the first encoder 51, the second encoder 52, and the estimator 55 are used for an estimation task, the control unit 21 further configures the settings of the trained first encoder 51 and estimator 55 by referring to the learning result data 128. This setting process may be executed at the same time as the above-described step S502. The control unit 21 inputs the object data 221 to the input layers (511, 521) of the encoders (51, 52), and executes computation processes of the first encoder 51, the second encoder 52, and the estimator 55. With this, the control unit 21 acquires an output value corresponding to the result of estimating the feature included in the object data 221 from the output layer 553 of the estimator 55.

On the other hand, when the first encoder 51 and the additional estimator 57 are used for the estimation task, the control unit 21 configures the settings of the trained first encoder 51 and additional estimator 57 by referring to the learning result data 128. This setting process may be executed at the same time as the above-described step S502. The control unit 21 inputs the object data 221 to the input layer 511 of the first encoder 51, and executes the computation processes of the first encoder 51 and the additional estimator 57. With this, the control unit 21 acquires an output value corresponding to the result of estimating the feature included in the object data 221 from the output layer 573 of the additional estimator 57.

In a case where information specific to the attribute regarding acquisition of the object data 221 is useful for the estimation task, it is preferable to estimate the feature included in the object data 221 using the former method. On the other hand, in a case where information specific to the attribute regarding acquisition of the object data 221 exerts a bad influence on the estimation task, it is preferable to estimate the feature included in the object data 221 using the latter method. For example, a scenario is possible in which traffic conditions on a road are estimated from sensing data obtained from a sensor that observes vehicles moving on the road. In this scenario, when the traffic conditions are estimated that are specific to the observation location of the sensor such as the probability of occurrence of congestion, or required time until a predetermined location, it is preferable to execute the estimation task using the former method. On the other hand, when the traffic conditions are estimated that show a relatively low dependency on the observation location of the sensor such as whether or not congestion is occurring or the number of moving vehicles, at the time of observation, it is preferable to execute the estimation task using the latter method. Upon completing estimation of the feature included in the object data 221, the control unit 21 advances the process to the next step S506.

Note that the additional estimator 57 to be used in this step S505 may be replaced by a different estimator that has been trained by machine learning that is different from the above-described series of machine learning of the learning apparatus 1. That is, in the latter method, the control unit 21 may use the different estimator instead of the additional estimator 57. As a result of the machine learning in which the output value of the first encoder 51 is used as the input data, and the different correct answer data 125 is used as the supervisor data, the different estimator can be constructed. The machine learning of the different estimator may be performed by the learning apparatus 1, may be performed by the estimation apparatus 2, or may also be performed by another computer that is different from the learning apparatus 1 and the estimation apparatus 2. In this case, the estimation apparatus 2 may acquire the learning result data regarding the different estimator at any time.

(Step S506)

In step S506, the control unit 21 operates as the output unit 214, and outputs information regarding the result of estimating the feature.

The output destination and the contents of information to be output may be determined as appropriate depending on the embodiment. For example, the control unit 21 may output the result of estimating the feature included in the object data 221 to the output apparatus 25 as is. Also, the control unit 21 may also execute some information processes based on the estimation result, for example. Also, the control unit 21 may output the result of executing the information processes as the information regarding the estimation result. The outputting of the result of executing the information processes may include outputting a specific message such as a warning according to the estimation result, controlling the operation of an apparatus to be controlled according to the estimation result, or the like. The output destination may be the output apparatus 25, an apparatus to be controlled, or the like. Upon completing the output of information regarding the estimation result, the control unit 21 ends the series of processes according to this exemplary operation.

(Other Considerations)

(A) Processing Sequence

Note that, in the example of the procedure described above, before executing the estimation processing in step S505, the control unit 21 determines whether or not the result of estimation processing is adopted, and if it is determined that the result of estimation processing is not adopted, the processes in steps S505 and S506 are not executed. However, the method of not adopting the result of estimation processing is not limited to this example. For example, after executing the processes in step S505, the control unit 21 may also execute the processes in steps S502 and S503. Also, if it is determined to not adopt the result of estimation processing, the control unit 21 may discard the result of processes in step S505, and may also omit execution of the processes in step S506. On the other hand, if it is determined to adopt the result of estimation processing, the control unit 21 may execute the processes in step S506.

(B) Case where a Plurality of Learning Models 5 are Present

Also, when a plurality of trained learning models 5 have been acquired, the control unit 21 may select a trained learning model 5 that can appropriately execute the estimation task on the object data 221, from the plurality of trained learning models 5, based on the evaluation result described above. The trained learning model 5, of which the result of meta-identification performed by the second metadata identifier 54 matches the correct answer value of the attribute regarding acquisition of the object data 221, can appropriately execute the estimation task on the object data 221. The control unit 21 may use the selected trained learning model 5 in the processes in step S505.

(C) Example of Other Evaluation Method

In the example of the procedure described above, it is evaluated whether or not the estimation task can be appropriately performed on the object data 221 using the trained second encoder 52 and second metadata identifier 54. However, the evaluation method is not limited to this example. For example, the control unit 21 may also use the trained first encoder 51, the second encoder 52, and the decoder 56.

That is, in the above-described step S502, the control unit 21 inputs the acquired object data 221 to the input layers (511, 521) of the encoders (51, 52), and executes the computation processes of the first encoder 51, the second encoder 52, and the decoder 56. With this, the control unit 21 acquires output data corresponding to the result of decoding the object data 221 (decoded data) from the first and second feature amounts, from the output layer 563 of the decoder 56.

As the acquired decoded data diverges from the object data 221, it indicates that the possibility that the estimation task cannot be appropriately executed on the object data 221 is higher. Therefore, the control unit 21 compares the acquired decoded data with the object data 221, and determines whether or not to adopt the result of estimation of the feature included in the object data 221 performed by the estimator 55 or the additional estimator 57 according to whether or not the decoded data matches the object data 321, based on the comparison result. The decoded data may be compared with the object data 221 with any method. For example, the control unit 21 may calculate the matching degree between the decoded data and the object data 221, as the comparison process. In this case, the control unit 21 may determine to adopt the result of estimation by the estimator 55 or the additional estimator 57, if the matching degree between the decoded data and the object data 221 is a threshold value or more. On the other hand, the control unit 21 may determine not to adopt the result of estimation by the estimator 55 or the additional estimator 57, if the matching degree between the decoded data and the object data 221 is less than the threshold value. The threshold value may be determined as appropriate.

[Data Generation Apparatus]

Figure 11:
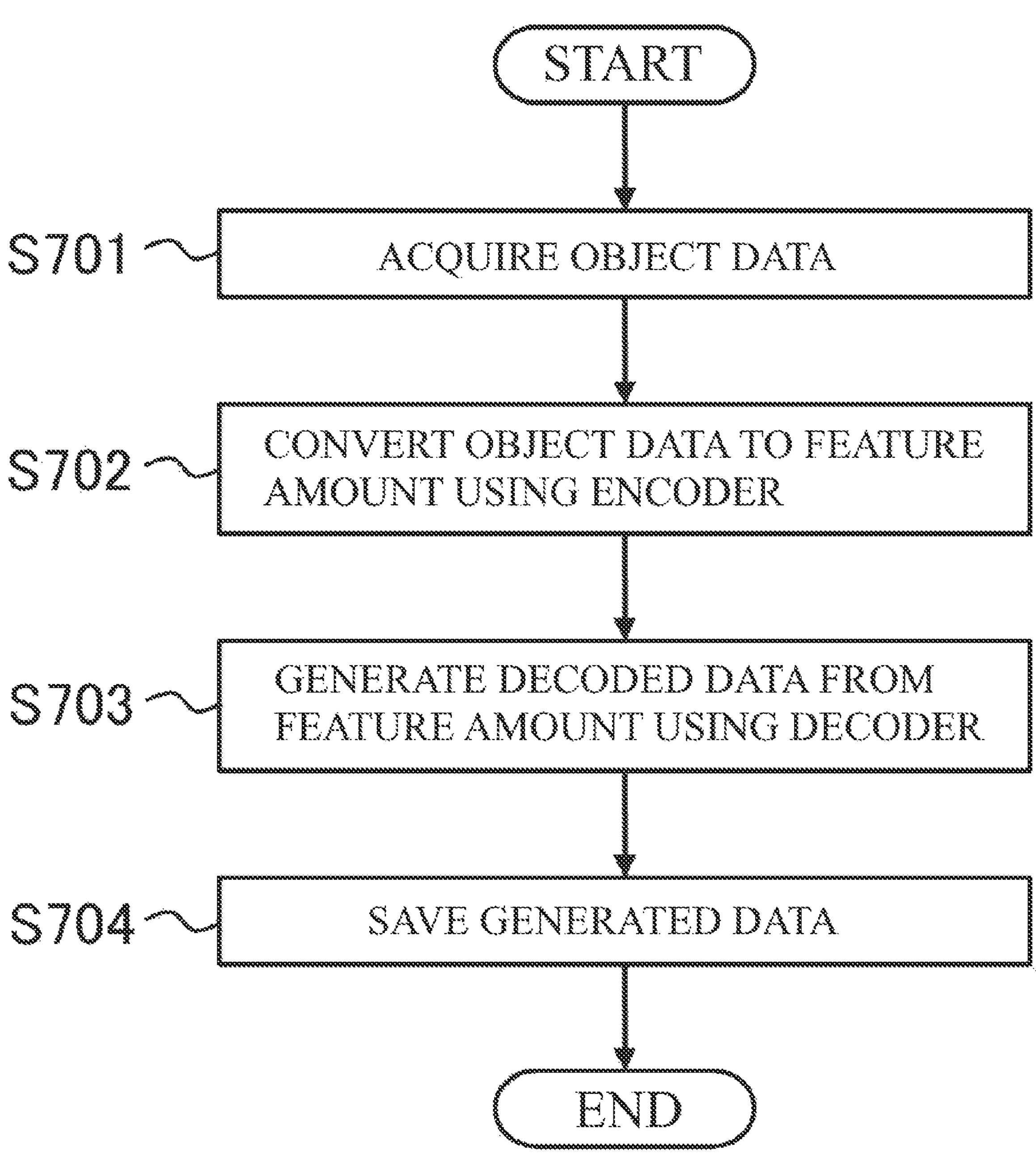
FIG. 11 is a diagram illustrating an example of a procedure of a data generation apparatus according to one or more embodiments.

Next, an exemplary operation of the data generation apparatus 3 will be described using FIG. 11. FIG. 11 is a flowchart illustrating an example of the procedure of the data generation apparatus 3 according to the present embodiment. The procedure described below is an example of the data generation method. Note that the procedure described below is merely an example, and the processes may be changed to the extent possible. Also, in the processing procedure described below, steps may also be omitted, replaced, or added as appropriate depending on the embodiment.

(Step S701)

In step S701, the control unit 31 operates as the data acquiring unit 311, and acquires object data 321 based on which new data is generated. In the present embodiment, the data generation apparatus 3 is connected to a sensor S via the external interface 37. Therefore, the control unit 31 acquires sensing data generated by the sensor S via the external interface 37, as the object data 321.

Note that the way in which the object data 321 is acquired is not limited to this example, and may be determined as appropriate depending on the embodiment. For example, a sensor S may be connected to another computer that is different from the data generation apparatus 3. In this case, the control unit 31 may acquire the object data 321 by receiving the object data 321 transmitted from the other computer. Upon acquiring the object data 321, the control unit 31 advances the process to the next step S702.

(Steps S702 and S703)

In step S702, the control unit 31 operates as the generating unit 312, and acquires an output value (first feature amount) from the first encoder 51 by giving the object data 321 to the first encoder 51 trained by the learning apparatus 1. In the next step S703, the control unit 31 generates the decoded data by decoding the object data 321 from the output value (first feature amount) acquired from the first encoder 51 using the trained decoder 56, without giving an output value (second feature amount) acquired from the second encoder 52.

In the present embodiment, the control unit 31 configures the settings of the trained first encoder 51 and the decoder 56 by referring to the learning result data 128. The control unit 31 inputs the object data 321 to the input layer 511 of the first encoder 51, and executes the computation processes of the first encoder 51. With this, the control unit 31 acquires the output value (first feature amount) from the output layer 513 of the first encoder 51.

Next, the control unit 31 inputs the first feature amount acquired from the first encoder 51 to corresponding neurons in the input layer 561 of the decoder 56. On the other hand, the control unit 31 inputs data irrelevant to the second feature amount that is obtained from the object data 321 to a neuron (node) that receives input of the second feature amount in the input layer 561 of the decoder 56.

For example, the control unit 31 may input numerical data representing zero to corresponding neurons in the input layer 561 as data that is irrelevant to the second feature amount. Also, the control unit 31 may also input numerical data representing a random number to the corresponding neurons in the input layer 561 as data that is irrelevant to the second feature amount, for example.

Also, the control unit 31 may further configure setting of the trained second encoder 52 by referring to the learning result data 128, for example. Also, the control unit 31 may input data irrelevant to the object data 321 to the second encoder 52, and execute computation processes of the second encoder 52. Data that is irrelevant to the object data 321 may be numerical data representing zero, numerical data representing a random number, data obtained by at least partially transforming the object data 321, or data acquired under conditions different from the object data 321, for example. The transformation of the object data 321 may be performed with a known numerical transformation method. The control unit 31 may input the output value obtained from the output layer 523 of the second encoder 52 by the computation processes to the corresponding neuron in the input layer 561 as data irrelevant to the second feature amount obtained from the object data 321.

After inputting data irrelevant to the first feature amount acquired from the first encoder 51 and the second feature amount obtained from the object data 321 to the corresponding neuron in the input layer 561, the control unit 31 executes the computation processes of the decoder 56. With this, the control unit 31 acquires output data corresponding to the result (decoded data) of decoding the object data 321 from the first feature amount, without giving the second feature amount, from the output layer 563 of the decoder 56. Upon generating the decoded data in the computation processes, the control unit 31 advances the process to the next step S704.

(Step S704)

In step S704, the control unit 31 operates as the saving processing unit 313, and saves the generated decoded data in a predetermined storage area as new data. The predetermined storage area may be the RAM in the control unit 31, the storage unit 32, the storage medium 93, or an external storage apparatus, or a combination of these for example. The external storage apparatus may be a data server such as a NAS. In this case, the control unit 31 may store the decoded data to the data server via a network using the communication interface 33. Also, the external storage apparatus may be an external storage apparatus connected to the data generation apparatus 3, for example.

The decoded data to be generated corresponds to data obtained by removing information regarding the second feature amount (that is, information corresponding to the attribute regarding acquisition of the object data 321) from the object data 321. That is, the present embodiment can be used in a scenario in which data in which the information specific to a domain is removed from the object data 321 is generated. For example, when training data 122 is obtained with respect to a person, and metadata 123 includes personal information of the person, in each learning data set 121 used for machine learning, decoded data that does not include the personal information of the subject can be generated. The generated decoded data may be used for machine learning of an estimator that is configured to analyze a feature that appears in common across domains, or estimate the feature from object data, for example.

The control unit 31 may save the generated decoded data in a predetermined storage area so that it can be used in one of these applications. For example, the control unit 31 may save the generated decoded data in a storage area that can be accessed from a computer that uses the decoded data in one of these applications, for example. Upon completing saving of the decoded data, the control unit 31 ends the series of processes according to this exemplary operation.

Note that the new data to be generated by the data generation apparatus 3 is not limited to the decoded data. The control unit 31 may generate at least one of the first and second feature amounts using at least one of the first encoder 51 and the second encoder 52. In this case, the control unit 31 may save at least one of the generated first and second feature amounts in a predetermined storage area as new data.

The first feature amount is likely to include a component corresponding to information other than the attribute regarding acquisition of the object data 321 (e.g. information that appears in common across domains). On the other hand, the second feature amount is likely to include a component corresponding to the attribute regarding acquisition of the object data 321 (that is, information specific to a domain). Therefore, the first feature amount may be used for machine learning of an estimator that is configured to analyze a feature that appears in common across domains, or estimate the feature from object data, for example. The second feature amount may be used for machine learning of an estimator that is configured to analyze information specific to a domain, or estimate the feature from object data, for example.

Also, the control unit 31 may generate new data with a method similar to that of the above-described training data 192. That is, the control unit 31 may input the object data 321 to the input layers (511, 521) of the encoders (51, 52), and execute the computation processes of the encoders (51, 52). With this, the control unit 31 may acquire feature amounts from the output layers (513, 523) of the encoders (51, 52). Also, the control unit 31 may input the first feature amount, the second feature amount, and noise to the input layer 561 of the decoder 56, and execute the computation processes of the decoder 56. With this, the control unit 31 may acquire decoded data from the output layer 563 of the decoder 56. The control unit 31 may save the acquired decoded data in a predetermined storage area. According to this generation method, new data (decoded data) can be generated that is changed from the object data 321 with respect to the attribute regarding acquisition by an amount corresponding to the noise. The data generation apparatus 3 may acquire training data 122 of the above-described learning apparatus 1 as the object data 321, and return the decoded data generated with this method to the learning apparatus 1 as the training data 192. With this, the amount of training data retained by the learning apparatus 1 can be increased, and as a result of using the training data in machine learning, a trained learning model 5 can be constructed that can execute an estimation task with comparatively high accuracy.

Also, the control unit 31 may evaluate whether or not the encoders (51, 52) can appropriately calculate the feature amount with respect to object data 321 with an evaluation method similar to that of the above-described estimation apparatus 2. When the meta-identification result by the second metadata identifier 54 matches the correct answer value of the attribute regarding acquisition of the object data 321, or the decoded data obtained by the decoder 56 matches the object data 321, the control unit 31 may adopt the data generated by the above-described series of processes. On the other hand, when the meta-identification result by the second metadata identifier 54 does not match the correct answer value of the attribute regarding acquisition of the object data 321, or the decoded data obtained by the decoder 56 does not match the object data 321, the control unit 31 may omit the above-described series of processes regarding generation of data. Alternatively, the control unit 31 may also discard the data generated by the above-described series of processes.

[Features]

As described above, in the present embodiment, the trained first encoder 51, second encoder 52, and estimator 55 can learn the capability of executing a task of estimating a feature included in the object data based on the information specific to a domain from which the object data is acquired and information that is common across domains, by the machine learning in steps S201 to S208. Also, the trained first encoder 51 and additional estimator 57 can learn the capability of executing a task of estimating a feature included in the object data based on the information that is common across domains, by removing the influence of information specific to a domain. Therefore, a trained learning model 5 can be constructed that can execute an estimation task with comparatively high accuracy, in step S505 executed by the estimation apparatus 2, in both of the cases where information specific to the attribute regarding acquisition of the object data 221 is useful for the estimation task, and where this information exerts a bad influence thereon.

Also, in the present embodiment, the first encoder 51 and the second encoder 52 can be used, in common, for object data (211, 311) obtained from different domains. Therefore, in the present embodiment, the time and effort needed for preparing a trained extractor for every domain from which the object data (211, 311) is acquired can be saved.

Moreover, as a result of using the trained second encoder 52 and second metadata identifier 54, it can be evaluated whether or not the trained learning model 5 can appropriately execute an estimation task on object data 221, in the processes in steps S502 to S504. A trained learning model 5 can be prevented from being used on object data 221 on which the estimation task cannot be appropriately performed, or a trained learning model 5 that is suitable for the object data 221 can be selected, based on this evaluation result.

Therefore, according to the present embodiment, a trained learning model 5 can be constructed whose introduction cost is relatively low and that is robust to the difference in attributes regarding acquisition of object data.

4. Modifications

Although an embodiment of the present invention has been described above in detail, the above descriptions are merely examples of the present invention in all aspects. Needless to say, various improvements and modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The learning apparatus 1, estimation apparatus 2, and data generation apparatus 3 according to the embodiment described above are applied to a scenario in which a feature included in sensing data obtained by a sensor S is estimated. However, the application range of the embodiment described above is not limited to this example. The above-described embodiment may also be applied to a scenario in which a feature included in data obtained not from a sensor is estimated. The above-described embodiment can be applied to any scenario in which a predetermined estimation task is performed on predetermined data. In the following, modifications in which the application scenario is limited will be illustrated.

(A) Scenario in which Traffic Conditions are Estimated

Figure 12:
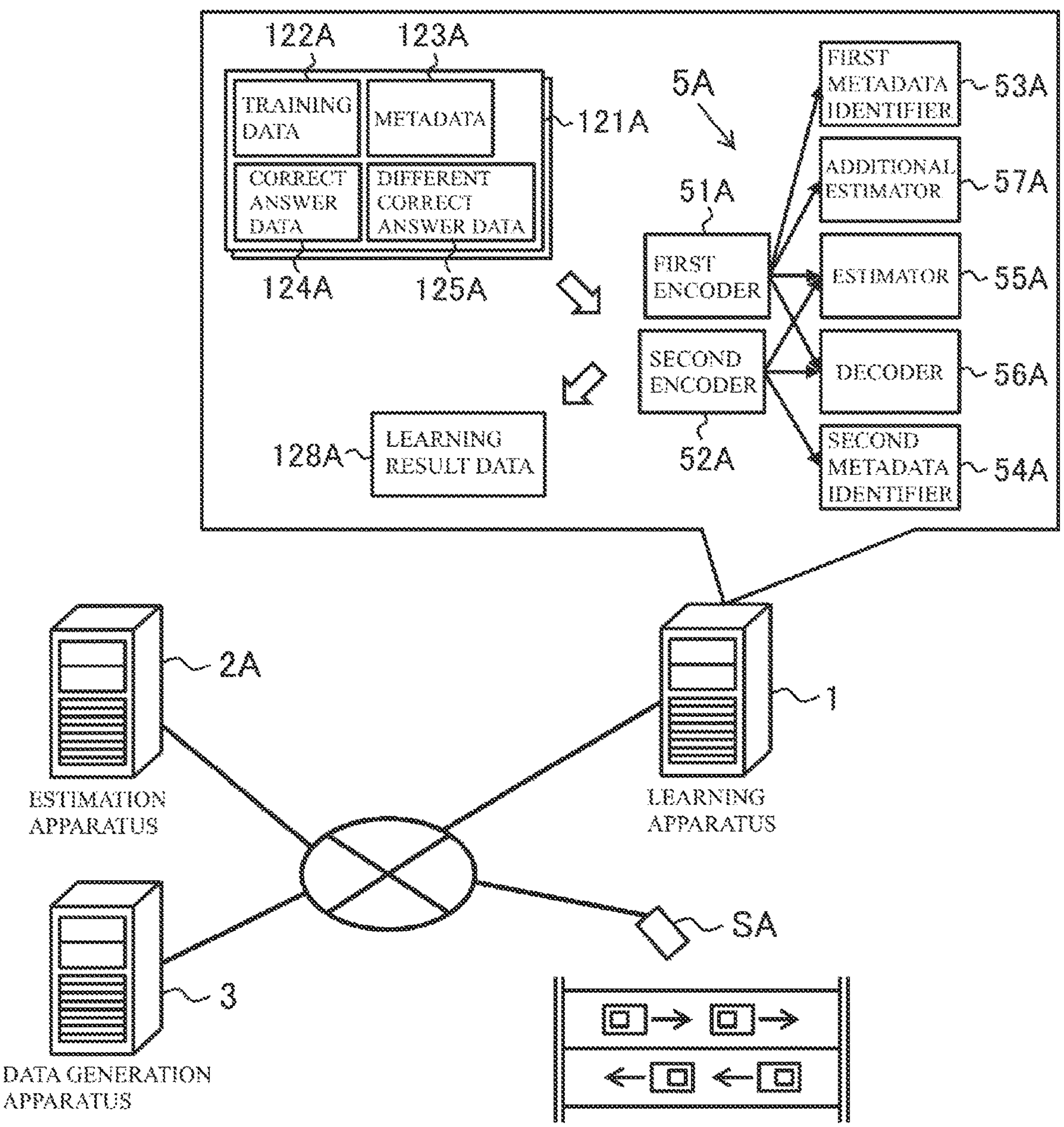
FIG. 12 is a schematic diagram illustrating an example of another scenario to which one or more embodiments may be applied.

FIG. 12 schematically illustrates an example of a scenario to which a system according to the first modification is applied. This modification is an example in which the above-described embodiment is applied to a scenario in which traffic conditions of vehicles moving on a road are estimated. As shown in FIG. 12, the system according to the present embodiment includes the learning apparatus 1, an estimation apparatus 2A, and the data generation apparatus 3. Similarly to the above-described embodiment, the learning apparatus 1, the estimation apparatus 2A, and the data generation apparatus 3 may be connected to each other via a network. The system according to this modification may be configured similarly to the above-described embodiment, except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121A for learning estimation of traffic conditions. Each learning data set 121A is constituted by a combination of training data 122A, metadata 123A, correct answer data 124A, and different correct answer data 125A, similarly to the above-described learning data set 121. The training data 122A, the metadata 123A, the correct answer data 124A, and the different correct answer data 125A respectively correspond to the training data 122, the metadata 123, the correct answer data 124, and the different correct answer data 125 according to the embodiment described above.

The training data 122A is sensing data obtained by a sensor SA that observes vehicles moving on a road or a sensor of the same type (hereinafter, collectively referred to as "sensor SA" including a sensor of the same type), for example. There is no particular limitation to the type of the sensor SA, which may be selected as appropriate depending on the embodiment, as long as the vehicles moving on a road can be observed. The sensor SA may be a camera, an ultrasonic sensor, an infrared sensor, or the like. The training data 122A may be constituted by image data, data indicating the result of measuring the number of vehicles that pass per unit time, and data indicating the result of measuring the average speed of passing vehicles, for example.

The metadata 123A indicates attributes of a road, observation angles of the sensors SA, installation intervals of the sensors SA, or the type of the sensor SA, or a combination of these, as the attribute regarding acquisition of the training data 122A, for example. The attributes of a road may include information indicating whether or not the road is a straight road, whether or not the road is a curving road, whether or not a tollgate of a toll road is present, whether or not a junction is present, whether or not a branching point is present, for example.

The correct answer data 124A and the different correct answer data 125A indicate information regarding traffic conditions on a road, as the feature included in training data 122A, for example. In this modification, the correct answer data 124A and the different correct answer data 125A may indicate information regarding the traffic conditions on a road in a period from a point in time at which the training data 122A has been acquired until a point in time to come. The information regarding the traffic conditions on a road may include information indicating whether or not congestion is occurring, the probability that congestion occurs, the duration of occurred congestion, or the time required from the installed location of a sensor SA to a predetermined location, for example. Whether or not congestion is occurring may be expressed by information indicating whether or not congestion will occur after a predetermined time.

Note that a scenario is possible in which sensors SA are installed in a plurality of road sections, and sensing data obtained by each sensor SA is collected as training data 122A, in order to estimate the probability that congestion occurs in each road section. In this scenario, if the ratio between data at the time of congestion and data that is not at the time of congestion, in the obtained training data 122A, differs considerably between the first road section and the second road section, it is possible that machine learning of the learning model 5 cannot be appropriately performed. In this case, processes such as deleting some data or adding new data may be performed in order to adjust the ratio of the data.

In step S102, the learning apparatus 1 performs machine learning of the learning model 5A using the plurality of learning data sets 121A that are each constituted by a combination of training data 122A, metadata 123A, correct answer data 124A, and different correct answer data 125A, similarly to the embodiment described above. The learning model 5A may be configured similarly to the learning model 5 according to the embodiment described above. That is, the learning model 5A includes a first encoder 51A, a second encoder 52A, a first metadata identifier 53A, a second metadata identifier 54A, an estimator 55A, a decoder 56A, and an additional estimator 57A. The devices 51A to 57A correspond to the devices 51 to 57 according to the embodiment described above. The configurations of the devices 51A to 57A may be similar to those of the devices 51 to 57 according to the embodiment described above.

As a result of the machine learning, the second encoder 52A is trained to convert training data 122A to a second feature amount including a component corresponding to the attribute regarding acquisition of the training data 122A that is indicated by metadata 123A. The first encoder 51A is trained to convert training data 122A to a first feature amount including a component corresponding to information other than the attribute regarding acquisition of the training data 122A, that is, information that appears in common across domains from which training data 122A is acquired, for example. The portion including the estimator 55A or the additional estimator 57A in the learning model 5A acquires the capability of estimating traffic conditions from the sensing data obtained by the sensor SA. Also, the portion including the decoder 56A in the learning model 5A acquires the capability of generating decoded data of the same type as the sensing data obtained by the sensor SA.

In step S103, the learning apparatus 1 generates information regarding the trained learning model 5A as learning result data 128A, and saves the generated learning result data 128A in a predetermined storage area. The generated learning result data 128A may be provided to the estimation apparatus 2A and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described steps S701 to S704. With this, the data generation apparatus 3 can generate decoded data from object sensing data using the trained first encoder 51A and decoder 56A. The decoded data corresponds to data obtained by removing the information corresponding to the attribute regarding acquisition of object sensing data from the object sensing data. Also, the data generation apparatus 3 may generate new data (decoded data) in which the attribute regarding acquisition is changed by an amount corresponding to noise, using the trained first encoder 51A, second encoder 52A, and decoder 56A. Moreover, the data generation apparatus 3 may also generate data of at least one of the first and second feature amounts using at least one of the trained first encoder 51A and the second encoder 52A.

The estimation apparatus 2A corresponds to the estimation apparatus 2 described above. The estimation apparatus 2A may be configured similarly to the estimation apparatus 2 described above, except that the data that they use is different. In this modification, the estimation apparatus 2A is connected to the sensor SA via a network. The estimation apparatus 2A acquires object sensing data from the sensor SA. Then, the estimation apparatus 2A estimates the traffic conditions on a road of interest based on the acquired object sensing data using the trained learning model 5A constructed by the learning apparatus 1.

<Hardware Configuration of Estimation Apparatus>

Figure 13A:
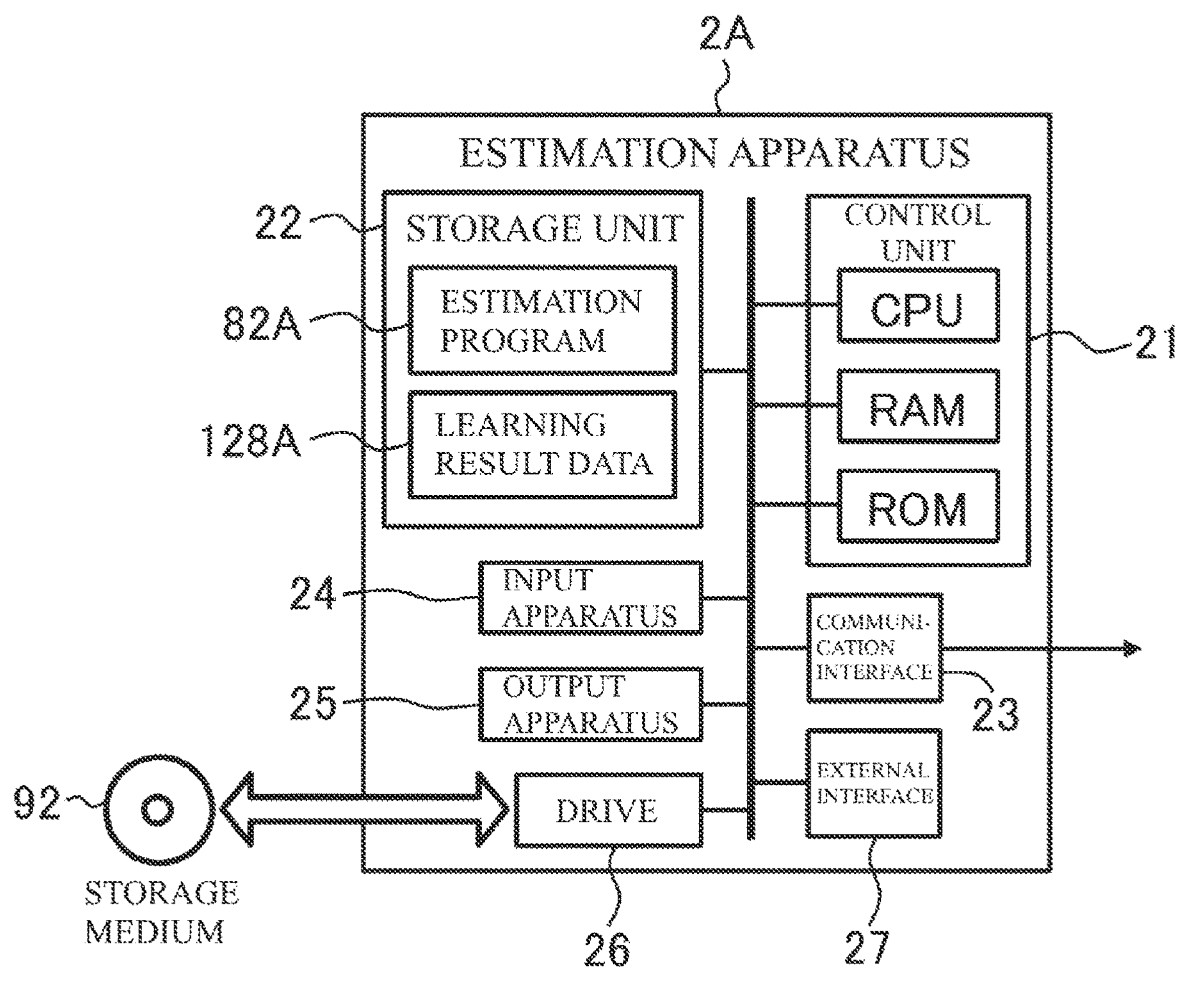
FIG. 13A is a schematic diagram illustrating an example of a hardware configuration of an estimation apparatus according to another mode.

FIG. 13A schematically illustrates an example of a hardware configuration of the estimation apparatus 2A according to this modification. As shown in FIG. 13A, the estimation apparatus 2A according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. The estimation apparatus 2A is connected to the sensor SA via the communication interface 23. The sensor SA may be arranged as appropriate at a predetermined road regarding which the traffic conditions are to be monitored. Note that the hardware configuration of the estimation apparatus 2A is not limited to this example. Regarding the specific hardware configuration of the estimation apparatus 2A, constituent elements can be omitted, replaced, and added as appropriate depending on the embodiment. The estimation apparatus 2A may be a general-purpose server apparatus, a general-purpose PC, or the like, instead of an information processing apparatus that is specifically designed for the service to be provided.

The storage unit 22 of the estimation apparatus 2A according to this modification stores various types of information such as an estimation program 82A and the learning result data 128A. The estimation program 82A and learning result data 128A correspond to the estimation program 82 and learning result data 128 according to the embodiment described above. At least one of the estimation program 82A and the learning result data 128A may be stored in a storage medium 92. Also, the estimation apparatus 2A may acquire at least one of the estimation program 82A and the learning result data 128A from the storage medium 92.

<Software Configuration and Exemplary Operation of Estimation Apparatus>

Figure 13B:
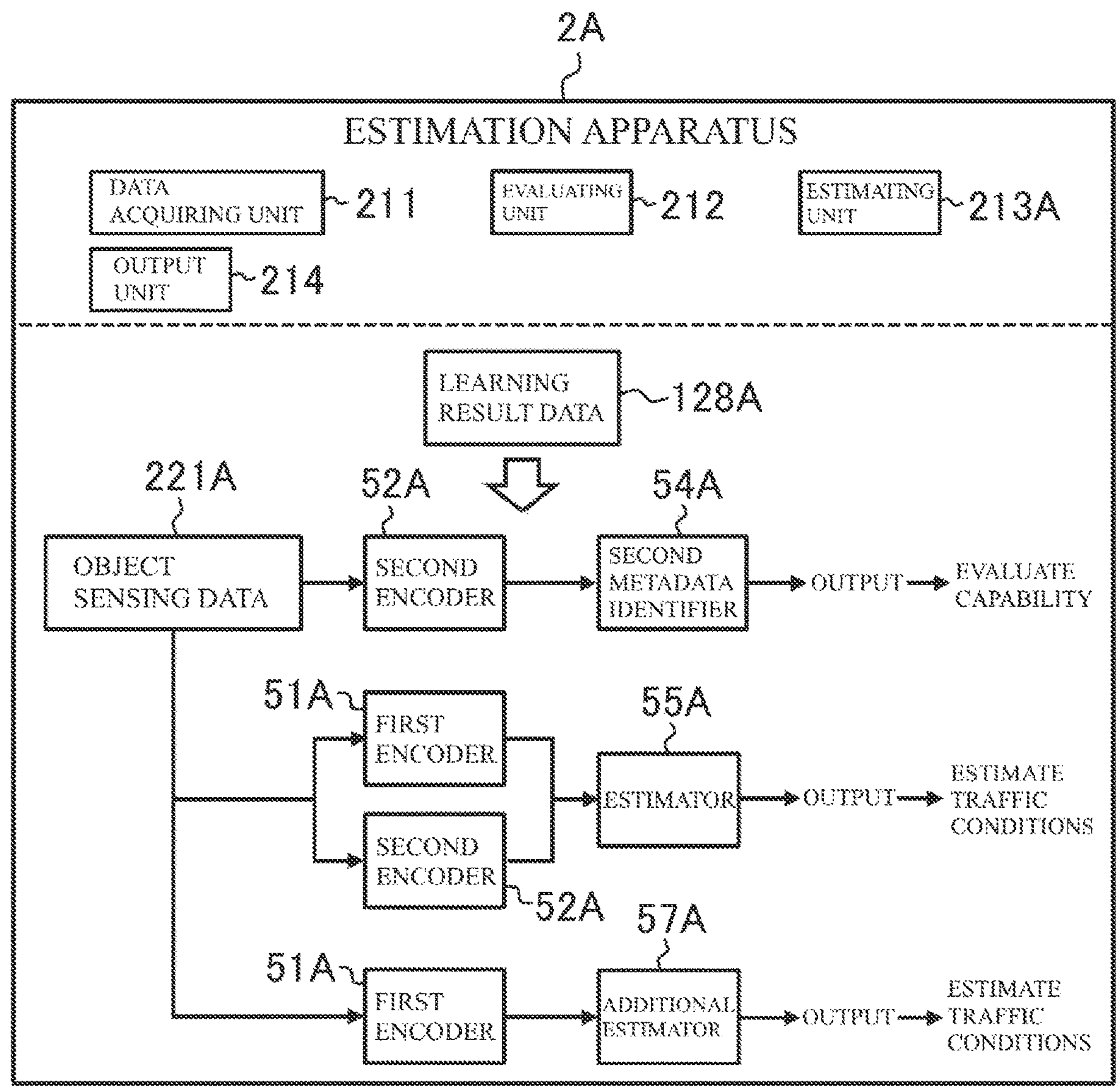
FIG. 13B is a schematic diagram illustrating an example of a hardware configuration of an estimation apparatus according to another mode.

FIG. 13B schematically illustrates an example of a software configuration of the estimation apparatus 2A according to this modification. The software configuration of the estimation apparatus 2A is realized by the control unit 21 executing the estimation program 82A, similarly to the above-described embodiment. As shown in FIG. 13B, the software configuration of the estimation apparatus 2A is similar to the software configuration of the estimation apparatus 2 described above, except that sensing data obtained by the sensor SA that observes vehicles moving on a road is used. Accordingly, the estimation apparatus 2A executes series of processes regarding the estimation processes, similarly to the estimation processes of the estimation apparatus 2 described above.

That is, in step S501, the control unit 21 operates as the data acquiring unit 211, and acquires object sensing data 221A on which traffic conditions on a road of interest are reflected, from the sensor SA. In step S502, the control unit 21 operates as the evaluating unit 212, and identifies the attribute regarding acquisition of object sensing data 221A using the second encoder 52A and second metadata identifier 54A that were trained by the learning apparatus 1. Specifically, the control unit 21 configures the settings of the trained second encoder 52A and second metadata identifier 54A by referring to the learning result data 128A. Next, the control unit 21 inputs the acquired object sensing data 221A to the second encoder 52A, and executes computation processes of the second encoder 52A and the second metadata identifier 54A. With these computation processes, the control unit 21 acquires an output value corresponding to the result of identifying the attribute regarding acquisition of the object sensing data 221A, from the second metadata identifier 54A.

In step S503, the control unit 21 operates as the evaluating unit 212, and determines whether or not the result of estimation by the estimator 55A or the additional estimator 57A is adopted, based on the result of identifying the attribute regarding acquisition of the object sensing data 221A. In step S504, the control unit 21 determines to where the process branches based on the determination result in step S503.

If the identification result in step S502 matches the correct answer value of the attribute regarding acquisition of the object sensing data 221A, the control unit 21 determines that the result of estimation by the estimator 55A or the additional estimator 57A is adopted, and advances the process to the next step S505. On the other hand, if the identification result in step S502 does not match the correct answer value of the attribute regarding acquisition of the object sensing data 221A, the control unit 21 determines that the result of estimation by the estimator 55A or the additional estimator 57A is not adopted, skips processes in steps S505 and S506, and ends the series of processes according to this modification.

In step S505, the control unit 21 operates as the estimating unit 213A, and estimates the traffic conditions on the road of interest from the object sensing data 221A using the first encoder 51A, second encoder 52A, and estimator 55A that were trained by the learning apparatus 1. Alternatively, the control unit 21 estimates the traffic conditions on the road of interest from the object sensing data 221A using the first encoder 51A and the additional estimator 57A that were trained by the learning apparatus 1.

Specifically, the control unit 21 further configures the settings of the trained first encoder 51A and the estimator 55A by referring to the learning result data 128A. The control unit 21 inputs the object sensing data 221A to the encoders (51A, 52A), and executes the computation processes of the first encoder 51A, the second encoder 52A, and the estimator 55A. With this, the control unit 21 acquires an output value corresponding to the result of estimating the traffic conditions on the road of interest from the object sensing data 221A, from the estimator 55A.

Alternatively, the control unit 21 configures the settings of the trained first encoder 51A and the additional estimator 57A by referring to the learning result data 128A. The control unit 21 inputs the object sensing data 221A to the first encoder 51A, and executes the computation processes of the first encoder 51A and the additional estimator 57A. With this, the control unit 21 acquires an output value corresponding to the result of estimating the traffic conditions on the road of interest from the object sensing data 221A, from the additional estimator 57A.

In step S506, the control unit 21 operates as the output unit 214, and outputs information regarding the result of estimating the traffic conditions on the road of interest. The output destination and output information may be determined as appropriate depending on the embodiment, similarly to the embodiment described above. For example, the control unit 21 may output the result of estimating the traffic conditions to the output apparatus 25 as is. Also, the control unit 21 may distribute the result of estimating the traffic conditions to in-vehicle apparatuses or user terminals of vehicles in the vicinity of the road of interest. The range of distribution may be determined as appropriate. In this case, the control unit 21 may acquire position information from in-vehicle apparatuses or user terminals of vehicles, and specify the in-vehicle apparatuses or the user terminals to which the result of estimation is to be distributed based on the acquired position information.

Also, a scenario is possible in which the probability that traffic congestion occurs on a road of interest is estimated in the process in step S505, for example. In this scenario, if the probability that traffic congestion occurs on the road of interest is a threshold value or more, the control unit 21 may output a message notifying that the probability that traffic congestion occurs is high. The threshold value may be determined as appropriate. Also, the control unit 21 may distribute the message to in-vehicle apparatuses or user terminals of vehicles in the vicinity of the road of interest. The message may include information indicating an alternative route regarding which the probability that congestion occurs is lower than a route including the road of interest. Moreover, a scenario is possible in which vehicles include control apparatuses for controlling autonomous driving operations. In this scenario, if the probability that congestion occurs on the road of interest is a threshold value or more, the control unit 21 may distribute an instruction for instructing to run on a route in which the road of interest is not included, to control apparatuses of vehicles in the vicinity of the road of interest. In response thereto, the control apparatuses of the vehicles may control the autonomous driving of the vehicles to run on routes in which the road of interest is not included.

According to this modification, in a scenario in which traffic conditions are estimated from sensing data, a trained learning model 5A can be constructed whose introduction cost is relatively low and that is robust to the difference in the attribute regarding acquisition of sensing data.

The estimation of the probability that congestion occurs or whether or not congestion is occurring tends to depend of the attribute of a road, for example. The probability that traffic congestion occurs is lower in a two-lane road than in a one-lane road, for example. Also, the probability that traffic congestion occurs is higher on a road having many junctions than on a straight road, for example. Therefore, in a scenario in which the probability that congestion occurs or whether or not congestion is occurring is estimated, it is conceivable that the information specific to a domain from which data is acquired is useful for the estimation task. In contrast, the number of moving vehicles and the tendency of the change in the number is not likely to depend on the attribute of a road, and therefore, in a scenario in which the duration of occurred congestion is estimated, it is conceivable that the information specific to a domain from which data is acquired exerts a bad influence on the accuracy of the estimation task.

Therefore, the sensor SA may be a camera, for example. The camera may be installed on a road, or held by a person that moves on the road. In accordance therewith, the training data 122A may be image data, for example. The metadata 123A may be set to indicate the attribute of the road and the installation intervals of the sensors SA, for example. The correct answer data 124A may be set to indicate the probability that congestion occurs or whether or not congestion is occurring, for example. The different correct answer data 125B may be set to indicate the duration of occurred congestion, for example.

As a result of executing the above-described machine learning with this setting, the first feature amount includes a component corresponding to the amount of traffic flow and a tendency of change in the amount that occurs occasionally, as the information in common across domains. On the other hand, the second feature amount includes a component corresponding to a tendency of the traffic flow that stationarily occurs due to the landform and a tendency of the traffic flow that occurs concurrently at a plurality of points, as information specific to a domain. The tendency of the traffic flow that stationarily occurs due to the landform means the tendency that speed reduction and congestion are likely to occur at a sagging part, for example. The tendency of the traffic flow that occurs concurrently at a plurality of points means that the traffic flow at one point exerts influence on the traffic flow at another point such as in a case where when congestion occurs at a junction of an expressway, it is highly possible that congestion occurs at a point on a straight road before the junction.

As a result, an estimation task for estimating the probability that congestion occurs or whether or not congestion is occurring can be performed based on both of the above-described information specific to the domain and the information that is common across domains, by using the trained first encoder 51A, second encoder 52A, estimator 55A, in the estimation apparatus 2A. Therefore, the probability that congestion occurs or whether or not congestion is occurring on the road of interest can be estimated with relatively high accuracy. Also, an estimation task for estimating the duration of the occurred congestion can be performed based on the above-described information that is common across domains while removing the above-described information specific to a domain, by using the trained first encoder 51A and additional estimator 57, in the estimation apparatus 2A. Therefore, the duration of congestion on the road of interest can be estimated with relatively high accuracy.

(B) Scenario in which Subject State is Estimated

Figure 14:
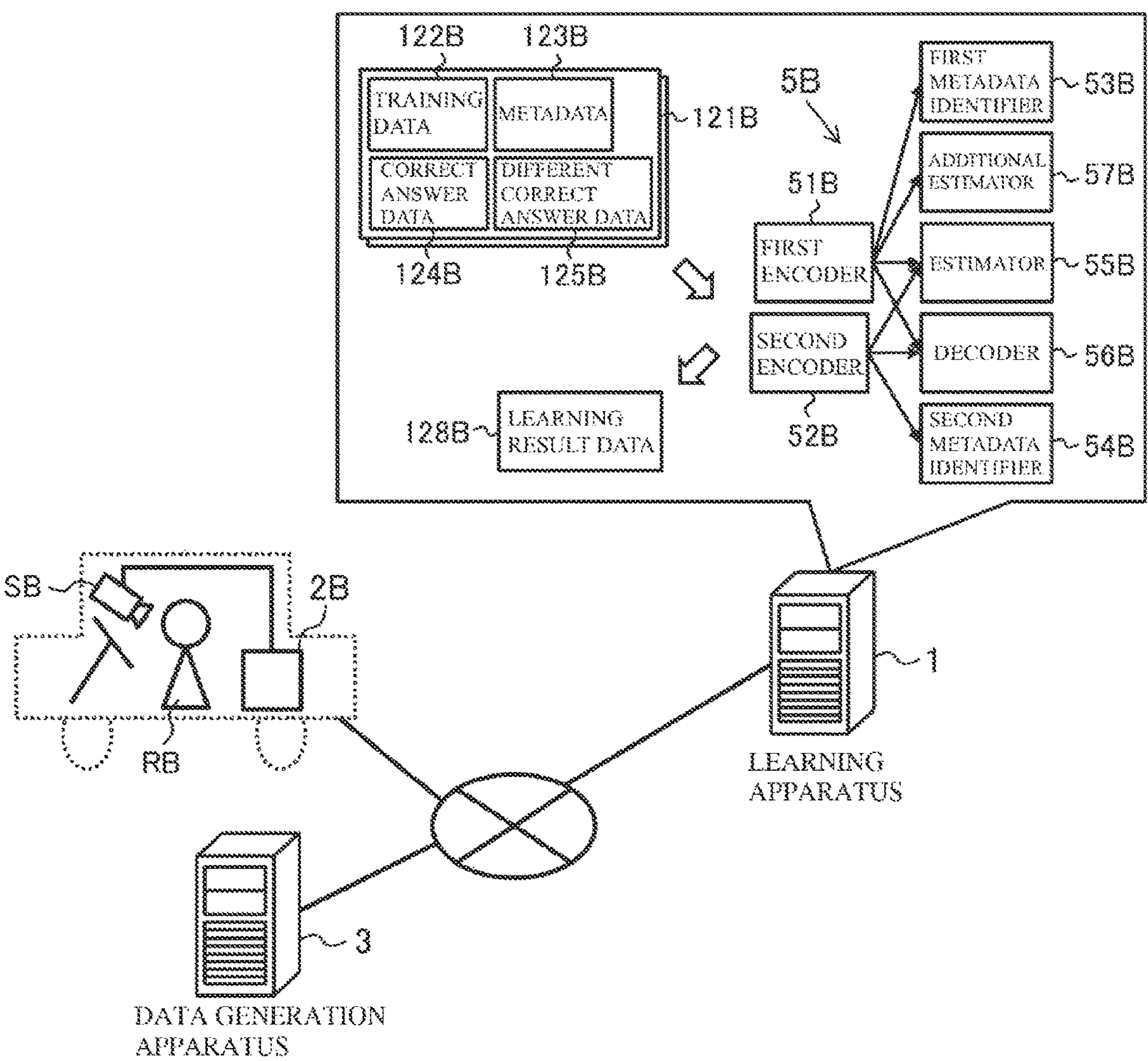
FIG. 14 is a schematic diagram illustrating an example of another scenario to which one or more embodiments may be applied.

FIG. 14 schematically illustrates an example of a scenario to which a system according to a second modification is applied. This modification is an example in which the above-described embodiment is applied to a scenario in which the state of a subject is estimated. In FIG. 14, a scenario in which the state of a driver RB of a vehicle is monitored is illustrated, as an example of the scenario in which the state of a subject is estimated. The driver RB is an example of a subject. As shown in FIG. 14, the system according to the present embodiment includes the learning apparatus 1, a monitoring apparatus 2B, and the data generation apparatus 3. Similarly to the above-described embodiment, the learning apparatus 1, the monitoring apparatus 2B, and the data generation apparatus 3 may be connected to each other via a network. The system according to this modification may be configured similarly to the above-described embodiment, except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121B for learning a task of estimating the state of a subject. Each learning data set 121B is constituted by a combination of training data 122B, metadata 123B, correct answer data 124B, and different correct answer data 125B, similarly to the above-described learning data set 121. The training data 122B, the metadata 123B, the correct answer data 124B, and the different correct answer data 125B respectively correspond to the training data 122, the metadata 123, the correct answer data 124, and the different correct answer data 125 according to the embodiment described above.

The training data 122B is sensing data obtained by a sensor SB that observes the state of an examinee or a sensor of the same type (hereinafter, collectively referred to as "sensor SB" including a sensor of the same type), for example. The examinee is a driver that drives a vehicle, for example. There is no particular limitation to the type of the sensor SB, which may be selected as appropriate depending on the embodiment, as long as the state of a subject can be observed. The sensor SB may be a camera or a vital sensor, or the combination of these, for example. The camera may be an ordinary RGB camera, a depth camera, or an infrared camera, for example. Also, the vital sensor is a clinical thermometer, a blood pressure meter, or a pulsimeter, for example. The training data 122B may be constituted by image data, vital data, and the like.

The metadata 123B indicates identification information of an examinee, an attribute regarding the time at which the sensing data was obtained, an attribute regarding the installation conditions of the sensor SB, or the installed location of the sensor SB, or a combination of these, for example, as the attribute regarding acquisition of the training data 122B. The identification information of an examinee may include information (identifier) for identifying the examinee, gender, age, body build, and ethnicity, for example. The attribute regarding time may include a time slot, the day of week, weekday or holiday, month, and season, for example. The attribute regarding the installation conditions of the sensor SB may include the installation angle of the sensor SB, ambient temperature of the sensor SB, the distance between the sensor SB and an examinee, and the installation intervals between the sensors SB, for example.

The correct answer data 124B and the different correct answer data 125B indicate the state of an examinee, for example, as the feature included in the training data 122B. The state of an examinee may include the health status of the examinee, for example. The health status may be represented by the probability of developing a predetermined disease, or the probability that a change in body condition occurs, for example. In this modification, the state of an examinee may include a sleepiness degree that indicates the degree of sleepiness of the examinee, a fatigue degree indicating the degree of fatigue of the examinee, or a margin of capability indicating the margin of capability of the examinee regarding driving, or a combination of these, for example.

In step S102, the learning apparatus 1 performs machine learning of the learning model 5B using the plurality of learning data sets 121B that are each constituted by a combination of training data 122B, metadata 123B, correct answer data 124B, different correct answer data 125B, similarly to the embodiment described above. The learning model 5B may be configured similarly to the learning model 5 according to the embodiment described above. That is, the learning model 5B includes a first encoder 51B, a second encoder 52B, a first metadata identifier 53B, a second metadata identifier 54B, an estimator 55B, a decoder 56B, and an additional estimator 57B. The devices 51B to 57B correspond to the devices 51 to 57 according to the embodiment described above. The configurations of the devices 51B to 57B may be similar to those of the devices 51 to 57 according to the embodiment described above.

As a result of the machine learning, the second encoder 52B is trained to convert training data 122B to a second feature amount including a component corresponding to the attribute regarding acquisition of the training data 122B that is indicated by the metadata 123B. The first encoder 51B is trained to convert training data 122B to a first feature amount including a component corresponding to information other than the attribute regarding acquisition of the training data 122B, that is, information that appears in common across domains from which training data 122B is acquired, for example. The portion including the estimator 55B or the additional estimator 57B in the learning model 5B acquires the capability of estimating traffic conditions from the sensing data obtained by the sensor SB. Also, the portion including the decoder 56B in the learning model 5B acquires the capability of generating decoded data of the same type as the sensing data obtained by the sensor SB.

In step S103, the learning apparatus 1 generates information regarding the trained learning model 5B as the learning result data 128B, and saves the generated learning result data 128B in a predetermined storage area. The generated learning result data 128B may be provided to the monitoring apparatus 2B and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described steps S701 to S704. With this, the data generation apparatus 3 can generate decoded data from object sensing data using the trained first encoder 51B and decoder 56B. The decoded data corresponds to data obtained by removing the information corresponding to the attribute regarding acquisition of object sensing data from the object sensing data. Also, the data generation apparatus 3 may generate new data (decoded data) in which the attribute regarding acquisition is changed by an amount corresponding to noise, using the trained first encoder 51B, second encoder 52B, and decoder 56B. Moreover, the data generation apparatus 3 may also generate data of at least one of the first and second feature amounts using at least one of the trained first encoder 51B and second encoder 52B.

The monitoring apparatus 2B corresponds to the estimation apparatus 2 described above. The monitoring apparatus 2B may be configured similarly to the estimation apparatus 2 described above, except that the data that they use is different. In this modification, the monitoring apparatus 2B is connected to the sensor SB. The monitoring apparatus 2B acquires object sensing data from the sensor SB. Also, the monitoring apparatus 2B estimates the state of the driver RB based on the acquired object sensing data using the trained learning model 5B constructed by the learning apparatus 1.

<Hardware Configuration of Monitoring Apparatus>

FIG. 15A schematically illustrates an example of a hardware configuration of the monitoring apparatus 2B according to this modification. As shown in FIG. 15A, the monitoring apparatus 2B according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. The monitoring apparatus 2B is connected to the sensor SB via the external interface 27. The sensor SB may be arranged as appropriate at a location from which the state of the driver RB can be observed. For example, if the sensor SB is a camera, the sensor SB may be arranged in the vicinity of the driver's seat such that the driver RB can be shot. Also, if the sensor SB is a vital sensor, the sensor SB may be attached to the driver RB as appropriated such that the vital of the driver RB can be measured, for example. Note that the hardware configuration of the monitoring apparatus 2B is not limited to this example. Regarding the specific hardware configuration of the monitoring apparatus 2B, constituent elements can be omitted, replaced, and added as appropriate depending on the embodiment. The monitoring apparatus 2B may be a general-purpose computer, a mobile phone including a smartphone, an in-vehicle apparatus, or the like, instead of an information processing apparatus that is specifically designed for the service to be provided.

The storage unit 22 of the monitoring apparatus 2B according to this modification stores various types of information such as a monitoring program 82B and the learning result data 128B. The estimation program 82B and learning result data 128B correspond to the estimation program 82 and the learning result data 128 according to the embodiment described above. At least one of the monitoring program 82B and the learning result data 128B may be stored in a storage medium 92. Also, the monitoring apparatus 2B may acquire at least one of the monitoring program 82B and the learning result data 128B from the storage medium 92.

<Software Configuration and Exemplary Operation of Monitoring Apparatus>

Figure 15B:
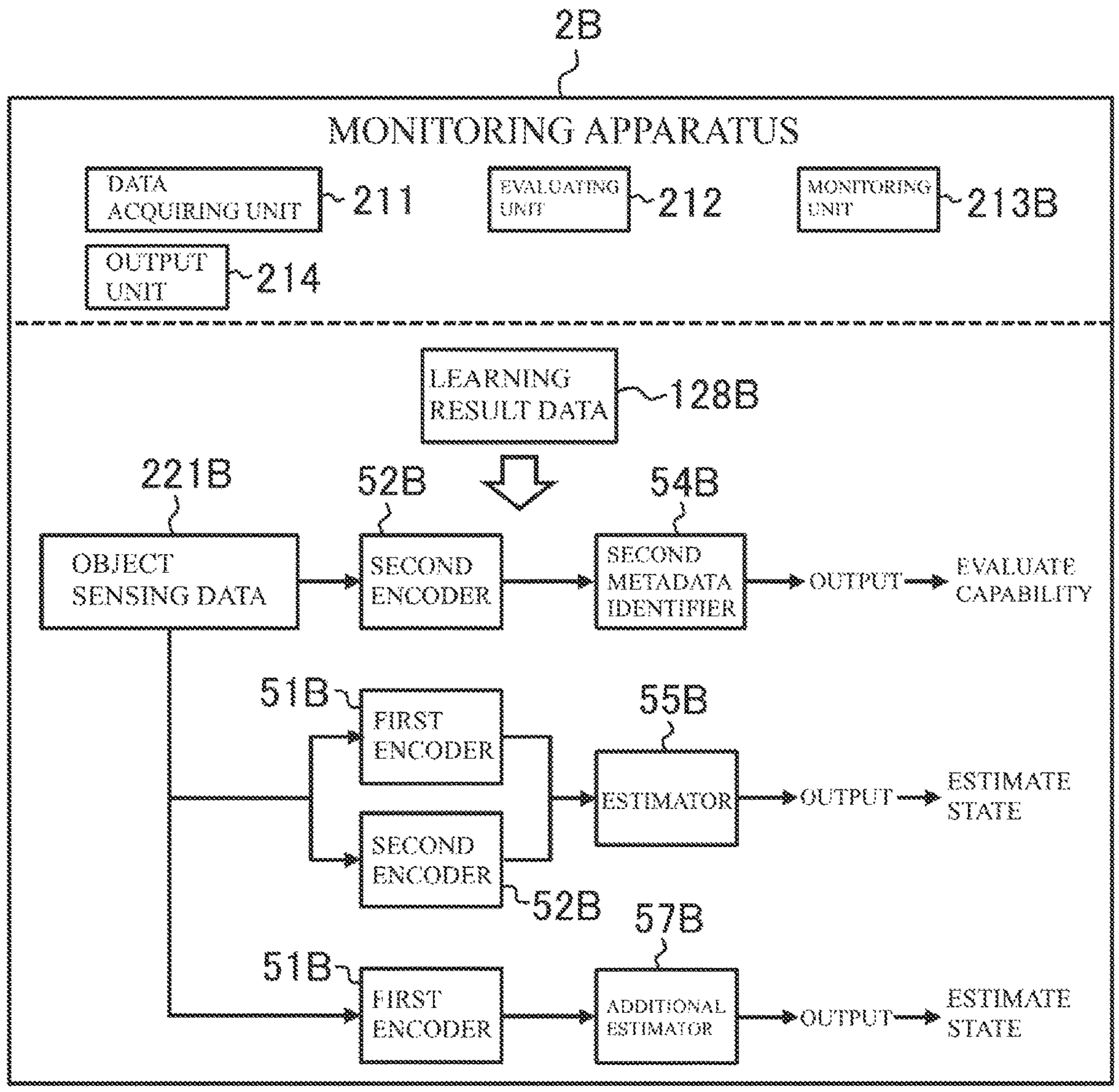
FIG. 15B is a schematic diagram illustrating an example of a software configuration of a monitoring apparatus according to another mode.

FIG. 15B schematically illustrates an example of a software configuration of the monitoring apparatus 2B according to this modification. The software configuration of the monitoring apparatus 2B is realized by the control unit 21 executing the monitoring program 82B, similarly to the above-described embodiment. As shown in FIG. 15B, the software configuration of the monitoring apparatus 2B is similar to the software configuration of the estimation apparatus 2 described above, except that sensing data obtained by the sensor SB that observes the state of the driver RB is used.

Accordingly, the monitoring apparatus 2B executes series of processes regarding the monitoring processes, similarly to the estimation processes of the estimation apparatus 2 described above.

That is, in step S501, the control unit 21 operates as the data acquiring unit 211, and acquires object sensing data 221B on which the state of the driver RB is reflected, from the sensor SB. In step S502, the control unit 21 operates as the evaluating unit 212, and identifies the attribute regarding acquisition of object sensing data 221B using the second encoder 52B and second metadata identifier 54B that were trained by the learning apparatus 1. Specifically, the control unit 21 configures the settings of the trained second encoder 52B and second metadata identifier 54B by referring to the learning result data 128B. Next, the control unit 21 inputs the acquired object sensing data 221B to the second encoder 52B, and executes computation processes of the second encoder 52B and the second metadata identifier 54B. With these computation processes, the control unit 21 acquires an output value corresponding to the result of identifying the attribute regarding acquisition of the object sensing data 221B, from the second metadata identifier 54B.

In step S503, the control unit 21 operates as the evaluating unit 212, and determines whether or not the result of estimation by the estimator 55B or the additional estimator 57B is adopted, based on the result of identifying the attribute regarding acquisition of the object sensing data 221B. In step S504, the control unit 21 determines to where the process branches based on the determination result in step S503.

If the identification result in step S502 matches the correct answer value of the attribute regarding acquisition of the object sensing data 221B, the control unit 21 determines that the result of estimation by the estimator 55B or the additional estimator 57B is adopted, and advances the process to the next step S505. On the other hand, if the identification result in step S502 does not match the correct answer value of the attribute regarding acquisition of the object sensing data 221B, the control unit 21 determines that the result of estimation by the estimator 55B or the additional estimator 57B is not adopted, skips processes in steps S505 and S506, and ends the series of processes according to this modification.

In step S505, the control unit 21 operates as the monitoring unit 213B, and estimates the state of the driver RB from the object sensing data 221B using the first encoder 51B, second encoder 52B, and estimator 55B that were trained by the learning apparatus 1. Alternatively, the control unit 21 estimates the state of the driver RB from the object sensing data 221B using the first encoder 51B and additional estimator 57B that were trained by the learning apparatus 1.

Specifically, the control unit 21 further configures the settings of the trained first encoder 51B and the estimator 55B by referring to the learning result data 128B. The control unit 21 inputs the object sensing data 221B to the encoders (51B, 52B), and executes the computation processes of the first encoder 51B, the second encoder 52B, and the estimator 55B. With this, the control unit 21 acquires an output value corresponding to the result of estimating the state of the driver RB from the object sensing data 221B, from the estimator 55B.

Alternatively, the control unit 21 configures the settings of the trained first encoder 51B and the additional estimator 57B by referring to the learning result data 128B. The control unit 21 inputs the object sensing data 221B to the first encoder 51B, and executes the computation processes of the first encoder 51B and the additional estimator 57B. With this, the control unit 21 acquires an output value corresponding to the result of estimating the state of the driver RB from the object sensing data 221B, from the additional estimator 57B.

In step S506, the control unit 21 operates as the output unit 214, and outputs information regarding the result of estimating the state of the driver RB. The output destination and output information may be determined as appropriate depending on the embodiment, similarly to the embodiment described above. For example, the control unit 21 may output the result of estimating the state of the driver RB to the output apparatus 25 as is. Also, the control unit 21 may execute some information processes based on the estimation result, for example. Also, the control unit 21 may output the result of executing the information processes as the information regarding the estimation result.

As an example of the information processes, the control unit 21 may also output a specific message such as a warning to the output apparatus 25, according to the estimated state of the driver RB. For example, when at least one of the sleepiness degree and the fatigue degree is estimated as the state of the driver RB, the control unit 21 may determine whether or not at least one of the sleepiness degree and the fatigue degree exceeds a threshold value. The threshold value may be set as appropriate. And, if at least one of the sleepiness degree and the fatigue degree exceeds the threshold value, the control unit 21 may output a warning prompting the driver RB to park in a parking area or the like and take a rest, to the output apparatus 25.

Also, if a vehicle includes a control apparatus (not illustrated) for controlling the operation of autonomous driving, the control unit 21 may transmit an instruction for instructing the operation of the autonomous driving to the control apparatus based on the result of estimating the state of the driver RB, for example. Assume that the vehicle is configured to be switchable between an autonomous driving mode in which the movement of the vehicle is controlled by the control apparatus and manual driving mode in which the movement of the vehicle is controlled by steering performed by the driver RB, for example.

In this case, when the control unit 21 has received an instruction to switch from the autonomous driving mode to the manual driving mode from the driver RB or the system while the vehicle is driving in the autonomous driving mode, the control unit 21 may determine whether or not the estimated margin of capability of the driver RB exceeds a threshold value. Then, if the margin of capability of the driver RB exceeds the threshold value, the control unit 21 may transmit an instruction for permitting switching from the autonomous driving mode to the manual driving mode. On the other hand, if the margin of capability of the driver RB is the threshold value or less, the control unit 21 may transmit an instruction for not permitting switching from the autonomous driving mode to the manual driving mode, and keep moving in the autonomous driving mode.

Also, when the vehicle is driving in the manual driving mode, the control unit 21 may also determine whether or not at least one of the sleepiness degree and the fatigue degree exceeds a threshold value. Then, if at least one of the sleepiness degree and the fatigue degree exceeds the threshold value, the control unit 21 may also transmit an instruction for instructing to switch from the manual driving mode to the autonomous driving mode and stop at a safe location such as a parking area to the system of the vehicle. On the other hand, if not, the control unit 21 may also keep driving the vehicle in the manual driving mode.

Also, when the vehicle is driving in the manual driving mode, the control unit 21 may also determine whether or not the margin of capability is a threshold value or less. Then, if the margin of capability is the threshold value or less, the control unit 21 may also transmit an instruction for deceleration to the control apparatus of the vehicle. On the other hand, if not, the control unit 21 may also keep driving the vehicle by the operation of the driver RB. Note that the control apparatus of the vehicle and the monitoring apparatus 2B may be constituted by one computer.

According to this modification, in a scenario in which the state of a driver is estimated from sensing data, a trained learning model 5B can be constructed whose introduction cost is relatively low and that is robust to the difference in the attribute regarding acquisition of sensing data.

For example, the change in body condition including the above-described sleepiness degree, fatigue degree, a margin of capability, and the like does not much relate to the attribute of a subject, and can be estimated from the relative change in vital signs such as blood pressure. Therefore, in a scenario in which the change in body condition is estimated, it is conceivable that the information specific to the domain from which data is acquired exerts a bad influence on the accuracy of the estimation task. On the other hand, the risk of developing a predetermined disease (e.g. life style related disease) depends on the attribute of a subject. Therefore, in a scenario in which the probability of developing a predetermined disease is estimated, it is conceivable that the information specific to the domain from which data is acquired is useful for the estimation task.

Therefore, the sensor SB may be a vital sensor such as a blood pressure meter. In correspondence therewith, the training data 122B may be measurement data of vital signs such as blood pressure, for example. The metadata 123B may be set to indicate attributes relating to the identification information of a subject (examinee), and the time at which the data is acquired (e.g. measurement time), for example. The correct answer data 124B may be set to indicate the probability of developing a predetermined disease, for example. The different correct answer data 125B may be set to indicate the probability that the change in body condition occurs, for example.

As a result of executing the above-described machine learning with these settings, the first feature amount includes a component corresponding to an average value and an amount of change of a vital value such as a blood pressure value, as information in common across domains. On the other hand, the second feature amount includes a component corresponding to individual conditions based on the attribute of a subject and the time at which data is acquired, as the information specific to a domain.

Accordingly, as a result of using the trained first encoder 51B and additional estimator 57B, in the monitoring apparatus 2B, a task of estimating the change in body condition of a driver RB can be performed based on the above-described information in common across domains while removing the above-described information specific to a domain. Therefore, the change in body condition of a driver RB can be estimated with relatively high accuracy. Also, as a result of using the trained first encoder 51B, second encoder 52B, and estimator 55B, in the monitoring apparatus 2B, a task of estimating the probability that a driver RB develops a predetermined disease can be performed based on the above-described information specific to a domain and the information in common across domains. Therefore, the probability that a driver RB develops a predetermined disease can be estimated with relatively high accuracy.

Note that the subject whose state is to be estimated is not limited to a driver RB of a vehicle that is illustrated in FIG. 14, and may include any person. The subject whose state is to be estimated may be an operator who works in an office, a factory, or the like, an examinee whose vital signs are to be measured, for example.

Figure 16:
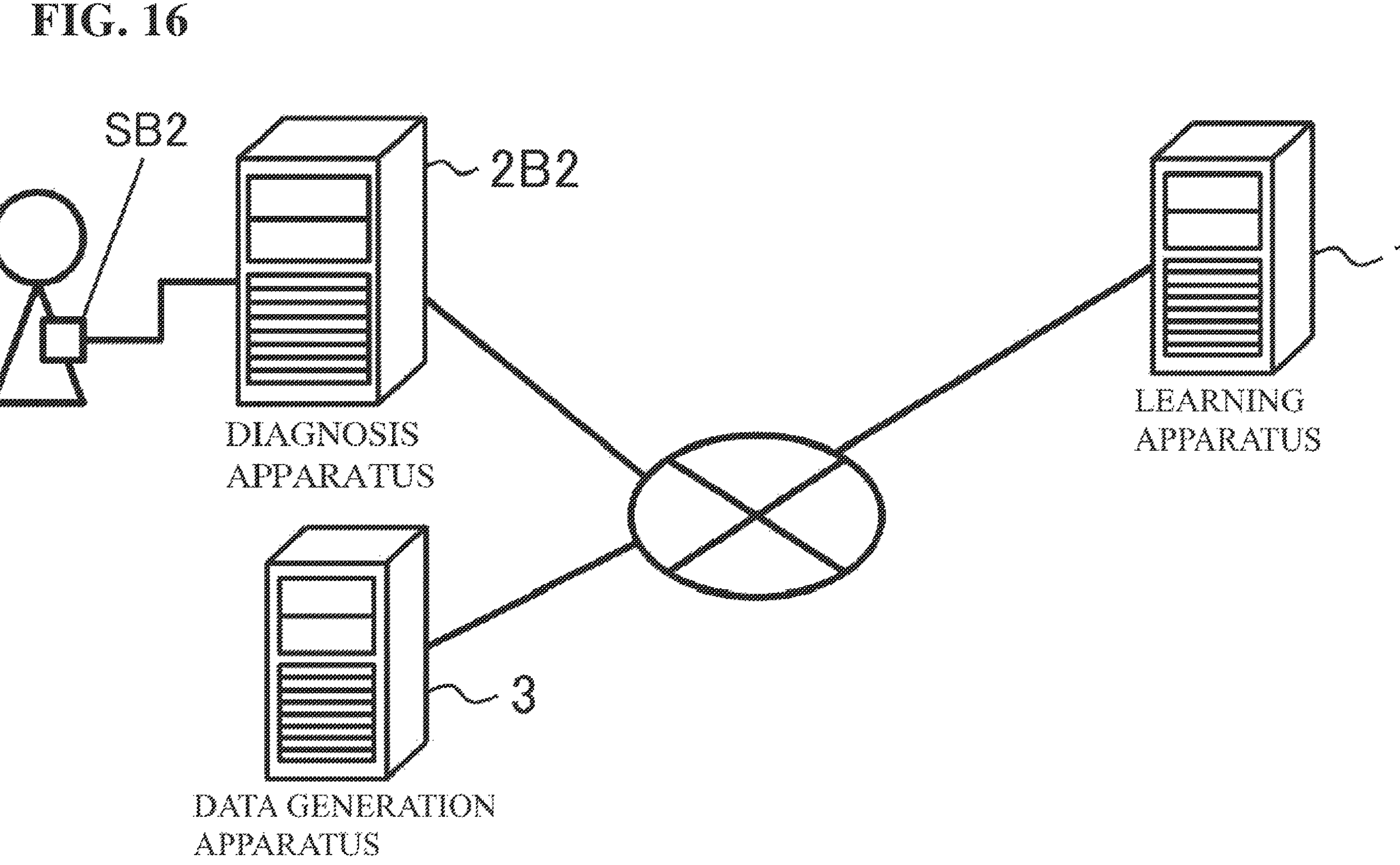
FIG. 16 is a schematic diagram illustrating an example of another scenario to which the present invention one or more embodiments may be applied.

FIG. 16 schematically illustrates an example of another scenario in which the state of a subject is estimated. The system illustrated in FIG. 16 includes the learning apparatus 1, a diagnosis apparatus 2B2, and the data generation apparatus 3. The diagnosis apparatus 2B2 corresponds to the above-described monitoring apparatus 2B. In the example in FIG. 16, the diagnosis apparatus 2B2 is connected to a vital sensor SB2, and object sensing data of an examinee is acquired using the vital sensor SB2. The vital sensor SB2 is an example of the above-described sensor SB. The diagnosis apparatus 2B2 estimates the state of an examinee by performing processes similar to those of the above-described monitoring apparatus 2B. The state of an examinee may include a health status of the examinee. The health status may include an item indicating whether the examinee is healthy or not, a sign of falling ill, and the like. The correct answer data 124B and the different correct answer data 125B may be configured to indicate the type of health status of a person, and the probability of developing a disease of interest, for example.

(C) Scenario of Visual Inspection

Figure 17:
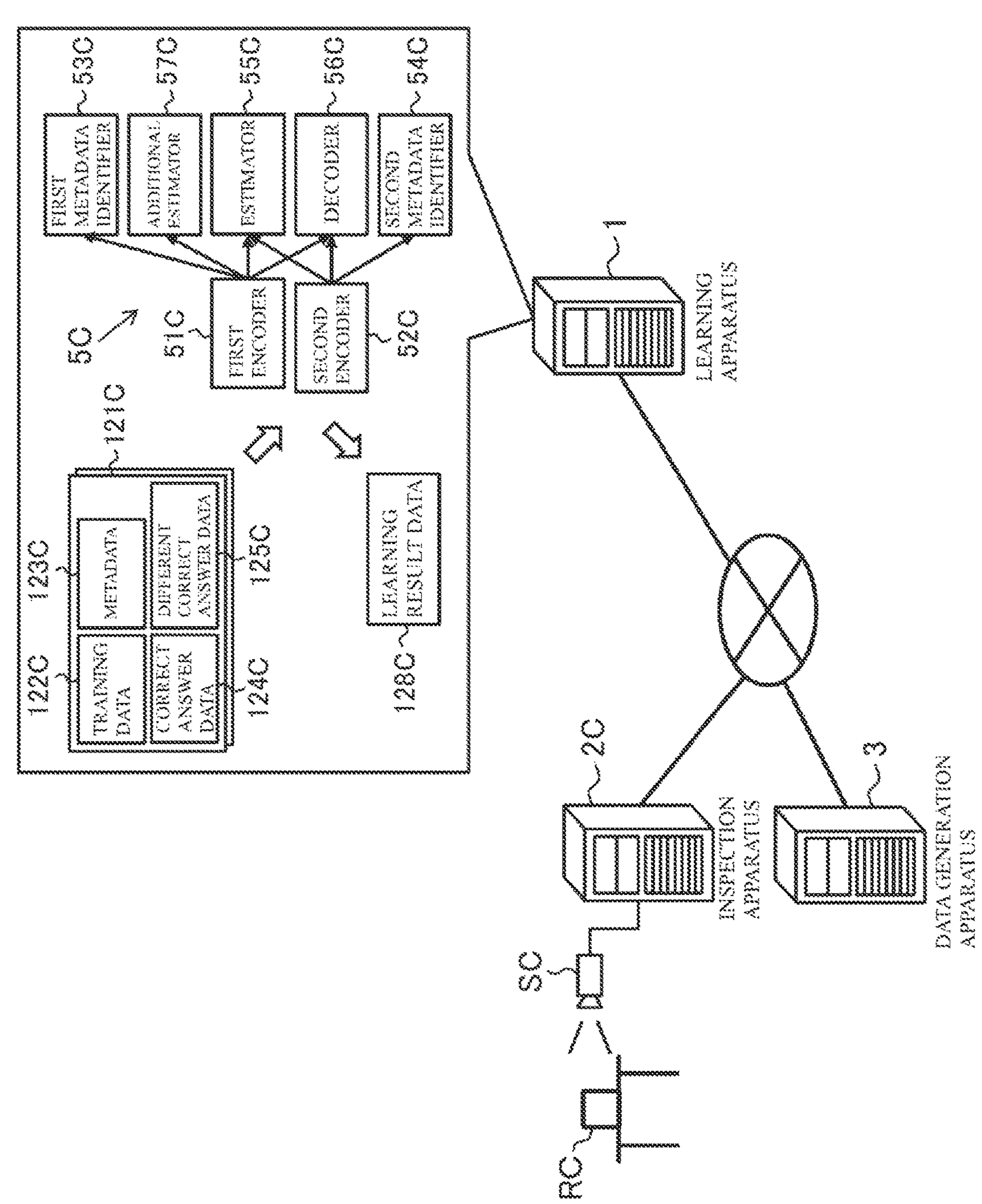
FIG. 17 is a schematic diagram illustrating an example of another scenario to which one or more embodiments may be applied.

FIG. 17 schematically illustrates an example of an application scenario of a system according to a third modification. This modification is an example in which the above-described embodiment is applied to a scenario in which visual inspection of products RC is performed. As shown in FIG. 17, the system according to the present embodiment includes the learning apparatus 1, an inspection apparatus 2C, and the data generation apparatus 3. Similarly to the above-described embodiment, the learning apparatus 1, the inspection apparatus 2C, and the data generation apparatus 3 may be connected to each other via a network. The system according to this modification may be configured similarly to the above-described embodiment except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121C for learning a task of estimating the state of a product RC. Each learning data set 121C is constituted by a combination of training data 122C, metadata 123C, correct answer data 124C, and different correct answer data 125C, similarly to the above-described learning data set 121. The training data 122C, the metadata 123C, the correct answer data 124C, and the different correct answer data 125C respectively correspond to the training data 122, the metadata 123, the correct answer data 124, and the different correct answer data 125 according to the embodiment described above.

The training data 122C is image data of a product RC, for example. The training data 122C may be obtained by shooting (photographing) a product RC or a product of the same type (hereinafter, collectively referred to as "product RC" including a product of the same type) by a camera SC or a camera of the same type (hereinafter, collectively referred to as "camera SC" including a camera of the same type). The camera SC may be an ordinary RGB camera, a depth camera, an infrared camera, or the like.

The product RC may be a product that is conveyed in a production line such as an electronic apparatus, an electronic component, an automotive component, medicine, or food, for example. The electronic component may be a substrate, a chip capacitor, liquid crystal, or a relay winding wire, for example. The automotive component may be a connecting rod, a shaft, an engine block, a power window switch, or a panel, for example. The medicine may be a packaged tablet, or a tablet that is not packaged, for example. The product may be a final product that is generated after completing production processes, an intermediate product that is generated in the course of production processes, or an initial product that is prepared before introducing it into production processes.

The metadata 123C indicates an attribute of the product RC, shooting conditions of the product RC, or an attribute of the factory in which the product RC is produced, or a combination of these, as the attribute regarding acquisition of the training data 122C, for example. The attribute of the product RC may include a type of the product RC, an identifier, material, and an external appearance (e.g., three-dimensional shape), for example. The shooting conditions of the product RC may include a shooting angle of the camera SC, an orientation of the product RC, illumination conditions, a distance between the camera SC and the product RC, and an attribute regarding a performance of the camera SC, for example. The attribute regarding the performance of the camera SC may include a type of image data to be obtained (e.g., RGB image or not), and a resolution, for example. The attribute of a factory in which the product RC is produced may include an identifier of the factory and a production capacity of the product RC, for example.

The correct answer data 124C and the different correct answer data 125C indicate a state of the product RC as a feature included in the training data 122C, for example. The state of the product RC may be an item relating to a defect, for example. The state of the product RC may be represented by whether or not a defect is included in the product RC, the type of a defect included in the product RC, or the range of a defect included in the product RC, or a combination of these, for example. The defect may be a flaw, a smudge, a crack, a hit, a burr, uneven color, or contamination, for example.

In step S102, the learning apparatus 1 performs machine learning of the learning model 5C using the plurality of learning data sets 121C that are each constituted by a combination of training data 122C, metadata 123C, correct answer data 124C, and different correct answer data 125C, similarly to the embodiment described above. The learning model 5C may be configured similarly to the learning model 5 according to the embodiment described above. That is, the learning model 5C includes a first encoder 51C, a second encoder 52C, a first metadata identifier 53C, a second metadata identifier 54C, an estimator 55C, a decoder 56C, and an additional estimator 57C. The devices 51C to 57C correspond to the devices 51 to 57 according to the embodiment described above. The configurations of the devices 51C to 57C may be similar to those of the devices 51 to 57 according to the embodiment described above.

As a result of the machine learning, the second encoder 52C is trained to convert training data 122C to a second feature amount including a component corresponding to the attributes regarding acquisition of the training data 122C that is indicated by the metadata 123C. The first encoder 51C is trained to convert training data 122C to a first feature amount including a component corresponding to information other than the attributes regarding acquisition of the training data 122C, that is, information that appears in common across domains from which training data 122C is acquired, for example. The portion including the estimator 55C or the additional estimator 57C in the learning model 5C acquires the capability of estimating the state of the product RC in an image of the image data obtained by the camera SC. Also, the portion including the decoder 56C in the learning model 5C acquires the capability of generating decoded data of the same type as the image data obtained by the camera SC.

In step S103, the learning apparatus 1 generates information regarding the trained learning model 5C as the learning result data 128C, and saves the generated learning result data 128C in a predetermined storage area. The generated learning result data 128C may be provided to the inspection apparatus 2C and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described steps S701 to S704. With this, the data generation apparatus 3 can generate decoded data from object image data using the trained first encoder 51C and decoder 56C. The decoded data corresponds to data obtained by removing the information corresponding to the attribute regarding acquisition of object image data from the object image data. Also, the data generation apparatus 3 may generate new data (decoded data) in which the attribute regarding acquisition is changed by an amount corresponding to noise, using the trained first encoder 51C, second encoder 52C, and decoder 56C. Moreover, the data generation apparatus 3 may also generate data of at least one of the first and second feature amounts using at least one of the trained first encoder 51C and the second encoder 52C.

The inspection apparatus 2C corresponds to the estimation apparatus 2 described above. The inspection apparatus 2C may be configured similarly to the estimation apparatus 2 described above, except that the data that they use is different. In this modification, the inspection apparatus 2C is connected to the camera SC. The inspection apparatus 2C acquires object image data from the camera SC. Also, the inspection apparatus 2C performs visual inspection on the product RC by estimating the state of the product RC based on the acquired object image data, using the trained learning model 5C constructed by the learning apparatus 1.

<Hardware Configuration of Inspection Apparatus

Figure 18A:
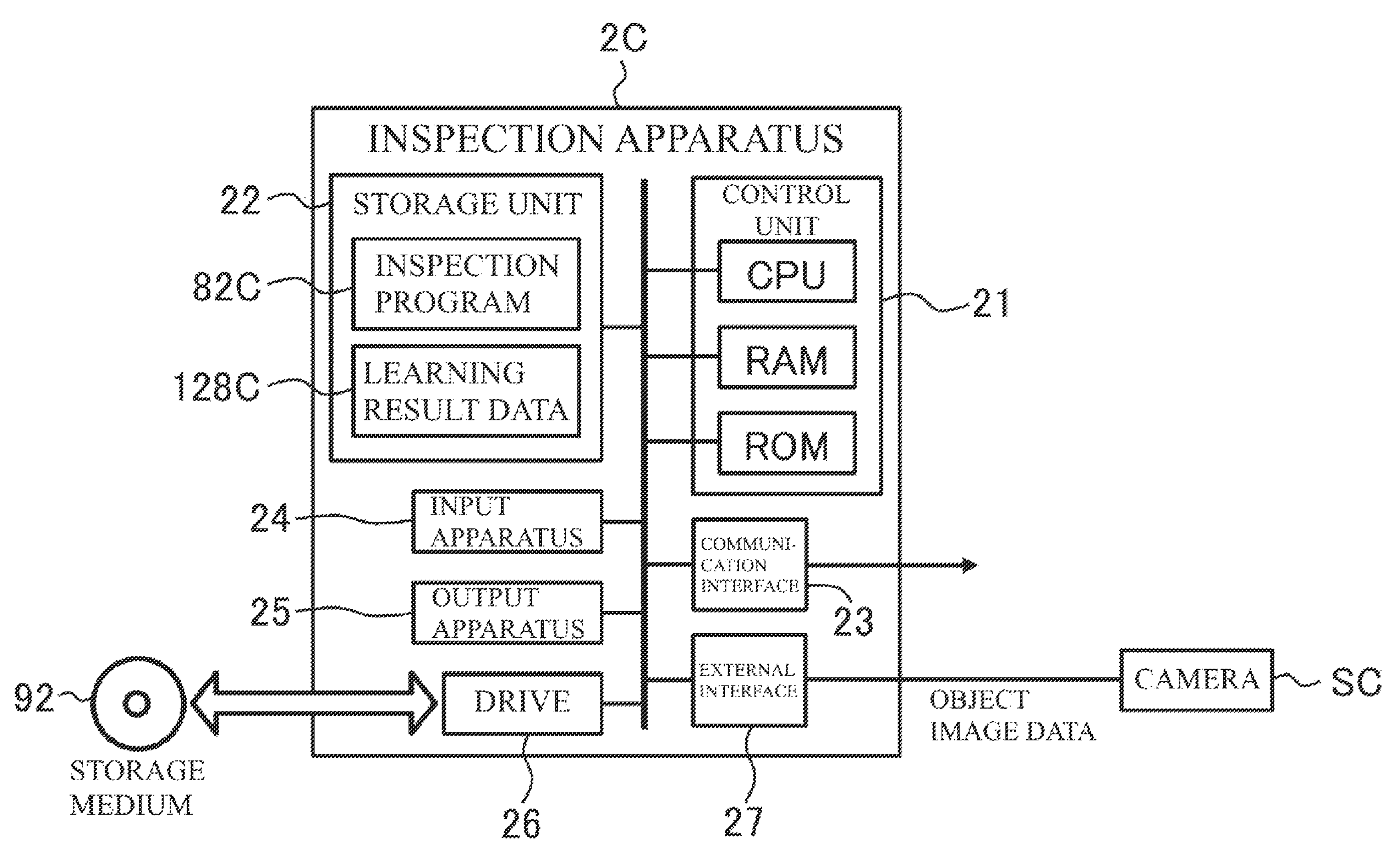
FIG. 18A is a schematic diagram illustrating an example of a hardware configuration of an inspection apparatus according to another mode.

FIG. 18A schematically illustrates an example of a hardware configuration of the inspection apparatus 2C according to this modification. As shown in FIG. 18A, the inspection apparatus 2C according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. The inspection apparatus 2C is connected to the camera SC via the external interface 27. The camera SC may be arranged as appropriate at a location from which the products RC can be shot. For example, the camera SC may be arranged in the vicinity of a conveyor apparatus that conveys the products RC. Note that the hardware configuration of the inspection apparatus 2C is not limited to this example. Regarding the specific hardware configuration of the inspection apparatus 2C, constituent elements can be omitted, replaced, and added as appropriate depending on the embodiment. The inspection apparatus 2C may be a general-purpose server apparatus, a general-purpose PC, a PLC (programmable logic controller), or the like, instead of an information processing apparatus that is specifically designed for the service to be provided.

The storage unit 22 of the inspection apparatus 2C according to this modification stores various types of information such as an inspection program 82C and the learning result data 128C. The inspection program 82C and learning result data 128C correspond to the estimation program 82 and learning result data 128 according to the embodiment described above. At least one of the inspection program 82C and the learning result data 128C may be stored in a storage medium 92. Also, the inspection apparatus 2C may acquire at least one of the inspection program 82C and the learning result data 128C from the storage medium 92.

<Software Configuration and Exemplary Operation of Inspection Apparatus>

Figure 18B:
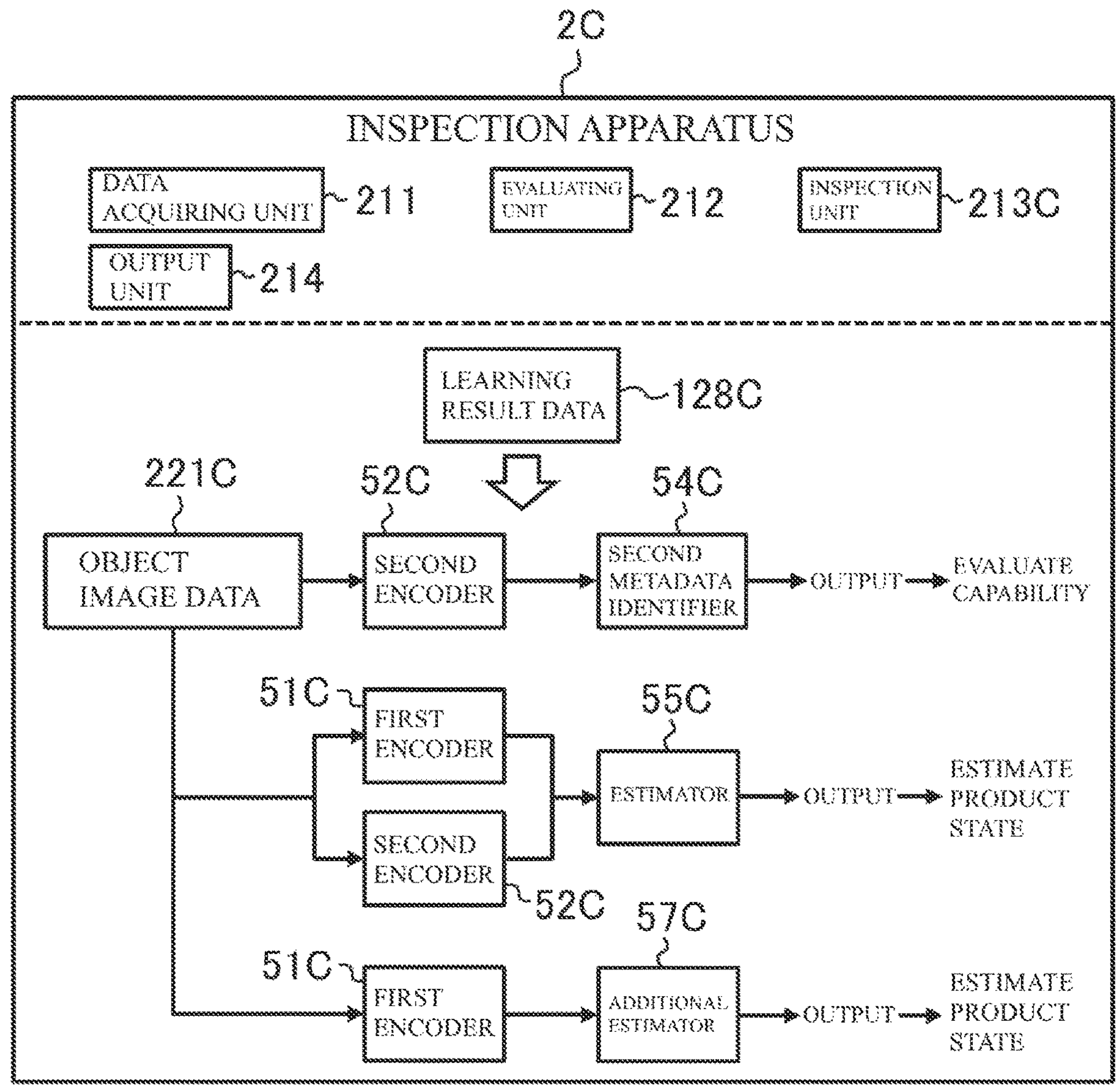
FIG. 18B is a schematic diagram illustrating an example of a software configuration of an inspection apparatus according to another mode.

FIG. 18B schematically illustrates an example of a software configuration of the inspection apparatus 2C according to this modification. The software configuration of the inspection apparatus 2C is realized by the control unit 21 executing the inspection program 82C, similarly to the above-described embodiment. As shown in FIG. 18B, the software configuration of the inspection apparatus 2C is similar to the software configuration of the estimation apparatus 2 described above, except that image data of images of the products RC obtained by the camera SC is used. Accordingly, the inspection apparatus 2C executes series of processes regarding the inspection processes, similarly to the estimation processes of the estimation apparatus 2 described above.

That is, in step S501, the control unit 21 operates as the data acquiring unit 211, and acquires object image data 221C of images of the products RC, from the camera SC. In step S502, the control unit 21 operates as the evaluating unit 212, and identifies the attribute regarding acquisition of object image data 221C using the second encoder 52C and second metadata identifier 54C that were trained by the learning apparatus 1. Specifically, the control unit 21 configures the settings of the trained second encoder 52C and second metadata identifier 54C by referring to the learning result data 128C. Next, the control unit 21 inputs the acquired object image data 221C to the second encoder 52C, and executes computation processes of the second encoder 52C and the second metadata identifier 54C. With these computation processes, the control unit 21 acquires an output value corresponding to the result of identifying the attribute regarding acquisition of the object image data 221C, from the second metadata identifier 54C.

In step S503, the control unit 21 operates as the evaluating unit 212, and determines whether or not the result of estimation by the estimator 55C or the additional estimator 57C is adopted, based on the result of identifying the attribute regarding acquisition of the object image data 221C. In step S504, the control unit 21 determines to where the process branches based on the determination result in step S503.

If the identification result in step S502 matches the correct answer value of the attribute regarding acquisition of the object image data 221C, the control unit 21 determines that the result of estimation by the estimator 55C or the additional estimator 57C is adopted, and advances the process to the next step S505. On the other hand, if the identification result in step S502 does not match the correct answer value of the attribute regarding acquisition of the object image data 221C, the control unit 21 determines that the result of estimation by the estimator 55C or the additional estimator 57C is not adopted, skips processes in steps S505 and S506, and ends the series of processes according to this modification.

In step S505, the control unit 21 operates as the inspection unit 213C, and estimates the state of the product RC in an image of the image data 221C using the first encoder 51C, second encoder 52C, and estimator 55C that were trained by the learning apparatus 1. Alternatively, the control unit 21 estimates the state of the product RC in an image of the image data 221C using the first encoder 51C and additional estimator 57C that were trained by the learning apparatus 1.

Specifically, the control unit 21 further configures the settings of the trained first encoder 51C and the estimator 55C by referring to the learning result data 128C. The control unit 21 inputs the object image data 221C to the encoders (51C, 52C), and executes the computation processes of the first encoder 51C, the second encoder 52C, and the estimator 55C. With this, the control unit 21 acquires an output value corresponding to the result of estimating the state of the product RC in an image of the image data 221C, from the estimator 55C.

Alternatively, the control unit 21 configures the settings of the trained first encoder 51C and the additional estimator 57C by referring to the learning result data 128C. The control unit 21 inputs the object image data 221C to the first encoder 51C, and executes the computation processes of the first encoder 51C and the additional estimator 57C. With this, the control unit 21 acquires an output value corresponding to the result of estimating the state of the product RC in an image of the image data 221C, from the additional estimator 57C.

In step S506, the control unit 21 operates as the output unit 214, and outputs information regarding the result of estimating the state of the product RC. The output destination and output information may be determined as appropriate depending on the embodiment, similarly to the embodiment described above. For example, the control unit 21 may output the result of estimating the state of the product RC to the output apparatus 25 as is. Also, if the product RC includes a defect, the control unit 21 may also output a warning for notifying the fact to the output apparatus 25, for example. Also, when the inspection apparatus 2C is connected to a conveyor apparatus (not illustrated) that conveys the products RC, the inspection apparatus 2C may control the conveyor apparatus such that products RC having no defect and products RC having defects are conveyed in different lines, based on the result of estimating the state of products RC, for example.

According to this modification, in a scenario in which the state of a product in an image of image data are estimated, a trained learning model 5C may be constructed whose introduction cost is relatively low and that is robust to the difference in the attribute regarding acquisition of image data.

In a scenario in which whether or not the product RC includes a defect is estimated, it is possible that the information specific to a domain such as surface material of the product RC, a background pattern of the conveyor, and lighting conditions that may change the conditions for capturing a defect exerts a bad influence on the estimation accuracy. On the other hand, a defect that occurs in a product RC may depend on the type of the product RC. Therefore, in a scenario in which the type of a defect included in a product RC is estimated, it is possible that information specific to a domain such as the type of the product RC is useful for estimating the type of a defect.

Therefore, the metadata 123C may be set to indicate the type of a product RC, the material of the product RC, the external appearance of the product RC, the orientation of the product RC, lighting conditions, and background conditions, for example. The correct answer data 124C may be set to indicate the type of a defect, for example. The different correct answer data 125C may be set to indicate whether or not a defect is included, for example.

As a result of executing the above-described machine learning with these settings, the first feature amount includes a component corresponding to the external appearance of a defect, as information in common across domains. On the other hand, the second feature amount includes components corresponding to background conditions (e.g., conveyor pattern), an external appearance of a product RC, a correspondence relationship between the external appearance of a defect and the type, the occurrence probability of a predetermined defect for each type of the product RC, as the information specific to a domain.

Accordingly, as a result of using the trained first encoder 51C and additional estimator 57C, in the inspection apparatus 2C, a task of estimating whether or not a defect is present can be performed based on the above-described information in common across domains while removing the above-described information specific to a domain. Therefore, whether or not a product RC includes a defect can be estimated with relatively high accuracy. Also, as a result of using the trained first encoder 51C, second encoder 52C, and estimator 55C, in the inspection apparatus 2C, a task of estimating the type of a defect can be performed based on the above-described information specific to a domain and the information in common across domains. Therefore, when a product RC includes a defect, the type of the defect can be estimated with relatively high accuracy.

(D) Scenario in which Person is Detected

Figure 19:
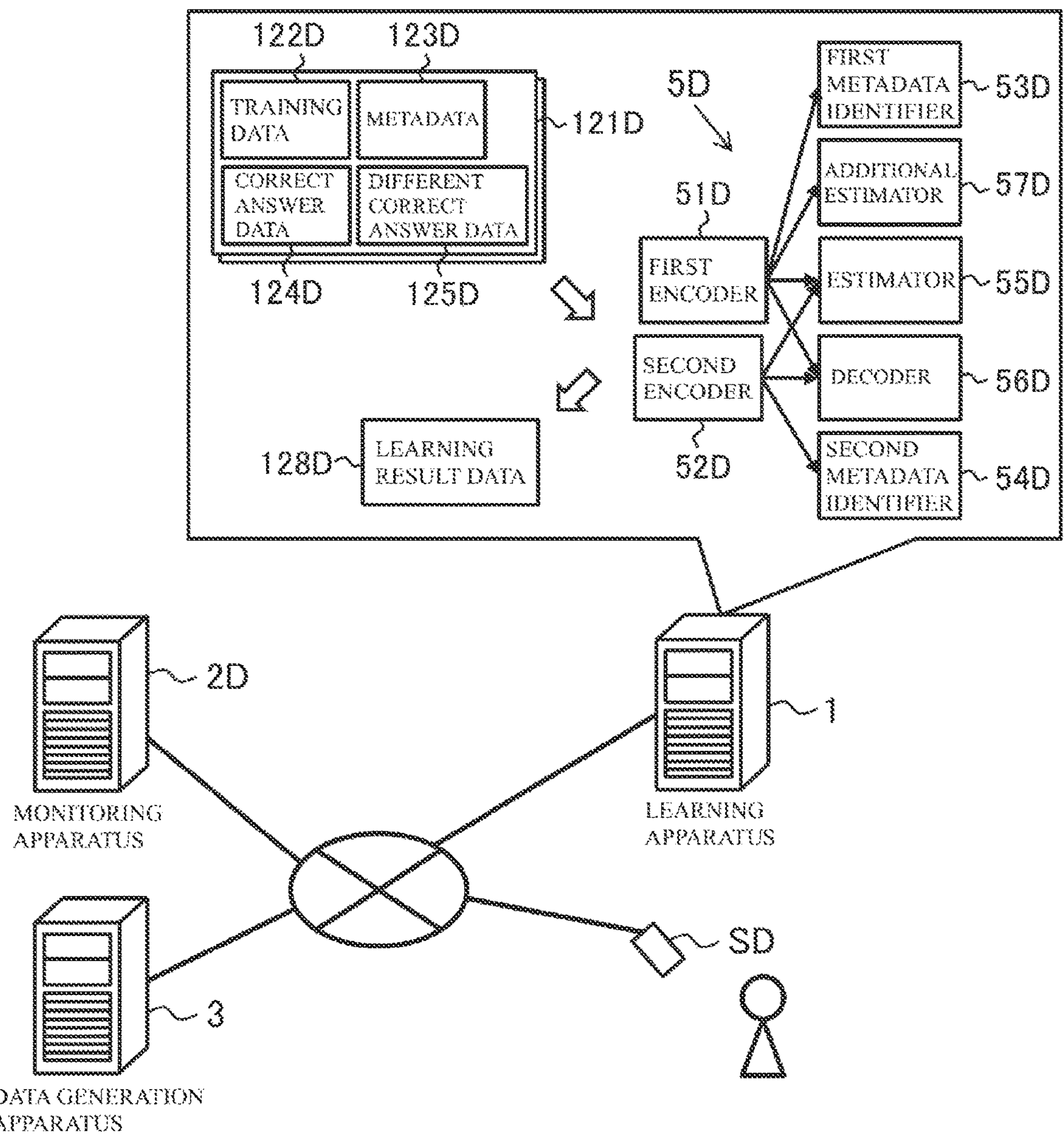
FIG. 19 is a schematic diagram illustrating an example of another scenario to which one or more embodiments may be applied.

FIG. 19 schematically illustrates an example of an application scenario of a system according to a fourth modification. This modification is an example in which the above-described embodiment is applied to a scenario in which the attribute of a person in an image of image data is estimated. As shown in FIG. 19, the system according to the present embodiment includes the learning apparatus 1, a monitoring apparatus 2D, and the data generation apparatus 3. Similarly to the above-described embodiment, the learning apparatus 1, the monitoring apparatus 2D, and the data generation apparatus 3 may be connected to each other via a network. The system according to this modification may be configured similarly to the above-described embodiment except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121D for learning a task of estimating the attribute of a person. Each learning data set 121D is constituted by a combination of training data 122D, metadata 123D, correct answer data 124D, and different correct answer data 125D, similarly to the above-described learning data set 121. The training data 122D, the metadata 123D, the correct answer data 124D, and the different correct answer data 125D respectively correspond to the training data 122, the metadata 123, the correct answer data 124, and the different correct answer data 125 according to the embodiment described above.

The training data 122D is image data of an image of a person, for example. The training data 122D may be obtained by shooting an examinee by a camera SD or a camera of the same type (hereinafter, collectively referred to as "camera SD" including a camera of the same type). The camera SD may be an ordinary RGB camera, a depth camera, an infrared camera, or the like.

The metadata 123D indicates an attribute regarding the operation setting of the camera SD, an attribute regarding the installation conditions of the camera SD, an attribute regarding time at which the training data 122D is acquired, or an attribute regarding the installed location of the camera SD, or a combination of these, as the attribute regarding acquisition of the training data 122D, for example. The attribute regarding the operation setting of the camera SD may include setting values of a measurement range, resolution, and a setting value of a sampling frequency, for example. The attribute regarding the installation conditions of the camera SD may include an installation angle of the camera SD, for example. The attribute regarding time may include a time slot, the day of week, weekday or holiday, month, and season, for example.

The correct answer data 124D and the different correct answer data 125D indicate the range of a person in an image (bounding box), identification information of a person, or a state of a person, or a combination of these, as the feature included in the training data 122D, for example. The identification information of a person may include an identifier of the person, name, gender, age, body build, and ethnicity, for example. The state of a person may include behavior of the person and posture of the person, for example. Note that when the correct answer data 124D or the different correct answer data 125D indicates the bounding box of a person, estimating the attribute of a person includes detecting the range of the person in an image of the image data.

In step S102, the learning apparatus 1 performs machine learning of the learning model 5D using the plurality of learning data sets 121D that are each constituted by a combination of training data 122D, metadata 123D, correct answer data 124D, and different correct answer data 125D, similarly to the embodiment described above. The learning model 5D may be configured similarly to the learning model 5 according to the embodiment described above. That is, the learning model 5D includes a first encoder 51D, a second encoder 52D, a first metadata identifier 53D, a second metadata identifier 54D, an estimator 55D, a decoder 56D, and an additional estimator 57D. The devices 51D to 57D correspond to the devices 51 to 57 according to the embodiment described above. The configurations of the devices 51D to 57D may be similar to those of the devices 51 to 57 according to the embodiment described above.

As a result of the machine learning, the second encoder 52D is trained to convert training data 122D to a second feature amount including a component corresponding to the attribute regarding acquisition of the training data 122D that is indicated by the metadata 123D. The first encoder 51D is trained to convert training data 122D to a first feature amount including a component corresponding to information other than the attribute regarding acquisition of the training data 122D, that is, information that appears in common across domains from which training data 122D is acquired, for example. The portion including the estimator 55D or the additional estimator 57D in the learning model 5D acquires the capability of estimating the attribute of a person from the image data obtained by the camera SD. Also, the portion including the decoder 56D in the learning model 5D acquires the capability of generating decoded data of the same type as the image data obtained by the camera SD.

In step S103, the learning apparatus 1 generates information regarding the trained learning model 5D as the learning result data 128D, and saves the generated learning result data 128D in a predetermined storage area. The generated learning result data 128D may be provided to the monitoring apparatus 2D and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described steps S701 to S704. With this, the data generation apparatus 3 can generate decoded data from object image data using the trained first encoder 51D and decoder 56D. The decoded data corresponds to data obtained by removing the information corresponding to the attribute regarding acquisition of object image data from the object image data. Also, the data generation apparatus 3 may generate new data (decoded data) in which the attribute regarding acquisition is changed by an amount corresponding to noise, using the trained first encoder 51D, second encoder 52D, and decoder 56D. Moreover, the data generation apparatus 3 may also generate data of at least one of the first and second feature amounts using at least one of the trained first encoder 51D and the second encoder 52D.

The monitoring apparatus 2D corresponds to the estimation apparatus 2 described above. The monitoring apparatus 2D may be configured similarly to the estimation apparatus 2 described above, except that the data that they use is different. In this modification, the monitoring apparatus 2D is connected to the camera SD. The monitoring apparatus 2D acquires object image data from the camera SD. Also, the monitoring apparatus 2D estimates the attribute of a person in an image of the acquired object image data using the trained learning model 5D constructed by the learning apparatus 1.

<Hardware Configuration of Monitoring Apparatus>

Figure 20A:
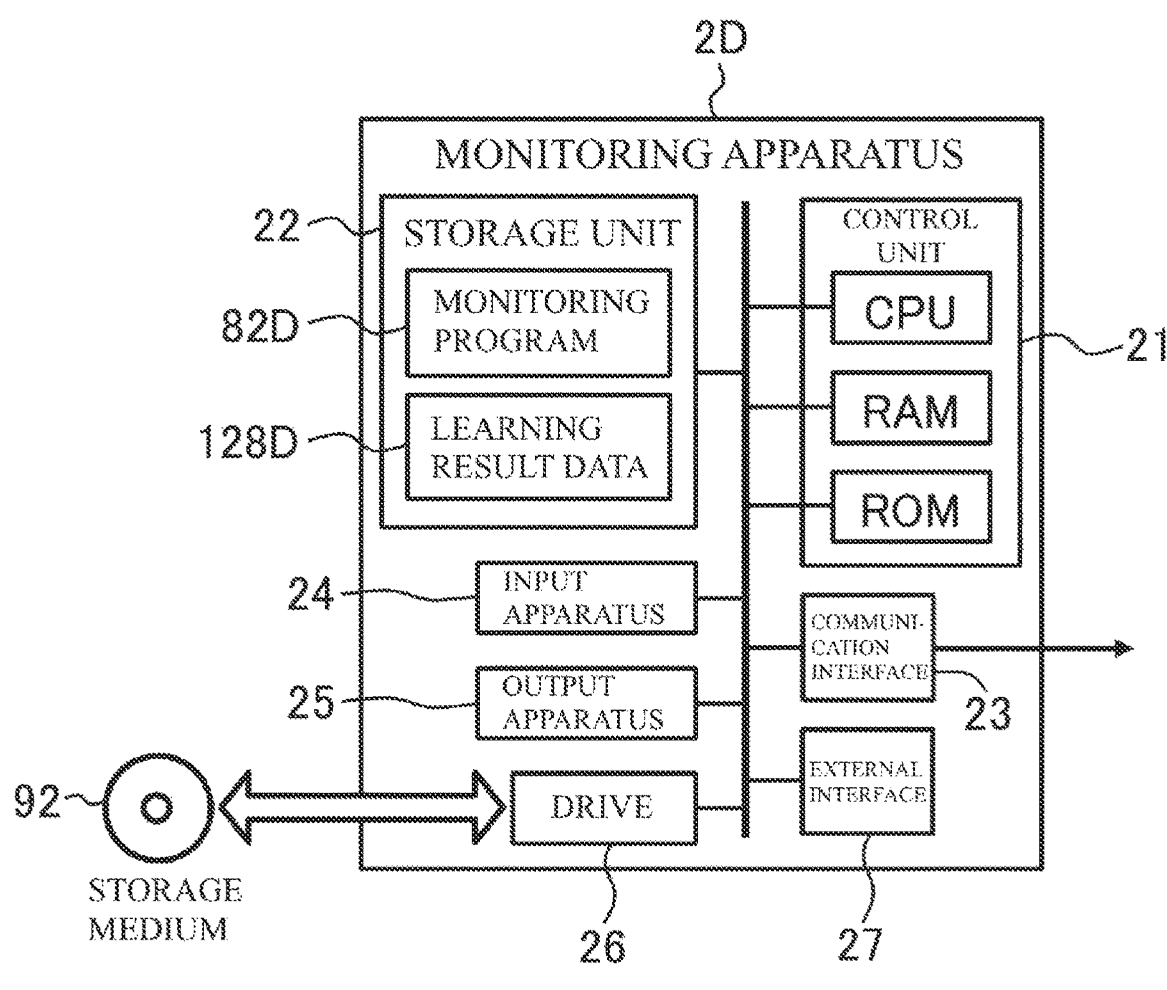
FIG. 20A is a schematic diagram illustrating an example of a hardware configuration of a monitoring apparatus according to another mode.

FIG. 20A schematically illustrates an example of a hardware configuration of the monitoring apparatus 2D according to this modification. As shown in FIG. 20A, the monitoring apparatus 2D according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. The monitoring apparatus 2D is connected to the camera SD via the communication interface 23. The camera SD may be arranged as appropriate. The camera SD may be installed at a station platform, on a street, or in a store, for example. Note that the hardware configuration of the monitoring apparatus 2D is not limited to this example. Regarding the specific hardware configuration of the monitoring apparatus 2D, constituent elements can be omitted, replaced, and added as appropriate depending on the embodiment. The monitoring apparatus 2D may be a general-purpose server apparatus, a general-purpose PC, or the like, instead of an information processing apparatus that is specifically designed for the service to be provided.

The storage unit 22 of the monitoring apparatus 2D according to this modification stores various types of information such as a monitoring program 82D and the learning result data 128D. The monitoring program 82D and learning result data 128D correspond to the estimation program 82 and learning result data 128 according to the embodiment described above. At least one of the monitoring program 82D and the learning result data 128D may also be stored in a storage medium 92. Also, the monitoring apparatus 2D may acquire at least one of the monitoring program 82D and the learning result data 128D from the storage medium 92.

<Software Configuration and Exemplary Operation of Monitoring Apparatus>

Figure 20B:
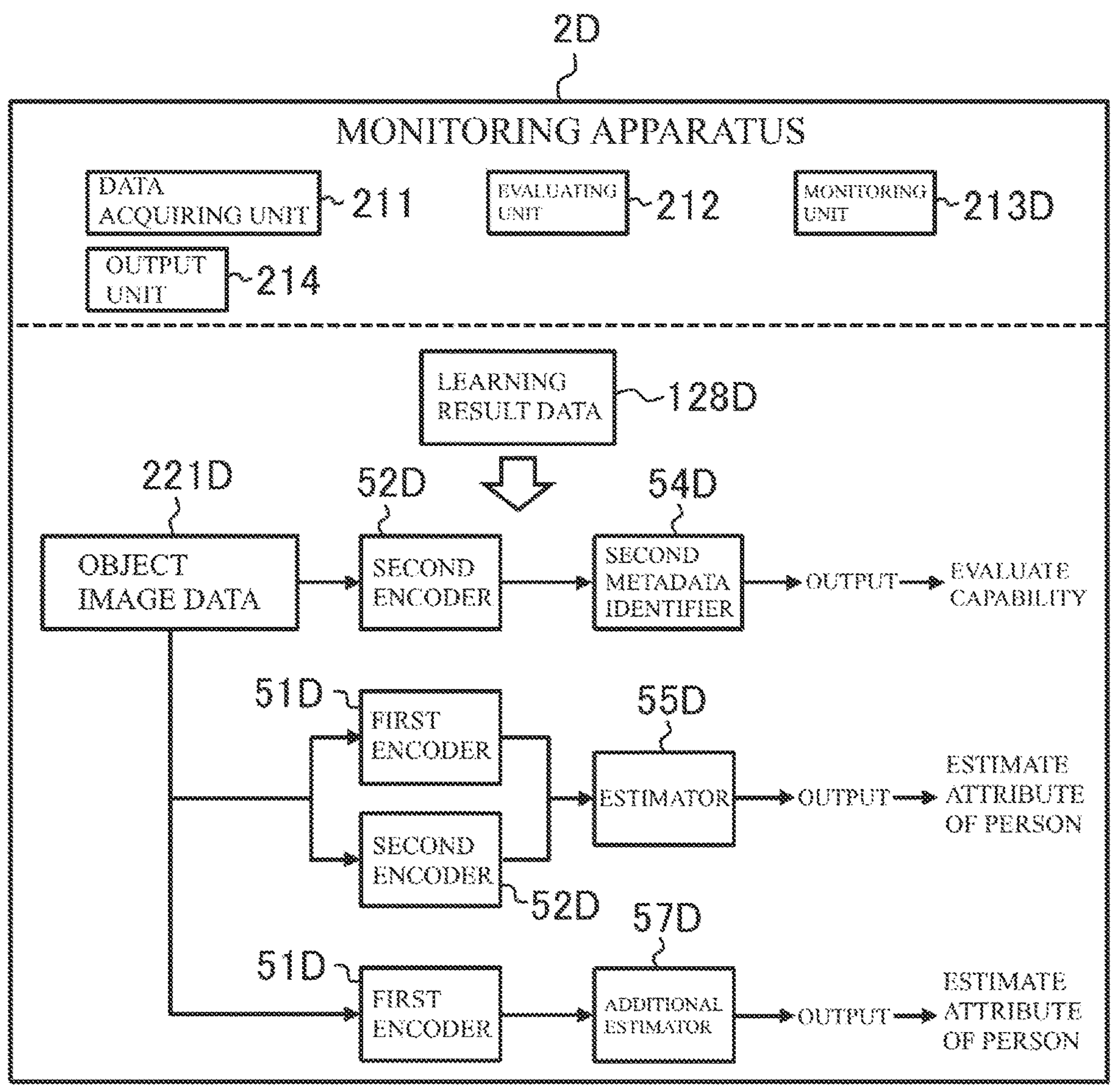
FIG. 20B is a schematic diagram illustrating an example of a software configuration of a monitoring apparatus according to another mode.

FIG. 20B schematically illustrates an example of a software configuration of the monitoring apparatus 2D according to this modification. The software configuration of the monitoring apparatus 2D is realized by the control unit 21 executing the monitoring program 82D, similarly to the above-described embodiment. As shown in FIG. 20B, the software configuration of the monitoring apparatus 2D is similar to the software configuration of the estimation apparatus 2 described above, except that image data including an image of a person obtained by the camera SD is used. Accordingly, the monitoring apparatus 2D executes series of processes regarding the monitoring processes, similarly to the estimation processes of the estimation apparatus 2 described above.

That is, in step S501, the control unit 21 operates as the data acquiring unit 211, and acquires object image data 221D that may include an image of a person, from the camera SD. In step S502, the control unit 21 operates as the evaluating unit 212, and identifies the attribute regarding acquisition of object image data 221D using the second encoder 52D and second metadata identifier 54D that were trained by the learning apparatus 1. Specifically, the control unit 21 configures the settings of the trained second encoder 52D and second metadata identifier 54D by referring to the learning result data 128D. Next, the control unit 21 inputs the acquired object image data 221D to the second encoder 52D, and executes computation processes of the second encoder 52D and the second metadata identifier 54D. With these computation processes, the control unit 21 acquires an output value corresponding to the result of identifying the attribute regarding acquisition of the object image data 221D, from the second metadata identifier 54D.

In step S503, the control unit 21 operates as the evaluating unit 212, and determines whether or not the result of estimation by the estimator 55D or the additional estimator 57D is adopted, based on the result of identifying the attribute regarding acquisition of the object image data 221D. In step S504, the control unit 21 determines to where the process branches based on the determination result in step S503.

If the identification result in step S502 matches the correct answer value of the attribute regarding acquisition of the object image data 221D, the control unit 21 determines that the result of estimation by the estimator 55D or the additional estimator 57D is adopted, and advances the process to the next step S505. On the other hand, if the identification result in step S502 does not match the correct answer value of the attribute regarding acquisition of the object image data 221D, the control unit 21 determines that the result of estimation by the estimator 55D or the additional estimator 57D is not adopted, skips processes in steps S505 and S506, and ends the series of processes according to this modification.

In step S505, the control unit 21 operates as a monitoring unit 213D, and estimates the attribute of a person in an image of the object image data 221D using the first encoder 51D, second encoder 52D, and estimator 55D that were trained by the learning apparatus 1. Alternatively, the control unit 21 estimates the attribute of a person in an image of the object image data 221D using the first encoder 51D and the additional estimator 57D that were trained by the learning apparatus 1.

Specifically, the control unit 21 further configures the settings of the trained first encoder 51D and the estimator 55D by referring to the learning result data 128D. The control unit 21 inputs the object image data 221D to the encoders (51D, 52D), and executes the computation processes of the first encoder 51D, the second encoder 52D, and the estimator 55D. With this, the control unit 21 acquires an output value corresponding to the result of estimating the attribute of a person in an image of the object image data 221D, from the estimator 55D.

Alternatively, the control unit 21 configures the settings of the trained first encoder 51D and the additional estimator 57D by referring to the learning result data 128D. The control unit 21 inputs the object image data 221D to the first encoder 51D, and executes the computation processes of the first encoder 51D and the additional estimator 57D. With this, the control unit 21 acquires an output value corresponding to the result of estimating the attribute of a person in an image of the object image data 221D, from the additional estimator 57D.

In step S506, the control unit 21 operates as the output unit 214, and outputs information regarding the result of estimating the attribute of a person. For example, the control unit 21 may output the result of estimating the attribute of the person to the output apparatus 25 as is. Also, when the range of a person in an image is estimated as the attribute of the person, the control unit 21 may also output the object image data 221D, and indicate the estimated range of the person in the image of the object image data 221D, for example. Also, when the camera SD is installed at a station platform or the like, and an event such as an indication of falling from the station platform is estimated as the state of a person, the control unit 21 may also output a message such as a warning according to the type of the estimated event, for example.

According to this modification, in a scenario in which an attribute of a person in an image of image data is estimated, a trained learning model 5D may be constructed whose introduction cost is relatively low and that is robust to the difference in the attribute regarding acquisition of image data.

In a scenario in which the range of a person in an image is estimated, it is possible that the information specific to a domain that may influence the state of the person in the image, such as the resolution of the camera SD, the shooting time slot, or the season in which the person was shot, exerts a bad influence on the estimation accuracy, for example. On the other hand, the state of a person such as behavior or posture may depend on the location at which the person is present. Therefore, in a scenario in which the state of a person is estimated, it is possible that information specific to a domain such as the installed location of the camera SD is useful for estimating the state of the person.

Therefore, the metadata 123D may be set to indicate the installed location of the camera SD, the resolution of the camera SD, the shooting time slot, and the season in which the person was shot, for example. The correct answer data 124D may be set to indicate the state of the person, for example. The different correct answer data 125D may be set to indicate the range of the person in an image, for example.

As a result of executing the above-described machine learning with these settings, the first feature amount includes a component corresponding to the external appearance of a person from which effects of individual conditions are removed (e.g., an external appearance of an average person), as information in common across domains. On the other hand, the second feature amount includes components corresponding to the manner of a person appearing in an image according to the installed location of the camera SD, the resolution of the camera SD, and the season in which a person was shot, and the occurrence probability of the posture of a person at each point, as the information specific to a domain.

Accordingly, as a result of using the trained first encoder 51D and additional estimator 57D, in the monitoring apparatus 2D, a task of estimating the range of a person in an image can be performed based on the above-described information in common across domains while removing the above-described information specific to a domain. Therefore, the range of a person in an image of the object image data 221D can be estimated with relatively high accuracy. Also, as a result of using the trained first encoder 51D, second encoder 52D, and estimator 55D, in the monitoring apparatus 2D, a task of estimating the state of a person can be performed based on the above-described information specific to a domain and the information in common across domains. Therefore, the state of a person such as behavior or posture can be estimated with relatively high accuracy.

(E) Scenario in which Driving Conditions are Monitored

Figure 21:
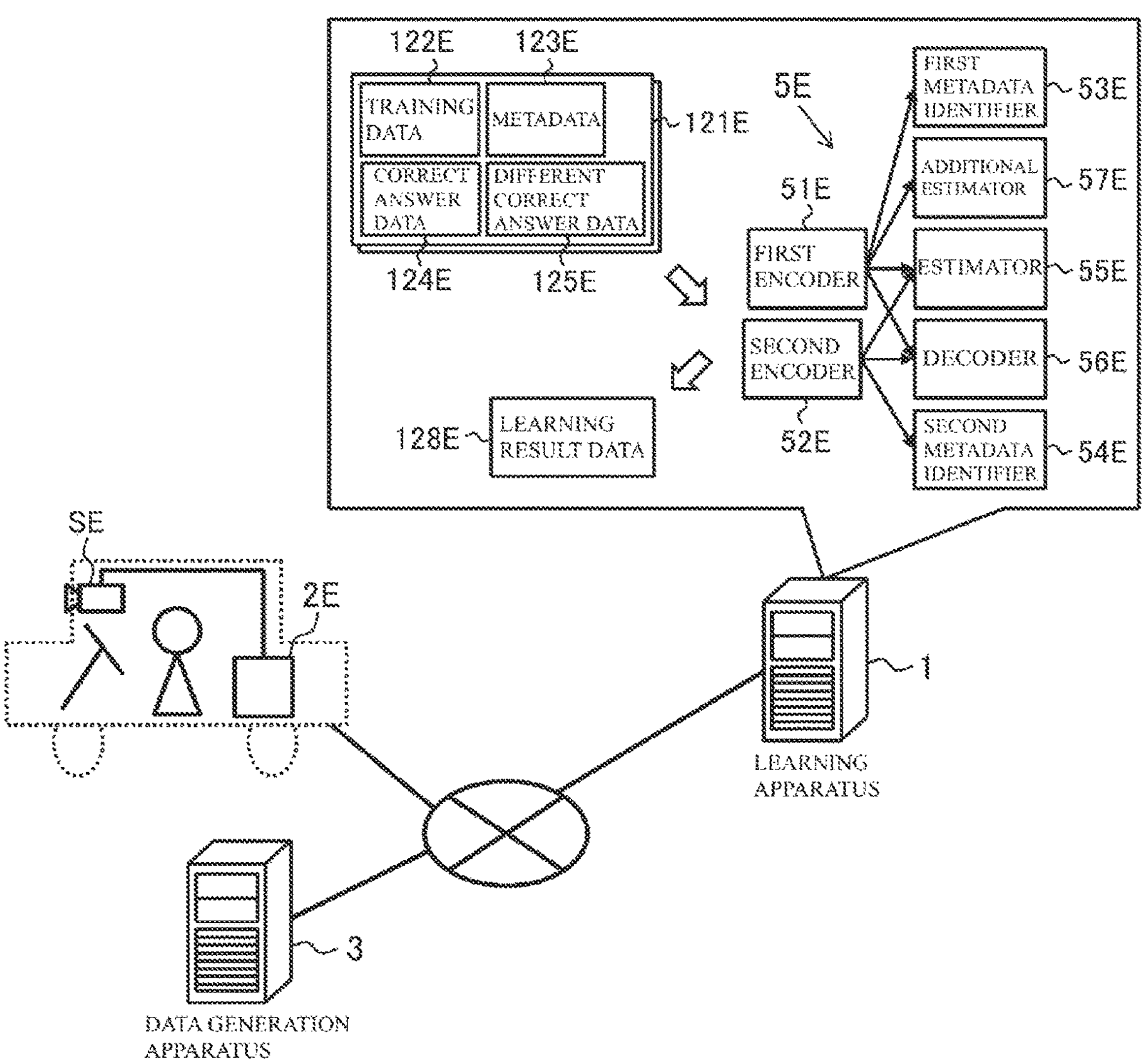
FIG. 21 is a schematic diagram illustrating an example of another scenario to which one or more embodiments may be applied.

FIG. 21 schematically illustrates an example of a scenario to which a system according to a fifth modification is applied. This modification is an example in which the above-described embodiment is applied to a scenario in which the conditions outside of a vehicle are estimated from sensing data obtained by an in-vehicle sensor. As shown in FIG. 21, the system according to the present embodiment includes the learning apparatus 1, a monitoring apparatus 2E, and the data generation apparatus 3. Similarly to the above-described embodiment, the learning apparatus 1, the monitoring apparatus 2E, and the data generation apparatus 3 may be connected to each other via a network. The system according to this modification may be configured similarly to the above-described embodiment, except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121E for learning a task of estimating the conditions outside of a vehicle. Each learning data set 121E is constituted by a combination of training data 122E, metadata 123E, correct answer data 124E, and different correct answer data 125E, similarly to the above-described learning data set 121. The training data 122E, the metadata 123E, the correct answer data 124E, and the different correct answer data 125E respectively correspond to the training data 122, the metadata 123, the correct answer data 124, and the different correct answer data 125 according to the embodiment described above.

The training data 122E is sensing data obtained by an in-vehicle sensor. The training data 122E may be obtained by measuring the conditions around a vehicle by the in-vehicle sensor SE or a sensor of the same type (hereinafter, collectively referred to as an "in-vehicle sensor SE" including a sensor of the same type). The in-vehicle sensor SE may be a camera, a Lidar sensor, a millimeter-wave radar, or an ultrasonic sensor, for example. The camera may be an ordinary RGB camera, a depth camera, or an infrared camera, for example. The training data 122E may be constituted by image data and measurement data of various sensors, for example.

The metadata 123E indicates an attribute of a vehicle, or an attribute regarding the observation environment of the in-vehicle sensor SE, or a combination of these, as the attribute regarding acquisition of the training data 122E, for example. The attribute of a vehicle may include the type of the vehicle, an identification number of the vehicle, and specifications of the vehicle, for example. The attribute regarding the observation environment may include a location, weather, temperature, humidity, and an illumination level, for example. Moreover, the attribute regarding the observation environment may also include information regarding the scene such as a city area or not, a country road or not, and the type of the road, for example.

The correct answer data 124E and the different correct answer data 125E indicate information regarding the external environment of a vehicle, an accident risk, or an operation instruction to a vehicle according to the conditions outside of the vehicle, or a combination of these, as the feature included in the training data 122E, for example. The information regarding the external environment of a vehicle may include information regarding a road on which the vehicle is moving, and information regarding an object that is present in a moving direction of the vehicle, for example. The information regarding a road on which the vehicle is moving may include information indicating a driving lane type and a road type, for example. The object that is present in a moving direction of the vehicle may be a road, a signal, or an obstacle (person, object), for example. The information regarding the object that is present in a moving direction of the vehicle may include a road surface state, a lighting state of a signal, presence/absence of an obstacle, type of an obstacle, a dimension of an obstacle, a size of an obstacle, a speed of an obstacle, and event information of an obstacle, for example. The event information of an obstacle may indicate rushing out of a person or a vehicle, sudden starting, suddenly braking, and lane change, for example. This event information may be expressed by other information such as information indicating whether or not an obstacle is present and the speed of an obstacle, for example. The accident risk may be indicated by the type of accident, and the occurrence probability of the accident. The operation instruction to a vehicle according to the conditions outside of the vehicle may be defined by an acceleration amount, a braking amount, a steering angle, turning on/off of lights, and usage of a horn, for example. Note that when the correct answer data 124E or the different correct answer data 125E indicates the operation instruction to a vehicle according to the conditions outside of the vehicle, estimating the conditions outside of a vehicle includes determining the operation instruction to a vehicle according to the conditions outside of the vehicle.

In step S102, the learning apparatus 1 performs machine learning of the learning model 5E using the plurality of learning data sets 121E that are each constituted by a combination of training data 122E, metadata 123E, correct answer data 124E, and different correct answer data 125E, similarly to the embodiment described above. The learning model 5E may be configured similarly to the learning model 5 according to the embodiment described above. That is, the learning model 5E includes a first encoder 51E, a second encoder 52E, a first metadata identifier 53E, a second metadata identifier 54E, an estimator 55E, a decoder 56E, and an additional estimator 57E. The devices 51E to 57E correspond to the devices 51 to 57 according to the embodiment described above. The configurations of the devices 51E to 57E may be similar to those of the devices 51 to 57 according to the embodiment described above.

As a result of the machine learning, the second encoder 52E is trained to convert training data 122E to a second feature amount including a component corresponding to the attribute regarding acquisition of the training data 122E that is indicated by the metadata 123E. The first encoder 51E is trained to convert training data 122E to a first feature amount including a component corresponding to information other than the attribute regarding acquisition of the training data 122E, that is, information that appears in common across domains from which training data 122E is acquired, for example. The portion including the estimator 55E or the additional estimator 57E in the learning model 5E acquires the capability of estimating the conditions outside of a vehicle from the sensing data obtained by the in-vehicle sensor SE. Also, the portion including the decoder 56E in the learning model 5E acquires the capability of generating decoded data of the same type as the sensing data obtained by the in-vehicle sensor SE.

In step S103, the learning apparatus 1 generates information regarding the trained learning model 5E as the learning result data 128E, and saves the generated learning result data 128E in a predetermined storage area. The generated learning result data 128E may be provided to the monitoring apparatus 2E and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described step S701 to step S704. With this, the data generation apparatus 3 can generate decoded data from object sensing data using the trained first encoder 51E and decoder 56E. The decoded data corresponds to data obtained by removing the information corresponding to the attribute regarding acquisition of object sensing data from the object sensing data. Also, the data generation apparatus 3 may generate new data (decoded data) in which the attribute regarding acquisition is changed by an amount corresponding to noise, using the trained first encoder 51E, second encoder 52E, and decoder 56E. Moreover, the data generation apparatus 3 may also generate data of at least one of the first and second feature amounts using at least one of the trained first encoder 51E and the second encoder 52E.

The monitoring apparatus 2E corresponds to the estimation apparatus 2 described above. The monitoring apparatus 2E may be configured similarly to the estimation apparatus 2 described above, except that the data that they use is different. In this modification, the monitoring apparatus 2E is connected to the in-vehicle sensor SE via a network. The monitoring apparatus 2E acquires object sensing data from the in-vehicle sensor SE. Then, the monitoring apparatus 2E estimates the conditions outside of a vehicle based on the acquired object sensing data using the trained learning model 5E constructed by the learning apparatus 1.

<Hardware Configuration of Monitoring Apparatus>

FIG. 22A schematically illustrates an example of a hardware configuration of the monitoring apparatus 2E according to this modification. As shown in FIG. 22A, the monitoring apparatus 2E according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. The monitoring apparatus 2E is connected to the in-vehicle sensor SE via the external interface 27. The in-vehicle sensor SE may be arranged as appropriate depending on the embodiment, as long as the conditions outside of a vehicle can be monitored. Note that the hardware configuration of the monitoring apparatus 2E is not limited to this example. Regarding the specific hardware configuration of the monitoring apparatus 2E, constituent elements can be omitted, replaced, and added as appropriate depending on the embodiment. The monitoring apparatus 2E may be a general-purpose computer, a mobile phone including a smartphone, an in-vehicle apparatus, or the like, instead of an information processing apparatus that is specifically designed for the service to be provided.

The storage unit 22 of the monitoring apparatus 2E according to this modification stores various types of information such as a monitoring program 82E and the learning result data 128E. The monitoring program 82E and learning result data 128E correspond to the estimation program 82 and learning result data 128 according to the embodiment described above. At least one of the monitoring program 82E and the learning result data 128E may be stored in a storage medium 92. Also, the monitoring apparatus 2E may acquire at least one of the monitoring program 82E and the learning result data 128E from the storage medium 92.

<Software Configuration and Exemplary Operation of Monitoring Apparatus>

Figure 22B:
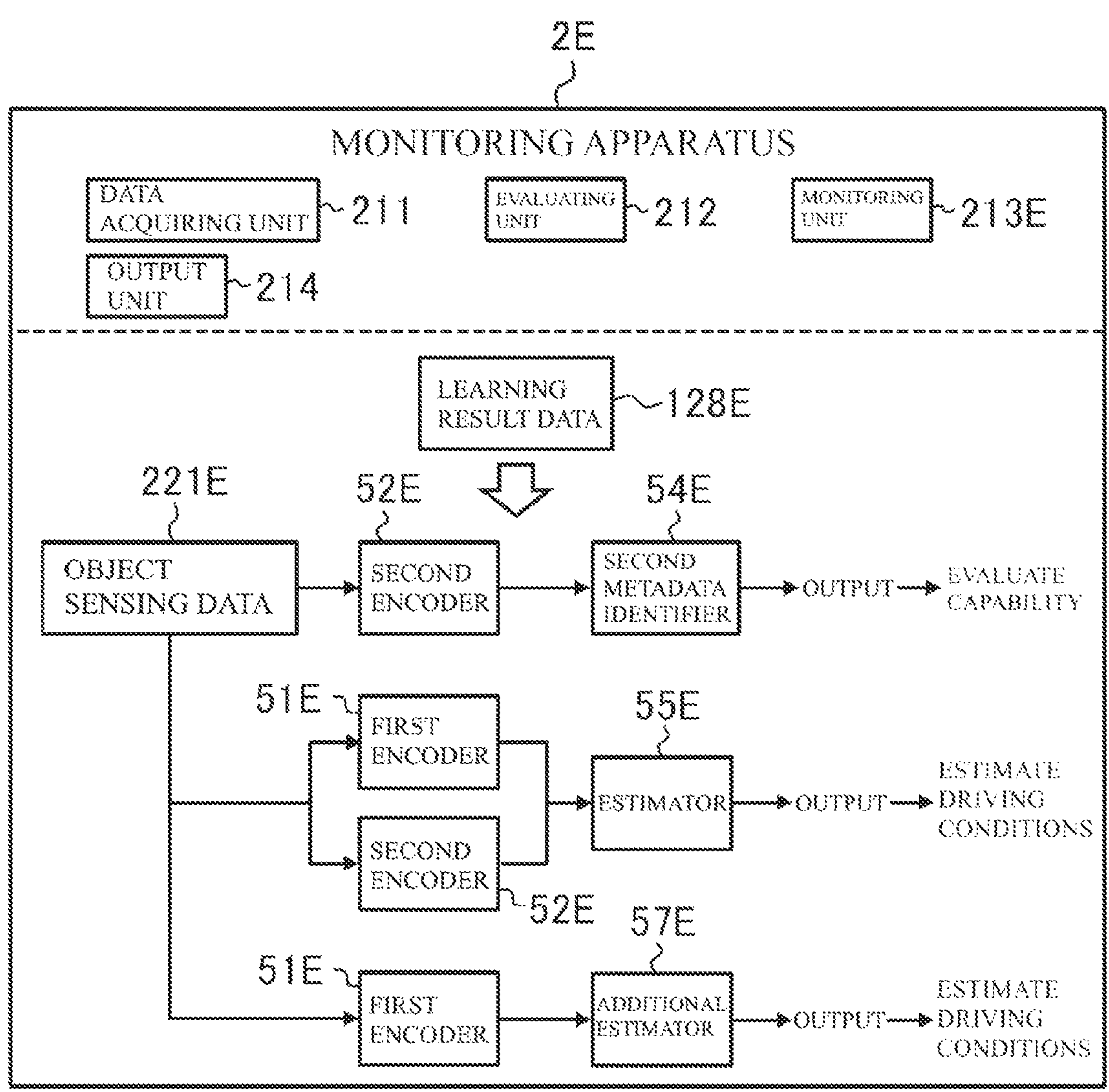
FIG. 22B is a schematic diagram illustrating an example of a software configuration of a monitoring apparatus according to another mode.

FIG. 22B schematically illustrates an example of a software configuration of the monitoring apparatus 2E according to this modification. The software configuration of the monitoring apparatus 2E is realized by the control unit 21 executing the monitoring program 82E, similarly to the above-described embodiment. As shown in FIG. 22B, the software configuration of the monitoring apparatus 2E is similar to the software configuration of the estimation apparatus 2 described above, except that sensing data obtained by the in-vehicle sensor SE is used. Accordingly, the monitoring apparatus 2E executes series of processes regarding the monitoring processes, similarly to the estimation processes of the estimation apparatus 2 described above.

That is, in step S501, the control unit 21 operates as the data acquiring unit 211, and acquires object sensing data 221E on which conditions outside of a vehicle are reflected, from the in-vehicle sensor SE. In step S502, the control unit 21 operates as the evaluating unit 212, and identifies the attribute regarding acquisition of object sensing data 221E using the second encoder 52E and second metadata identifier 54E that were trained by the learning apparatus 1. Specifically, the control unit 21 configures the settings of the trained second encoder 52E and second metadata identifier 54E by referring to the learning result data 128E. Next, the control unit 21 inputs the acquired object sensing data 221E to the second encoder 52E, and executes computation processes of the second encoder 52E and the second metadata identifier 54E. With these computation processes, the control unit 21 acquires an output value corresponding to the result of identifying the attribute regarding acquisition of the object sensing data 221E, from the second metadata identifier 54E.

In step S503, the control unit 21 operates as the evaluating unit 212, and determines whether or not the result of estimation by the estimator 55E or the additional estimator 57E is adopted, based on the result of identifying the attribute regarding acquisition of the object sensing data 221E. In step S504, the control unit 21 determines to where the process branches based on the determination result in step S503.

If the identification result in step S502 matches the correct answer value of the attribute regarding acquisition of the object sensing data 221E, the control unit 21 determines that the result of estimation by the estimator 55E or the additional estimator 57E is adopted, and advances the process to the next step S505. On the other hand, if the identification result in step S502 does not match the correct answer value of the attribute regarding acquisition of the object sensing data 221E, the control unit 21 determines that the result of estimation by the estimator 55E or the additional estimator 57E is not adopted, skips processes in steps S505 and S506, and ends the series of processes according to this modification.

In step S505, the control unit 21 operates as a monitoring unit 213E, and estimates the conditions outside of a vehicle from the object sensing data 221E using the first encoder 51E, second encoder 52E, and estimator 55E that were trained by the learning apparatus 1. Alternatively, the control unit 21 estimates the conditions outside of the vehicle from the object sensing data 221E using the first encoder 51E and the additional estimator 57E that were trained by the learning apparatus 1.

Specifically, the control unit 21 further configures the setting of the trained first encoder 51E and the estimator 55E by referring to the learning result data 128E. The control unit 21 inputs the object sensing data 221E to the encoders (51E, 52E), and executes the computation processes of the first encoder 51E, the second encoder 52E, and the estimator 55E. With this, the control unit 21 acquires an output value corresponding to the result of estimating the conditions outside of the vehicle from the object sensing data 221E, from the estimator 55E.

Alternatively, the control unit 21 configures the settings of the trained first encoder 51E and the additional estimator 57E by referring to the learning result data 128E. The control unit 21 inputs the object sensing data 221E to the first encoder 51E, and executes the computation processes of the first encoder 51E and the additional estimator 57E. With this, the control unit 21 acquires an output value corresponding to the result of estimating the conditions outside of the vehicle from the object sensing data 221E, from the additional estimator 57E.

In step S506, the control unit 21 operates as the output unit 214, and outputs information regarding the result of estimating the conditions outside of the vehicle. For example, the control unit 21 may output the result of estimating the conditions outside of the vehicle to the output apparatus 25 as is. Also, the control unit 21 may determine whether or not there is a risk in movement of the vehicle based on at least one of the estimated external environment of the vehicle and accident risk, for example. The case where it is determined that there is a risk in movement of a vehicle may be set as appropriate depending on the embodiment. For example, the control unit 21 may determine that there is a risk in movement of a vehicle when it is estimated that an event such as rushing out of a person or a vehicle, sudden starting, suddenly braking, or lane change will occur, when the occurrence probability of an accident is a threshold value, or the like. The threshold value may be set as appropriate. If it is determined that there is a risk in movement of a vehicle, the control unit 21 may output a warning for reporting the risk to the output apparatus 25.

Also, when the correct answer data 124E or different correct answer data 125E indicating the operation instruction to a vehicle according to the conditions outside of the vehicle is given, the control unit 21 acquires the operation instruction to the vehicle according to the conditions outside of the vehicle, as the result of estimating the conditions outside of the vehicle. The control unit 21 may directly control the operation of the vehicle based on the acquired operation instruction. Alternatively, when a vehicle includes a control apparatus for controlling the operation of the vehicle, the control unit 21 may also indirectly control the operation of the vehicle by giving the acquired operation instruction to the control apparatus.

Note that the method of controlling the operation of a vehicle based on an estimation result is not limited to this example. The control unit 21 may determine the vehicle operation policy based on the estimation result of the above-described external environment of the vehicle or accident risk, for example. The correspondence relationship between the estimation result and the vehicle operation policy may be given by data such as a data table, for example. The data may be retained in the RAM in the control unit 21, the storage unit 22, the storage medium 92, or an external storage apparatus, or a combination of these, for example. The control unit 21 may determine the vehicle operation policy according to the result of estimating the external environment of a vehicle or the accident risk, by referring to the data. The vehicle operation policy may be defined by an acceleration amount, a braking amount, a steering angle, turning on/off of lights, and usage of a horn, for example. Also, the control unit 21 may directly or indirectly control the operation of the vehicle following the determined operation policy.

According to this modification, in a scenario in which the conditions outside of a vehicle are estimated from sensing data, a trained learning model 5E can be constructed whose introduction cost is relatively low and that is robust to the difference in the attributes regarding acquisition of sensing data.

For example, even if the external environment of a vehicle is the same, the operation instruction to the vehicle and the accident risk may change according to the road type on which the vehicle moves, weather, and the like. Therefore, in a scenario in which the operation instruction or the accident risk is estimated according to the conditions outside of a vehicle, it is possible that the information specific to a domain such as the attribute regarding the observation environment is useful for determining the operation instruction. In contrast, in a scenario in which the external environment of a vehicle is estimated, it is possible that the difference in background, which works as a disturbance, exerts a bad influence on the accuracy of the estimation task.

Therefore, the in-vehicle sensor SE may be a camera, a Lidar sensor, a millimeter-wave radar, or an ultrasonic sensor, for example. The training data 122E may be image data or measurement data, for example. The metadata 123E may be set to indicate the type of a vehicle, weather, the road type, and the vehicle being in a city area or not or on a country road or not. The correct answer data 124E may be set to indicate the operation instruction to a vehicle according to the conditions outside of the vehicle or the accident risk. The different correct answer data 125E may be set to indicate information regarding the external environment of a vehicle.

As a result of executing the above-described machine learning with these settings, the first feature amount includes a component corresponding to information regarding the road shape, pedestrian, and another vehicle that appear in the training data 122E, as information in common across domains. On the other hand, the second feature amount includes components corresponding to the information regarding the road type, weather, and scenery that appear in the training data 122E, as information specific to a domain.

Accordingly, as a result of using the trained first encoder 51E and additional estimator 57E, in the monitoring apparatus 2E, a task of estimating the external environment of a vehicle can be performed based on the above-described information in common across domains while removing the above-described information specific to a domain. Therefore, the external environment of a vehicle can be estimated with relatively high accuracy. Also, as a result of using the trained first encoder 51E, second encoder 52E, and estimator 55E, in the monitoring apparatus 2E, a task of estimating the operation instruction to the vehicle or the accident risk according to the conditions outside of the vehicle can be performed based on the above-described information specific to a domain and the information in common across domains. Therefore, the operation instruction to a vehicle or the accident risk can be estimated according to the conditions outside of the vehicle, with relatively high accuracy.

(F) Scenario in which Product or Service is Recommended

Figure 23:
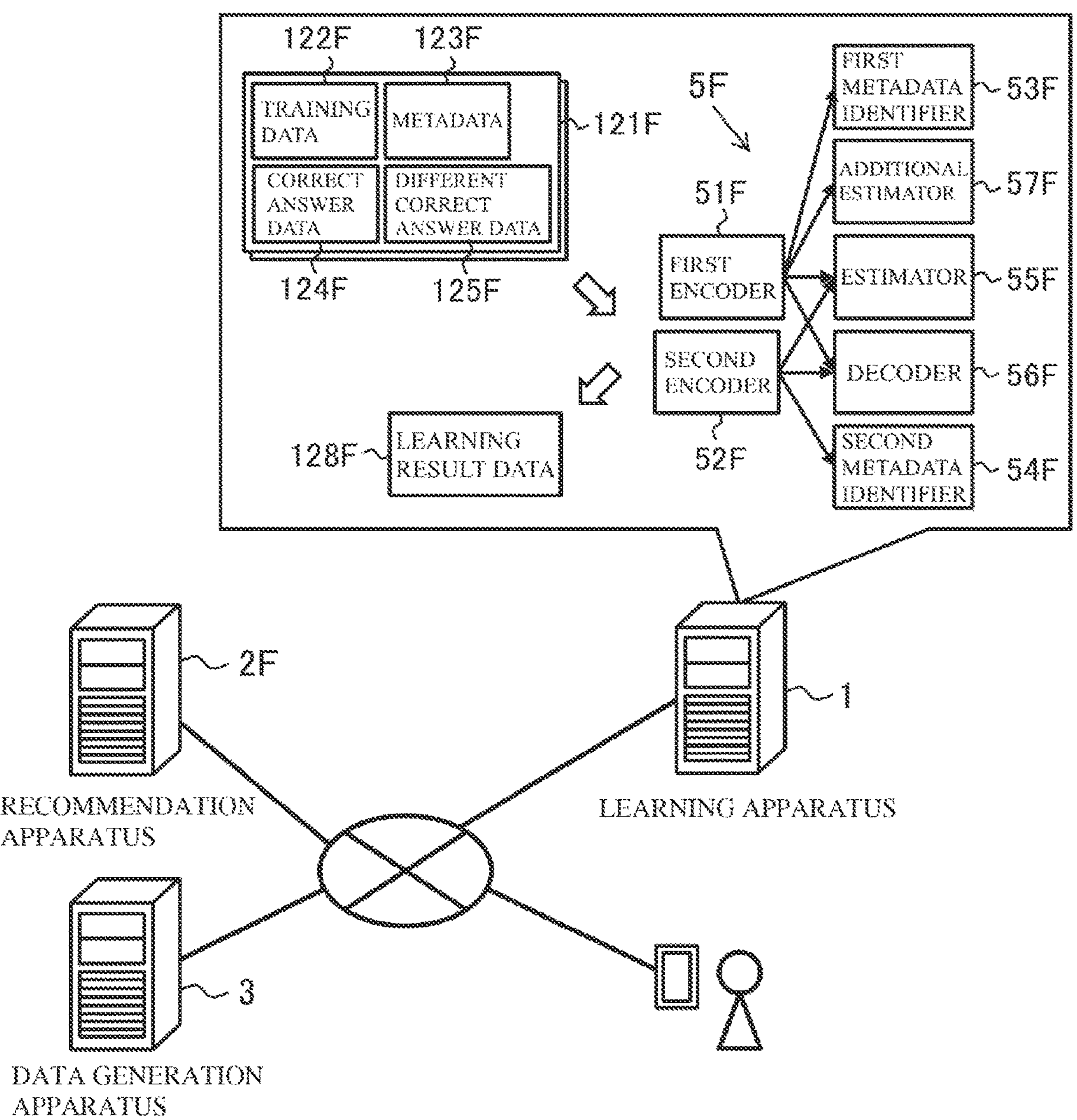
FIG. 23 is a schematic diagram illustrating an example of another scenario to which one or more embodiments may be applied.

FIG. 23 schematically illustrates an example of a scenario to which a system according to a sixth modification is applied. This modification is an example in which the above-described embodiment is applied to a scenario in which a product or service to be recommended is estimated based on history data of actions of a client such as purchases and web browsing. As shown in FIG. 23, the system according to the present embodiment includes the learning apparatus 1, a recommendation apparatus 2F, and the data generation apparatus 3. Similarly to the above-described embodiment, the learning apparatus 1, the recommendation apparatus 2F, and the data generation apparatus 3 may be connected to each other via a network. The system according to this modification may be configured similarly to the above-described embodiment, except that the data that they use is different.

The learning apparatus 1 according to this modification executes information processes of machine learning with a procedure similar to that of the above-described embodiment, except that the data that they use is different. That is, in step S101, the learning apparatus 1 acquires a plurality of learning data sets 121F for learning a task of recommending a product or service to be recommend to a client. Each learning data set 121F is constituted by a combination of training data 122F, metadata 123F, correct answer data 124F, and different correct answer data 125F, similarly to the above-described learning data set 121. The training data 122F, the metadata 123F, the correct answer data 124F, and the different correct answer data 125F respectively correspond to the training data 122, the metadata 123, the correct answer data 124, and the different correct answer data 125 according to the embodiment described above.

The training data 122F is history data of a client, for example. The history data may include information indicating purchases by the client, histories of browsing of, retrieval of, and links to advertisements, on the web, and products or services that were recommended in the past, for example. The history data may be accumulated by the client operating a user terminal such as a PC or a mobile phone, for example. The location at which the history data is accumulated may be a user terminal of the client, or a web server that is provided for browsing, for example. The training data 122F may further include data indicating the object product or service as a label. That is, in this modification, the learning model 5F may be a conditional learning model. In the following, description will be given assuming that the training data 122F further includes data indicating the object product or service as a label. Note that the configuration of the learning model 5F is not limited to this example. For example, the learning model 5F may be prepared for every category of the product or service, and configured to output hit ratios for the categories. In this case, the training data 122F need not include a label.

The metadata 123F indicates identification information of a client or the type of a medium on which recommend information is placed, or a combination of these, as the attribute regarding acquisition of the training data 122F, for example. The identification information of a client may include an identifier of the client, gender, age, body build, and ethnicity, for example. The medium on which recommend information is placed may be a web page, a mail magazine, or digital signage, for example.

The correct answer data 124F and the different correct answer data 125F indicate a hit ratio when an object product or service is recommended in a predetermined medium, as the feature included in the training data 122F, for example. The hit ratio may be calculated as the ratio of the number of clients that have purchased an object product or service to the total number of clients to which the object product or service was recommended, for example. The hit ratio may also be given for every category of the product or service.

In step S102, the learning apparatus 1 performs machine learning of the learning model 5F using the plurality of learning data sets 121F that are each constituted by a combination of training data 122F, metadata 123F, correct answer data 124F, and different correct answer data 125F, similarly to the embodiment described above. The learning model 5F may be configured similarly to the learning model 5 according to the embodiment described above. That is, the learning model 5F includes a first encoder 51F, a second encoder 52F, a first metadata identifier 53F, a second metadata identifier 54F, an estimator 55F, a decoder 56F, and an additional estimator 57F. The devices 51F to 57F correspond to the devices 51 to 57 according to the embodiment described above. The configurations of the devices 51F to 57F may be similar to those of the devices 51 to 57 according to the embodiment described above.

As a result of the machine learning, the second encoder 52F is trained to convert training data 122F to a second feature amount including a component corresponding to the attribute regarding acquisition of the training data 122F that is indicated by the metadata 123F. The first encoder 51F is trained to convert training data 122F to a first feature amount including a component corresponding to information other than the attribute regarding acquisition of the training data 122F, that is, information that appears in common across domains from which training data 122F is acquired, for example. The portion including the estimator 55F or the additional estimator 57F in the learning model 5F acquires the capability of estimating the hit ratio when the product or service is recommended. Also, the portion including the decoder 56F in the learning model 5F acquires the capability of generating decoded data of the same type as the client history data.

In step S103, the learning apparatus 1 generates information regarding the trained learning model 5F as the learning result data 128F, and saves the generated learning result data 128F in a predetermined storage area. The generated learning result data 128F may be provided to the recommendation apparatus 2F and the data generation apparatus 3 at any time.

The data generation apparatus 3 may execute information processes regarding data generation with a procedure similar to that of the above-described embodiment, except that the data that they use is different. That is, the data generation apparatus 3 executes processes in the above-described step S701 to step S704. With this, the data generation apparatus 3 can generate decoded data from object history data using the trained first encoder 51F and decoder 56F. The decoded data corresponds to data obtained by removing the information corresponding to the attribute regarding acquisition of object history data from the object history data. Also, the data generation apparatus 3 may generate new data (decoded data) in which the attribute regarding acquisition is changed by an amount corresponding to noise, using the trained first encoder 51F, second encoder 52F, and decoder 56F. Moreover, the data generation apparatus 3 may also generate data of at least one of the first and second feature amounts using at least one of the trained first encoder 51F and the second encoder 52F.

The recommendation apparatus 2F corresponds to the estimation apparatus 2 described above. The recommendation apparatus 2F may be configured similarly to the estimation apparatus 2 described above, except that the data that they use is different. The recommendation apparatus 2F acquires object history data of a client, as appropriate. Then, the recommendation apparatus 2F estimates the hit ratio when the object product or service is recommended from the acquired object history data, using the trained learning model 5F constructed by the learning apparatus 1.

<Hardware Configuration of Recommendation Apparatus>

Figure 24A:
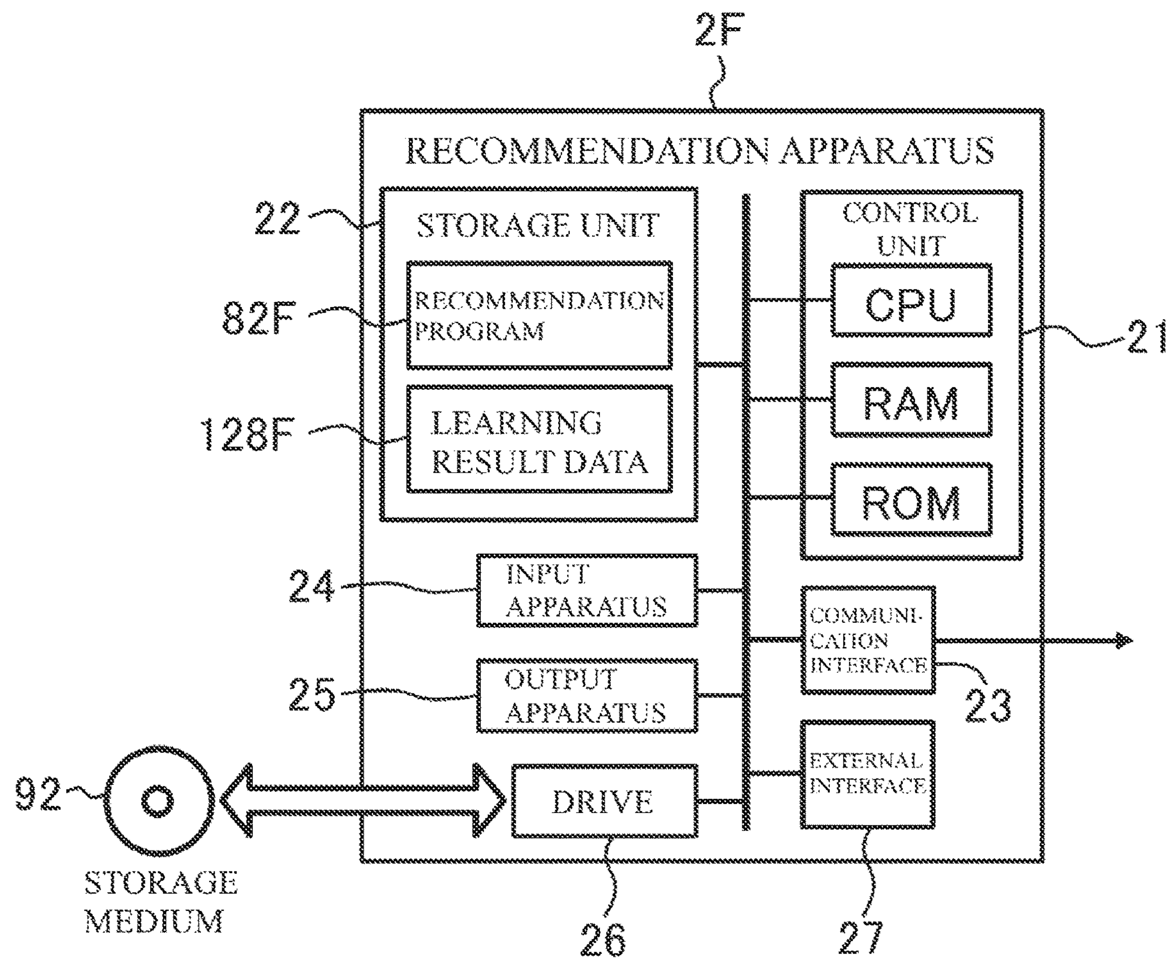
FIG. 24A is a schematic diagram illustrating an example of a hardware configuration of a recommendation apparatus according to another mode.

FIG. 24A schematically illustrates an example of a hardware configuration of the recommendation apparatus 2F according to this modification. As shown in FIG. 24A, the recommendation apparatus 2F according to this modification is a computer in which the control unit 21, the storage unit 22, the communication interface 23, the input apparatus 24, the output apparatus 25, the drive 26, and the external interface 27 are electrically connected, similarly to the estimation apparatus 2 described above. Note that the hardware configuration of the recommendation apparatus 2F is not limited to this example. Regarding the specific hardware configuration of the recommendation apparatus 2F, constituent elements can be omitted, replaced, and added as appropriate depending on the embodiment. The recommendation apparatus 2F may be a general-purpose server, a general-purpose PC, or the like, instead of an information processing apparatus that is specifically designed for the service to be provided.

The storage unit 22 of the recommendation apparatus 2F according to this modification stores various types of information such as a recommendation program 82F and the learning result data 128F. The recommendation program 82F and learning result data 128F correspond to the estimation program 82 and learning result data 128 according to the embodiment described above. At least one of the recommendation program 82F and the learning result data 128F may be stored in a storage medium 92. Also, the recommendation apparatus 2F may acquire at least one of the recommendation program 82F and the learning result data 128F from the storage medium 92.

<Software Configuration and Exemplary Operation of Recommendation Apparatus>

Figure 24B:
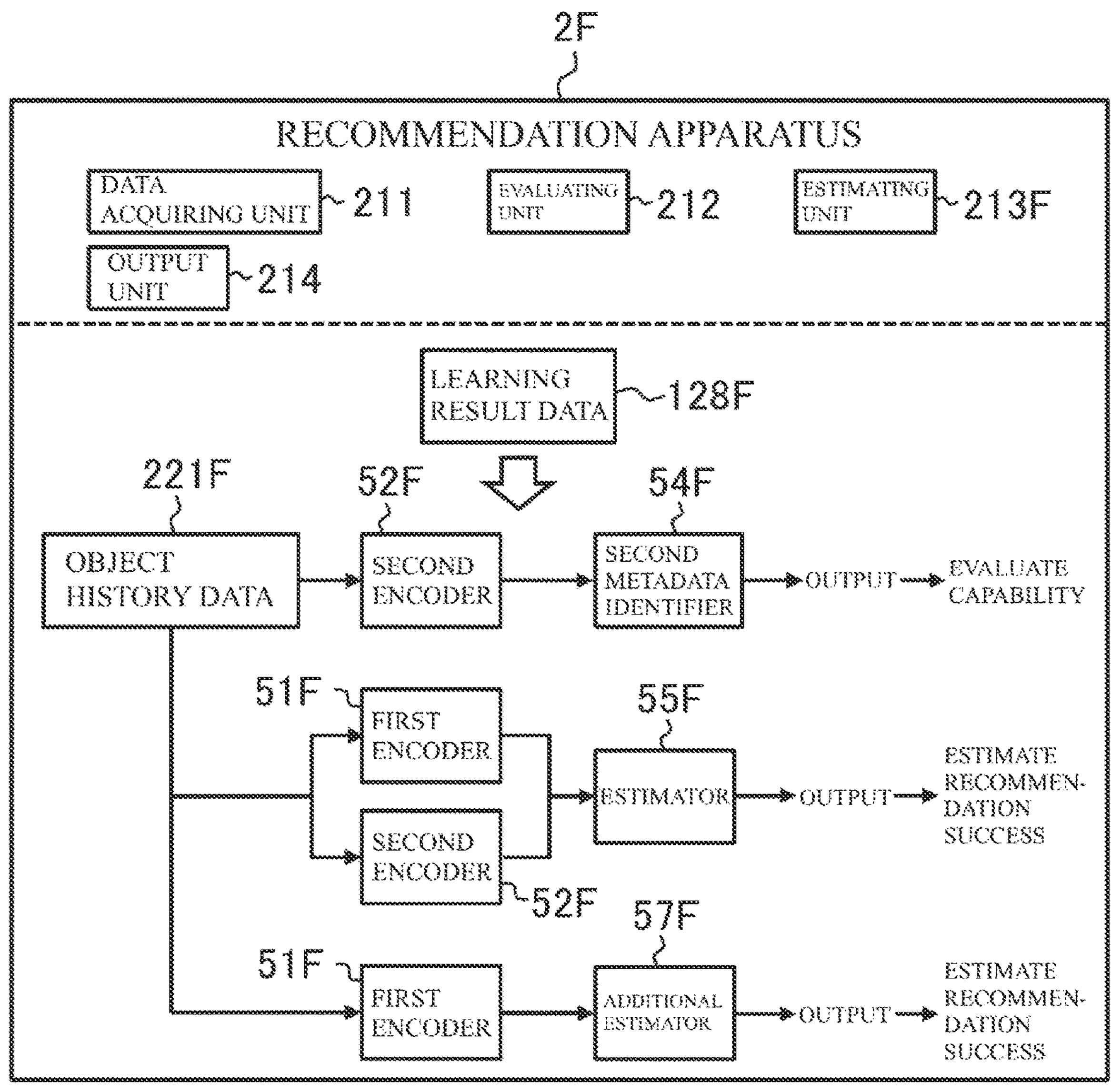
FIG. 24B is a schematic diagram illustrating an example of a software configuration of a recommendation apparatus according to another mode.

FIG. 24B schematically illustrates an example of a software configuration of the recommendation apparatus 2F according to this modification. The software configuration of the recommendation apparatus 2F is realized by the control unit 21 executing the recommendation program 82F, similarly to the above-described embodiment. As shown in FIG. 24B, the software configuration of the recommendation apparatus 2F is similar to the software configuration of the estimation apparatus 2 described above, except that client history data is used. Accordingly, the recommendation apparatus 2F executes series of processes regarding the recommendation processes, similarly to the estimation processes of the estimation apparatus 2 described above.

That is, in step S501, the control unit 21 operates as the data acquiring unit 211, and acquires object history data 221F of a client. The method for acquiring the object history data 221F is not limited in particular, and may be selected as appropriate depending on the embodiment. The control unit 21 may acquire the object history data 221F from a user terminal of the client, for example. Also, the control unit 21 may acquire the object history data 221F from a server that provides sales of a product or service to the client, for example. Also, if the recommendation apparatus 2F is a server that provides sales of a product or service to the client, the recommendation apparatus 2F may accumulate object history data 221F when the client performs accesses via a user terminal.

In step S502, the control unit 21 operates as the evaluating unit 212, and identifies the attribute regarding acquisition of the object history data 221F using the second encoder 52F and second metadata identifier 54F that were trained by the learning apparatus 1. Specifically, the control unit 21 configures the settings of the trained second encoder 52F and second metadata identifier 54F by referring to the learning result data 128F. Next, the control unit 21 inputs the acquired object history data 221F to the second encoder 52F, and executes computation processes of the second encoder 52F and the second metadata identifier 54F. With these computation processes, the control unit 21 acquires an output value corresponding to the result of identifying the attribute regarding acquisition of the object history data 221F, from the second metadata identifier 54F.

In step S503, the control unit 21 operates as the evaluating unit 212, and determines whether or not the result of estimation by the estimator 55F or the additional estimator 57F is adopted, based on the result of identifying the attribute regarding acquisition of the object history data 221F. In step S504, the control unit 21 determines to where the process branches based on the determination result in step S503.

If the identification result in step S502 matches the correct answer value of the attribute regarding acquisition of the object history data 221F, the control unit 21 determines that the result of estimation by the estimator 55F or the additional estimator 57F is adopted, and advances the process to the next step S505. On the other hand, if the identification result in step S502 does not match the correct answer value of the attribute regarding acquisition of the object history data 221F, the control unit 21 determines that the result of estimation by the estimator 55F or the additional estimator 57F is not adopted, skips processes in steps S505 and S506, and ends the series of processes according to this modification.

In step S505, the control unit 21 operates as an estimating unit 213F, and estimates the hit ratio when the object product or service is recommended from the object history data 221F, using the first encoder 51F, second encoder 52F, and estimator 55F that were trained by the learning apparatus 1. Alternatively, the control unit 21 estimates the hit ratio when the object product or service is recommended from the object history data 221F, using the first encoder 51F and additional estimator 57F that were trained by the learning apparatus 1.

Specifically, the control unit 21 further configures the settings of the trained first encoder 51F and the estimator 55F by referring to the learning result data 128F. The control unit 21 inputs the object history data 221F and a label indicating the object product or service to the encoders (51F, 52F), and executes the computation processes of the first encoder 51F, the second encoder 52F, and the estimator 55F. With this, the control unit 21 acquires an output value corresponding to the result of estimating the hit ratio when the object product or service is recommended from the object history data 221F, from the estimator 55F.

Alternatively, the control unit 21 configures the settings of the trained first encoder 51F and the additional estimator 57F by referring to the learning result data 128F. The control unit 21 inputs the object history data 221F and a label indicating the object product or service to the first encoder 51F, and executes the computation processes of the first encoder 51F and the additional estimator 57F. With this, the control unit 21 acquires an output value corresponding to the result of estimating the hit ratio when the object product or service is recommended from the object history data 221F, from the additional estimator 57F.

In step S506, the control unit 21 operates as the output unit 214, and outputs information regarding the result of estimating the hit ratio when the object product or service is recommended. For example, the control unit 21 may output the result of estimating the hit ratio when the object product or service is recommended to the output apparatus 25 as is. Also, the control unit 21 may determine whether or not the estimated hit ratio is a threshold value or more. The control unit 21 specifies a product or service whose hit ratio is the threshold value or more based on the determination result, and recommends the specified product or service to the client via a web page or the like. The medium to be used for recommendation of a product or service may be selected as appropriate depending on the embodiment.

According to this modification, in a scenario in which the hit ratio when a product or service is recommended is estimated from history data, a trained learning model 5F can be constructed whose introduction cost is relatively low and that is robust to the difference in the attribute regarding acquisition of sensing data.

For example, consumables such as daily necessities and low-priced alcohol, tobacco or the like are constantly purchased, and therefore there are cases where the desire of purchasing these products does not depend much on client identification information. Therefore, in a scenario in which the hit ratio of recommendation of consumables is estimated, it is possible that information specific to a domain such as client identification information exerts a bad influence on the accuracy of the estimation task. On the other hand, there are cases where the desire of purchasing products that are sporadically purchased such as high-priced products or service highly depends on client identification information. Therefore, in a scenario in which the hit ratio of recommendation of products that are sporadically purchased is estimated, it is possible that information specific to a domain is useful for the estimation task. That is, there may be cases where the information specific to a domain is useful and cases where the information specific to a domain exerts a bad influence, depending on the type of the product or service.

Therefore, the metadata 123F may be set to indicate the client identification information. The correct answer data 124F and the different correct answer data 125F may be set to indicate the hit ratio of recommendation of the object product or service.

As a result of executing the above-described machine learning with these settings, the first feature amount includes a component corresponding to the hitting tendency of recommendation according to the client purchasing history, as the information in common across domains. On the other hand, the second feature amount includes components corresponding to the hitting tendency of recommendation according to the client identification information, as information specific to a domain.

Accordingly, as a result of using the trained first encoder 51F and additional estimator 57F, in the recommendation apparatus 2F, a task of estimating the hit ratio when the object product or service is recommended can be performed based on the above-described information in common across domains while removing the above-described information specific to a domain. Therefore, in a scenario in which a product or service is recommended regarding which purchasing activity does not much depend on the client identification information, such as consumables, as a result of using the trained first encoder 51F and additional estimator 57F, the hit ratio of recommendation can be estimated with relatively high accuracy. Also, as a result of using the trained first encoder 51F, second encoder 52F, and estimator 55F in the recommendation apparatus 2F, a task of estimating the hit ratio when the object product or service is recommended can be performed based on both of the above-described information specific to a domain and information in common across domains. Therefore, in a scenario in which a product or service is recommended regarding which purchasing activity is likely to depend on the client identification information, such as a product or service that is sporadically purchased, as a result of using the trained first encoder 51F, second encoder 52F, and estimator 55F, the hit ratio of the recommendation can be estimated with relatively high accuracy. Note that, in the recommendation apparatus 2F, which of the two estimation methods described above is adopted may be set based on the operator's designation, setting values, or the like.

<4.2>

In the embodiment described above, the devices 51 to 57 of the learning model 5 are constituted by neural networks. However, there is no particular limitation to the structures of the devices 51 to 57, as long as they include computation parameters that are used for computational operations and are adjusted by machine learning, that is, as long as they are models (learners) that can perform machine learning. The type of the devices 51 to 57 may be selected as appropriate depending on the embodiment. A support vector machine, a regression model, or a decision tree model may be used for the devices 51 to 57 in addition to the neural network, for example. The method of machine learning of the devices 51 to 57 may be selected as appropriate according to the types of learners.

Also, in the example in FIG. 5A of the above-described embodiment, the devices 51 to 57 are each constituted by a fully connected neural network having a three-layer structure. However, the type of the neural network constituting the devices 51 to 57 is not limited to this example. For example, the devices 51 to 57 may be constituted by convolutional neural networks including a convolutional layer, a pooling layer, and a fully connected layer. Also, the devices 51 to 57 may be constituted by recurrent neural networks, for example.

Note that these modifications may be similarly applied to systems according to the above-described first to sixth modifications. For example, assume a scenario in which, in the second modification described above, measurement data of vital signs of an object is acquired by a vital sensor, and the state of the object is estimated from the acquired measurement data. In this scenario, the change over time in the acquired measurement data is useful for estimating the state of the object. When this change over time is reflected on performing an estimation task, it is preferable that at least one of constituent elements of the learning model is constituted by a recurrent neural network. As a result of using the recurrent neural network, the change over time can be reflected on performing an estimation task.

<4.3>

In the embodiment described above, the learning model 5 includes the decoder 56 and the additional estimator 57, in addition to the first encoder 51, the second encoder 52, the first metadata identifier 53, the second metadata identifier 54, and the estimator 55B. However, the configuration of the learning model 5 is not limited to this example. At least one of the decoder 56 and the additional estimator 57 may be omitted from the learning model 5. If the decoder 56 is omitted, the processes in the above-described step S203 may be omitted in the above-described machine learning procedure. Also, if the additional estimator 57 is omitted, the processes in step S204 may be omitted in the above-described machine learning procedure.

Also, the first encoder 51 and the second encoder 52 are trained such that the mutual information amount between the first and second feature amounts decreases by the processes in step S205, in the machine learning procedure in the embodiment described above. However, the machine learning procedure is not limited to this example. The processes in step S205 may be omitted.

Also, in the embodiment described above, the estimation apparatus 2 evaluates whether or not the result of the estimation processes performed by the estimator 55 or the additional estimator 57 is adopted using the trained second encoder 52 and second metadata identifier 54, by the processes in steps S502 to S504. However, the procedure of the estimation apparatus 2 is not limited to this example. The processes in steps S502 to S504 may be omitted. In this case, the evaluating unit 212 may be omitted from the software configuration of the estimation apparatus 2. Note that these modifications may be similarly applied to the systems according to the above-described first to sixth modifications.

Also, in the embodiment described above, the training data (122, 192) and the object data (221, 321) may be replaced by individual type of data such as image data, sound data, numerical data, text data, and measurement data obtained by a sensor, for example.

For example, as a result of the training data (122, 192) and object data (221, 321) being image data, an image system can be constituted by the learning apparatus 1, the estimation apparatus 2, and the data generation apparatus 3, for example. In this case, the learning apparatus 1 can construct a trained learning model 5 that has acquired the capability of estimating a predetermined feature from image data, by performing machine learning using a plurality of learning data sets. The estimation apparatus 2 can estimate a feature included in object image data, by using the trained learning model 5 including the estimator 55 or the additional estimator 57. The data generation apparatus 3 can generate new data from object image data by using the learning model 5 including the trained decoder 56. The above-described third modification and fourth modification are examples of the image system.

Also, as a result of the training data (122, 192) and object data (221, 321) being sensing data, a sensor system can be constituted by the learning apparatus 1, the estimation apparatus 2, and the data generation apparatus 3, for example. In this case, the learning apparatus 1 can construct a trained learning model 5 that has acquired the capability of estimating a predetermined feature from sensing data, by performing machine learning using a plurality of learning data sets. The estimation apparatus 2 can estimate a feature included in object sensing data, by using the trained learning model 5 including the estimator 55 or the additional estimator 57. The data generation apparatus 3 can generate new data from object sensing data by using the learning model 5 including the trained decoder 56. The above-described first, second, and fifth modifications are examples of the sensor system.

INDEX TO THE REFERENCE NUMERALS

1 Learning apparatus
11 Control unit
12 Storage unit
13 Communication interface
14 Input apparatus
15 Output apparatus
16 Drive
111 Data acquiring unit
112 Learning processing unit
113 Saving processing unit
121 Learning data set
122 Training data
123 Metadata
124 Correct answer data
125 Different correct answer data
128 Learning result data
81 Learning program
91 Storage medium
2 Estimation apparatus
21 Control unit
22 Storage unit
23 Communication interface
24 Input apparatus
25 Output apparatus
26 Drive
27 External interface
211 Data acquiring unit
212 Evaluating unit
213 Estimating unit
214 Output unit
221 Object data
3 Data generation apparatus
31 Control unit
32 Storage unit
33 Communication interface
34 Input apparatus
35 Output apparatus
36 Drive
37 External interface
311 Data acquiring unit
312 Generating unit
313 Saving processing unit
321 Object data
5 Learning model
51 First encoder
52 Second encoder
53 First metadata identifier
54 Second metadata identifier
55 Estimator
56 Decoder
57 Additional estimator
S Sensor

The invention claimed is:

1. A learning apparatus comprising a processor configured with a program to perform operations comprising:

operation as a data acquiring unit configured to acquire a plurality of learning data sets that are each constituted by a combination of training data, metadata indicating an attribute regarding acquisition of the training data, and correct answer data indicating a feature included in the training data that corresponds to a correct answer to an estimation task with respect to the training data; and operation as a learning processing unit configured to perform machine learning of a learning model including a first encoder for extracting domain-common features, a second encoder for extracting domain-specific features, a first metadata identifier, a second metadata identifier, and an estimator, wherein the first encoder is configured to convert input data that is given into it to a first feature amount of the domain-common features, the second encoder is configured to convert the input data to a second feature amount of the domain-specific features, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, the estimator is configured to receive output values of the first encoder and the second encoder, and estimate a feature included in the input data from the first feature amount and the second feature amount, performing the machine learning comprises:

first training the second encoder and the second metadata identifier such that, with respect to each learning data set, an identification result obtained from the second metadata identifier by giving the training data to the second encoder matches the metadata;

second training the first encoder, the second encoder, and the estimator such that, with respect to each learning data set, an estimation result obtained from the estimator by giving the training data to the first encoder and the second encoder matches the correct answer data;

third training the first metadata identifier such that, with respect to each learning data set, an identification result obtained from the first metadata identifier by giving the training data to the first encoder matches the metadata;

fourth training the first encoder such that, with respect to each learning data set, an identification result obtained from the first metadata identifier by giving the training data to the first encoder does not match the metadata; and fifth training the first encoder and the second encoder such that, with respect to each learning data set, a mutual information amount decreases between an output value obtained, as the first feature amount, from the first encoder by giving the training data to the first encoder and an output value obtained, as the second feature amount, from the second encoder by giving the training data to the second encoder, and performing adversarial learning on the first encoder and the first metadata identifier by repeatedly alternating between executing the third training and the fourth training until the first feature amount obtained by the first encoder does not include a component corresponding to the attribute regarding acquisition of the training data and the identification by the first metadata identifier fails.

2. The learning apparatus according to claim 1, wherein at least one first learning data set and at least one second learning data set that are included in the plurality of learning data sets are obtained from different domains such that the attribute indicated by the metadata of the at least one first learning data set differs from that of the at least one second learning data set.

3. The learning apparatus according to claim 1, wherein, in the first training, the second encoder is trained such that the second feature amount includes a component corresponding to the attribute regarding acquisition of the training data indicated by the metadata, and in the fourth training, the first encoder is trained such that the first feature amount includes a component corresponding to information that appears in common across domains from which the training data of the learning data sets are acquired.

4. The learning apparatus according to claim 1, wherein, the first, second, third, and fourth trainings are performed by inputting noise along with the training data to the encoders.

5. The learning apparatus according to claim 1, wherein, in the fourth training, with respect to each learning data set, dummy metadata that corresponds to the metadata, and has a value that is different from that of the corresponding metadata is acquired, and performing training of the first encoder such that the identification result does not match the metadata includes performing training of the first encoder such that an identification result obtained from the first metadata identifier by giving the training data to the first encoder matches the dummy metadata.

6. The learning apparatus according to claim 5, wherein the dummy metadata is constituted by metadata of a learning data set that is different from the corresponding learning data set.

7. The learning apparatus according to claim 1, wherein the learning model further includes a decoder configured to decode the input data from the first feature amount and the second feature amount, and performing the machine learning further includes fifth training the first encoder, the second encoder, and the decoder such that, with respect to each learning data set, decoded data obtained by the decoder by giving the training data to the first encoder and the second encoder matches the training data.

8. The learning apparatus according to claim 7, wherein, in the first, the second, and the fifth trainings, an output value is acquired, as the second feature amount, from the second encoder by giving the training data to the second encoder, and the trainings are executed by inputting noise to the second metadata identifier, the estimator, and the decoder along with the acquired output value.

9. The learning apparatus according to claim 7, wherein the data acquiring unit acquires, after the learning processing unit has performed machine learning of the learning model, an output value from the first encoder as the first feature amount by giving at least one training data of the plurality of learning data sets to the first encoder, acquires an output value from the second encoder as the second feature amount by giving the training data to the second encoder, and acquires output data from the decoder as the decoded data by inputting the output value acquired from the first encoder to the decoder and inputting noise along with the output value obtained from the second encoder to the decoder, and the learning processing unit again performs machine learning of the learning model using the acquired output data as new training data.

10. The learning apparatus according to claim 1, wherein the learning model further includes an additional estimator configured to receive an output value of the first encoder and to estimate a feature included in the input data from the first feature amount, and the performing the machine learning further includes a seventh training the first encoder and the additional estimator such that, with respect to each learning data set, an estimation result obtained from the additional estimator by giving the training data to the first encoder matches the correct answer data or a different correct answer data indicating a different feature included in the training data.

11. The learning apparatus according to claim 1, wherein the training data is sensing data obtained by sensors that observe vehicles moving on a road, the metadata indicates, as the attribute regarding acquisition, an attribute of the road, observation angles of the sensors, installation intervals of the sensors, or types of the sensors, or a combination of these, and the correct answer data indicates information regarding traffic conditions of the road, as the feature.

12. The learning apparatus according to claim 1, wherein the training data is sensing data obtained by a sensor that observes a state of an examinee, the metadata indicates, as the attribute regarding acquisition, identification information of the examinee, an attribute regarding the time at which the sensing data was obtained, an attribute regarding installation conditions of the sensor, or an installed location of the sensor, or a combination of these, and the correct answer data indicates the state of the examinee as the feature.

13. The learning apparatus according to claim 1, wherein the training data is image data of an image of a product, the metadata indicates, as the attribute regarding acquisition, an attribute of the product, shooting conditions of the product, or an attribute of a factory for producing the product, or a combination of these, and the correct answer data indicates that state of the product as the feature.

14. An estimation apparatus comprising a second processor configured with a second program to perform operations comprising:

operation as a data acquiring unit configured to acquire object data;

operation as an estimating unit configured to estimate, using the learning apparatus according to claim 1, a feature included in acquired object data using the first encoder, the second encoder, and the estimator that were trained by the learning apparatus; and operation as an output unit configured to output information regarding the result of estimating the feature.

15. An estimation apparatus comprising a second processor configured with a second program to perform operations comprising:

operation as a data acquiring unit configured to acquire object data;

operation as an estimating unit configured to estimate, using the learning apparatus according to claim 10, a feature included in acquired object data using the first encoder and the additional estimator that were trained by the learning apparatus; and operation as an output unit configured to output information regarding the result of estimating the feature.

16. The estimation apparatus according to claim 14, wherein the second processor is configured with the program to perform operations further comprising:

operation as an evaluating unit configured to identify the attribute regarding acquisition of the object data using the second encoder and the second metadata identifier that were trained by the learning apparatus, and determine whether or not the result of estimating the feature is adopted based on the identification result.

17. A data generation apparatus comprising a second processor configured with a second program to perform operations comprising:

a data acquiring unit configured to acquire object data;

a data generating unit configured to, using the learning apparatus according to claim 7, acquire an output value from the first encoder as the first feature amount by giving the object data to the first encoder trained by the learning apparatus, and generate decoded data by decoding the object data from the output value acquired from the first encoder using the trained decoder without giving an output value acquired from the second encoder; and a saving processing unit configured to save the generated decoded data in a predetermined storage area.

18. A learning method in which a computer executes:

acquiring a plurality of learning data sets that are each constituted by a combination of training data, metadata indicating an attribute regarding acquisition of the training data, and correct answer data indicating a feature included in the training data that corresponds to a correct answer to an estimation task with respect to the training data; and performing machine learning of a learning model including a first encoder for extracting domain-common features, a second encoder for extracting domain-specific features, a first metadata identifier, a second metadata identifier, and estimator, wherein the first encoder is configured to convert input data that is given into it to a first feature amount of the domain-common features, the second encoder is configured to convert the input data to a second feature amount of the domain-specific features, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, the estimator is configured to receive output values of the first encoder and the second encoder, and estimate a feature included in the input data from the first feature amount and the second feature amount, the performing the machine learning includes executing operations comprising:

first training the second encoder and the second metadata identifier such that, with respect to each learning data set, an identification result obtained from the second metadata identifier by giving the training data to the second encoder matches the metadata;

second training the first encoder, the second encoder, and the estimator such that, with respect to each learning data set, an estimation result obtained from the estimator by giving the training data to the first encoder and the second encoder matches the correct answer data;

third training the first metadata identifier such that, with respect to each learning data set, an identification result obtained from the first metadata identifier by giving the training data to the first encoder matches the metadata;

fourth training the first encoder such that, with respect to each learning data set, an identification result obtained from the first metadata identifier by giving the training data to the first encoder does not match the metadata; and fifth training the first encoder and the second encoder such that, with respect to each learning data set, a mutual information amount decreases between an output value obtained, as the first feature amount, from the first encoder by giving the training data to the first encoder and an output value obtained, as the second feature amount, from the second encoder by giving the training data to the second encoder, and performing adversarial learning on the first encoder and the first metadata identifier by repeatedly alternating between executing the third training and the fourth training until the first feature amount obtained by the first encoder does not include a component corresponding to the attribute regarding acquisition of the training data and the identification by the first metadata identifier fails.

19. A non-transitory computer-readable storage medium storing a learning program, which when read and executed, causes a computer to perform operations comprising:

acquiring a plurality of learning data sets that are each constituted by a combination of training data, metadata indicating an attribute regarding acquisition of the training data, and correct answer data indicating a feature included in the training data that corresponds to a correct answer to an estimation task with respect to the training data; and performing machine learning of a learning model including a first encoder for extracting domain-common features, a second encoder for extracting domain-specific features, a first metadata identifier, a second metadata identifier, and estimator, wherein the first encoder is configured to convert input data that is given into it to a first feature amount of the domain-common features, the second encoder is configured to convert the input data to a second feature amount of the domain-specific features, the first metadata identifier is configured to receive an output value of the first encoder, and identify an attribute regarding acquisition of the input data from the first feature amount, the second metadata identifier is configured to receive an output value of the second encoder, and identify an attribute regarding acquisition of the input data from the second feature amount, the estimator is configured to receive output values of the first encoder and the second encoder, and estimate a feature included in the input data from the first feature amount and the second feature amount, the performing the machine learning includes executing operations comprising:

first training the second encoder and the second metadata identifier such that, with respect to each learning data set, an identification result obtained from the second metadata identifier by giving the training data to the second encoder matches the metadata;

second training the first encoder, the second encoder, and the estimator such that, with respect to each learning data set, an estimation result obtained from the estimator by giving the training data to the first encoder and the second encoder matches the correct answer data;

third training the first metadata identifier such that, with respect to each learning data set, an identification result obtained from the first metadata identifier by giving the training data to the first encoder matches the metadata;

fourth training the first encoder such that, with respect to each learning data set, an identification result obtained from the first metadata identifier by giving the training data to the first encoder does not match the metadata; and fifth training the first encoder and the second encoder such that, with respect to each learning data set, a mutual information amount decreases between an output value obtained, as the first feature amount, from the first encoder by giving the training data to the first encoder and an output value obtained, as the second feature amount, from the second encoder by giving the training data to the second encoder, and performing adversarial learning on the first encoder and the first metadata identifier by repeatedly alternating between executing the third training and the fourth training until the first feature amount obtained by the first encoder does not include a component corresponding to the attribute regarding acquisition of the training data and the identification by the first metadata identifier fails.

* * * * *